(12) United States Patent
Li et al.

(10) Patent No.: US 9,857,943 B2
(45) Date of Patent: Jan. 2, 2018

(54) METHOD FOR MANAGING TASK ON TERMINAL DEVICE, AND TERMINAL DEVICE

(71) Applicant: Huawei Technologies Co., Ltd., Shenzhen (CN)

(72) Inventors: Songlin Li, Shenzhen (CN); Liu Yang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/011,179

(22) Filed: Jan. 29, 2016

(65) Prior Publication Data

US 2016/0147411 A1  May 26, 2016

Related U.S. Application Data

(63) Continuation of application No. PCT/CN2014/071923, filed on Feb. 10, 2014.

(30) Foreign Application Priority Data

Jul. 31, 2013  (CN) .......................... 2013 1 0328889

(51) Int. Cl.
   *G06F 3/048* (2013.01)
   *G06F 3/0481* (2013.01)
   (Continued)

(52) U.S. Cl.
   CPC ........ *G06F 3/04817* (2013.01); *G06F 3/0481* (2013.01); *G06F 3/0488* (2013.01); *G06F 3/167* (2013.01)

(58) Field of Classification Search
   CPC ....................................................... G06F 3/048
   See application file for complete search history.

(56) References Cited

U.S. PATENT DOCUMENTS

| 8,671,060 B2 * | 3/2014 | Richardson ............. G06F 21/10 705/50 |
| 2004/0119757 A1 * | 6/2004 | Corley ................ G06F 3/04817 715/837 |

(Continued)

FOREIGN PATENT DOCUMENTS

| CN | 101770332 A | 7/2010 |
| CN | 102006576 A | 4/2011 |

(Continued)

*Primary Examiner* — Peiyong Weng
(74) *Attorney, Agent, or Firm* — Leydig, Voit & Mayer, Ltd.

(57) ABSTRACT

A method for managing a task on a terminal device and the terminal device are provided. The method for managing a task on a terminal device may include: monitoring whether a first application on the terminal device is running, and monitoring a user's action of operating a desktop of the terminal device; and displaying, on the desktop of the terminal device, a running-state icon corresponding to the first application if it is detected that the first application is running, and disabling the first application if it is detected that the first application is running and the detected user action meets a preset disabling condition corresponding to the first application; or displaying, on the desktop of the terminal device, a disabled-state icon corresponding to the first application if it is detected that the first application is in a disabled state.

25 Claims, 10 Drawing Sheets

(51) Int. Cl.
*G06F 3/0488* (2013.01)
*G06F 3/16* (2006.01)

(56) References Cited

U.S. PATENT DOCUMENTS

| | | | | |
|---|---|---|---|---|
| 2005/0235054 | A1* | 10/2005 | Kadashevich | G06F 11/3466 709/223 |
| 2009/0150820 | A1* | 6/2009 | Hayman | G06F 3/0481 715/772 |
| 2010/0214237 | A1* | 8/2010 | Echeverri | G06F 3/04883 345/173 |
| 2011/0022393 | A1* | 1/2011 | Waller | G01C 21/3608 704/270 |
| 2012/0030668 | A1 | 2/2012 | Richardson | |
| 2012/0117544 | A1* | 5/2012 | Kakulamarri | G06F 11/3612 717/126 |
| 2013/0132528 | A1* | 5/2013 | Enomoto | G06F 15/16 709/219 |
| 2013/0152002 | A1 | 6/2013 | Menczel et al. | |
| 2014/0136314 | A1* | 5/2014 | Kiet | G06Q 30/0242 705/14.41 |

FOREIGN PATENT DOCUMENTS

| | | | |
|---|---|---|---|
| CN | 102629182 A | 8/2012 | |
| CN | 103019659 A | 4/2013 | |
| CN | 103412708 A | 11/2013 | |
| KR | 20100032567 A | 3/2010 | |
| KR | 20120057800 A | 6/2012 | |
| KR | 20130027056 A | 3/2013 | |
| WO | WO2015163894 A1 * | 4/2014 | ............ G06F 13/38 |

* cited by examiner

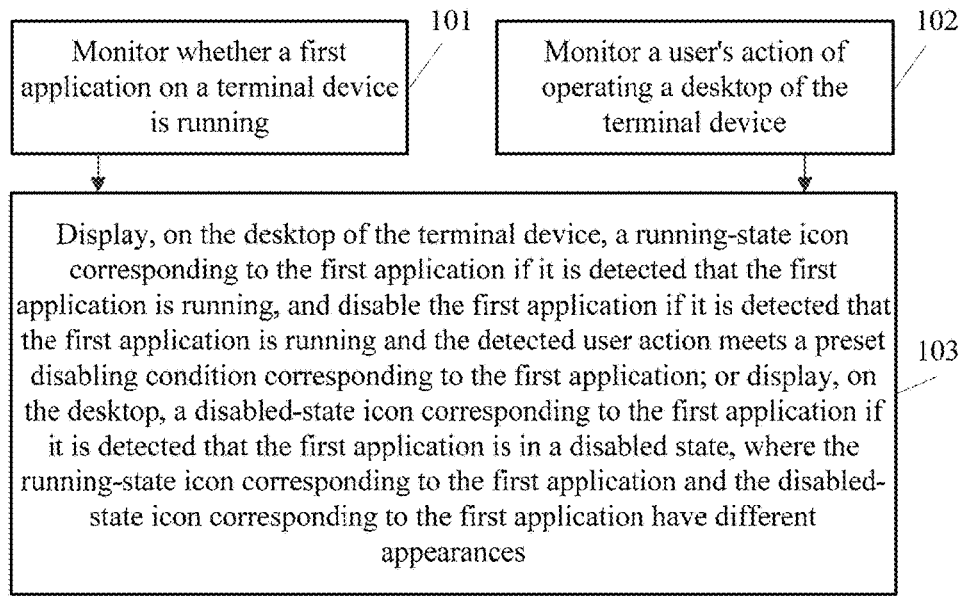
FIG. 1-a
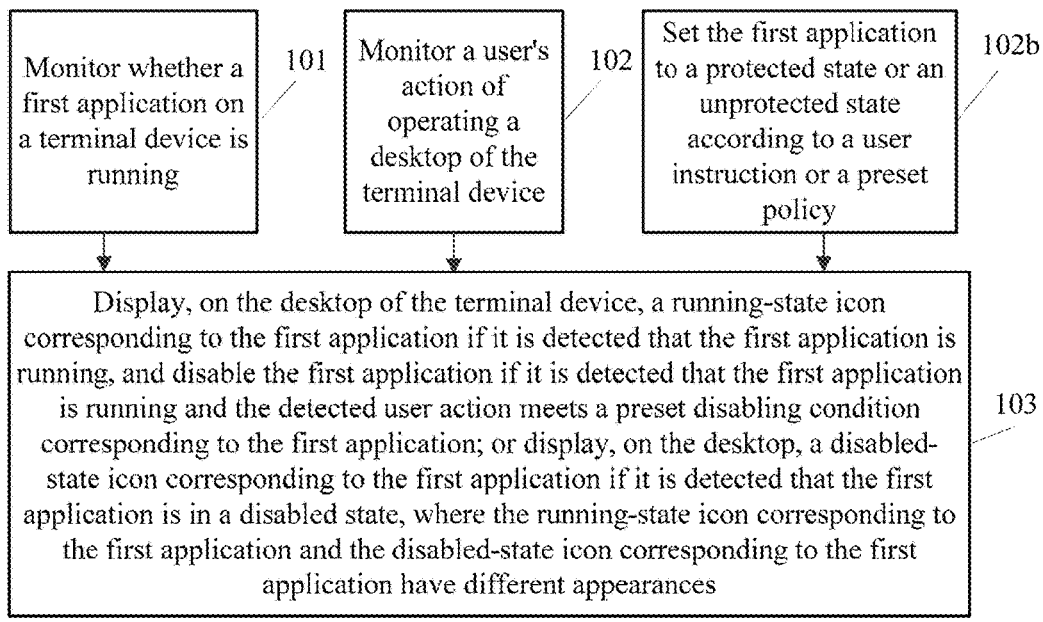
FIG. 1-b

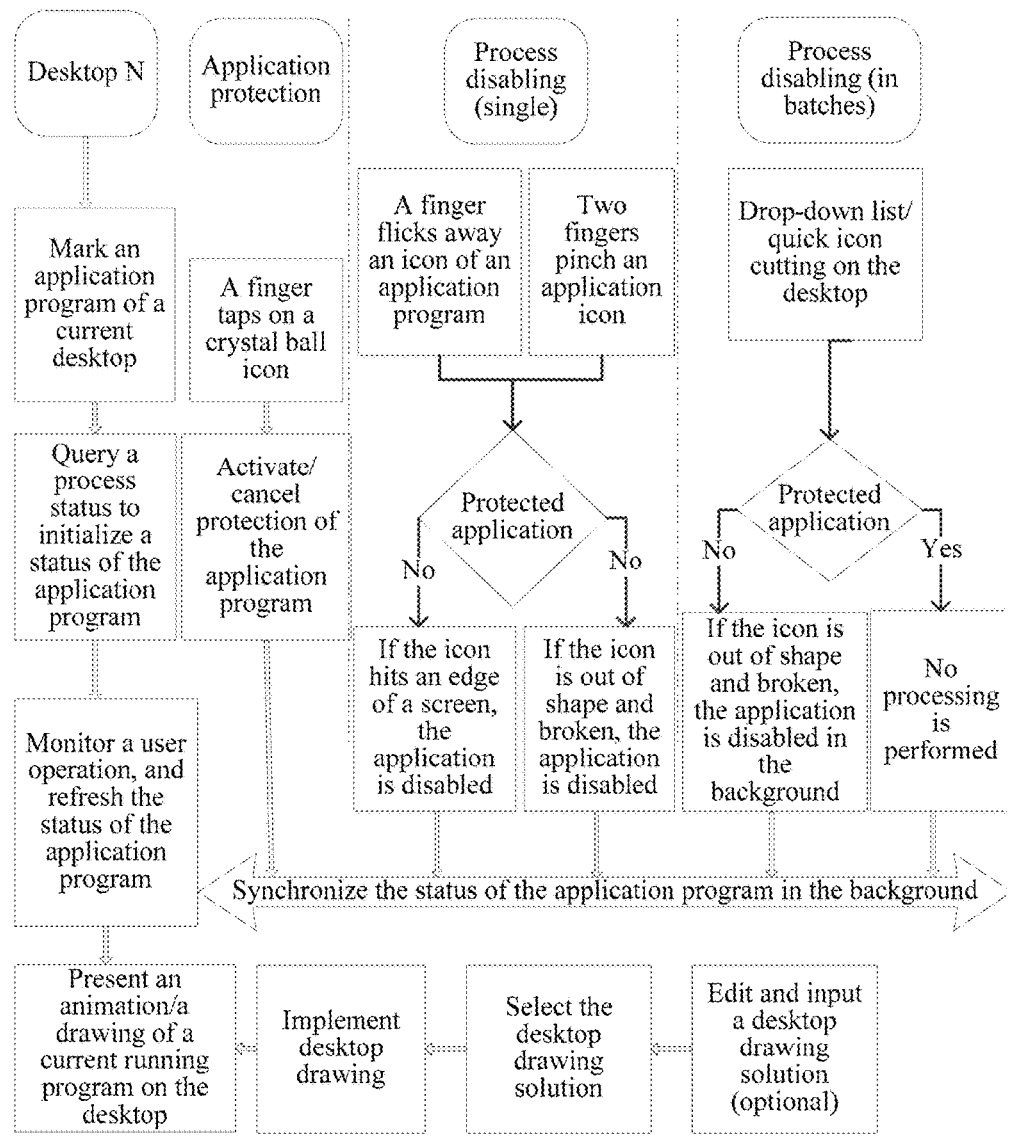
FIG. 1-c

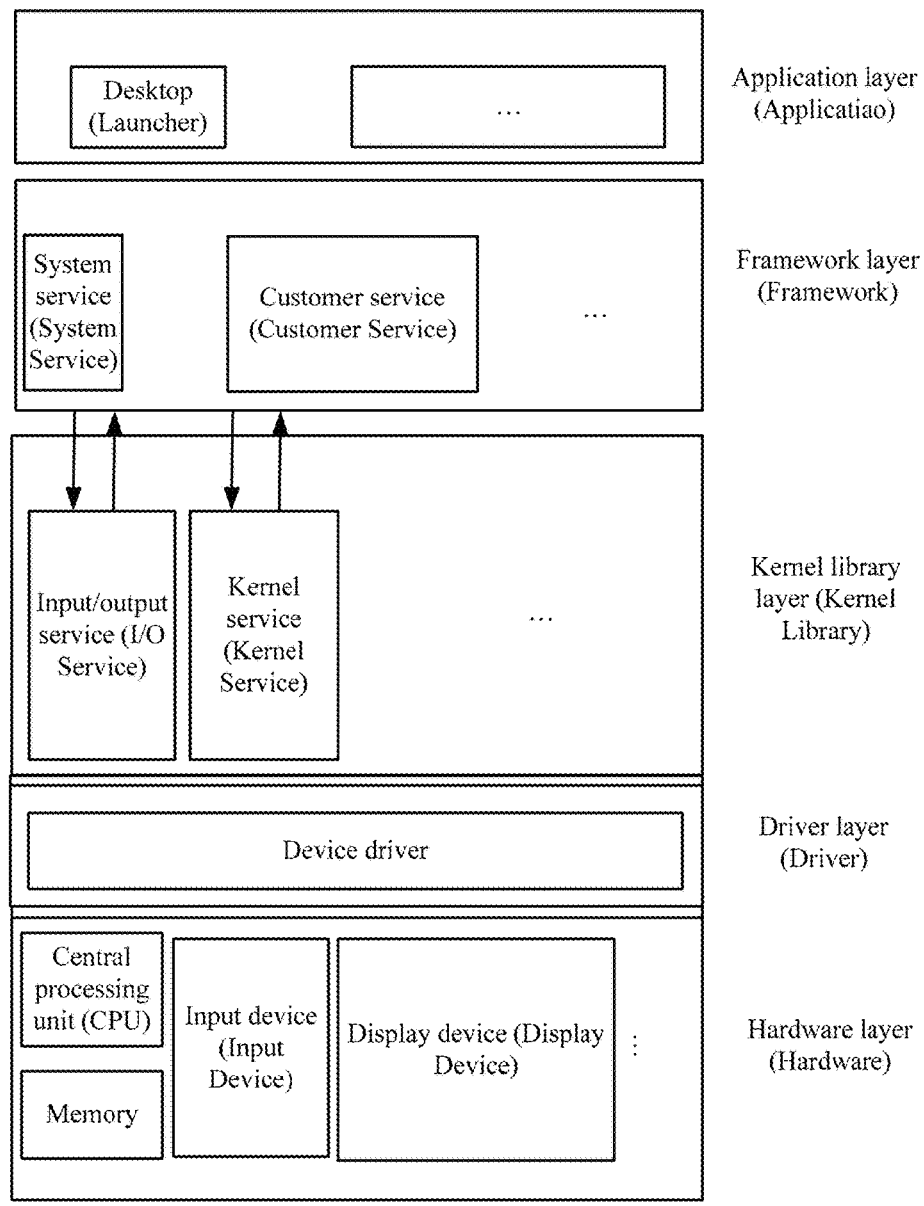
FIG. 1-d

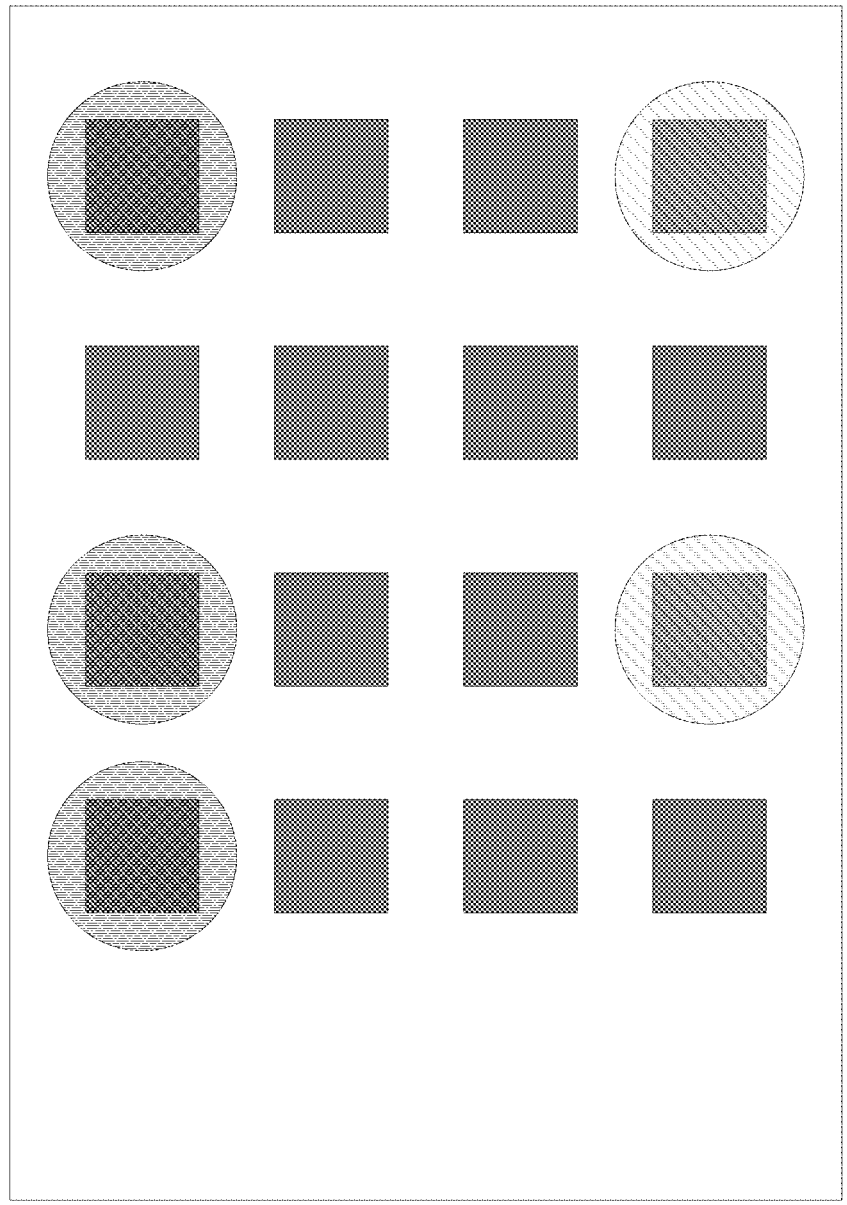
FIG. 2-a

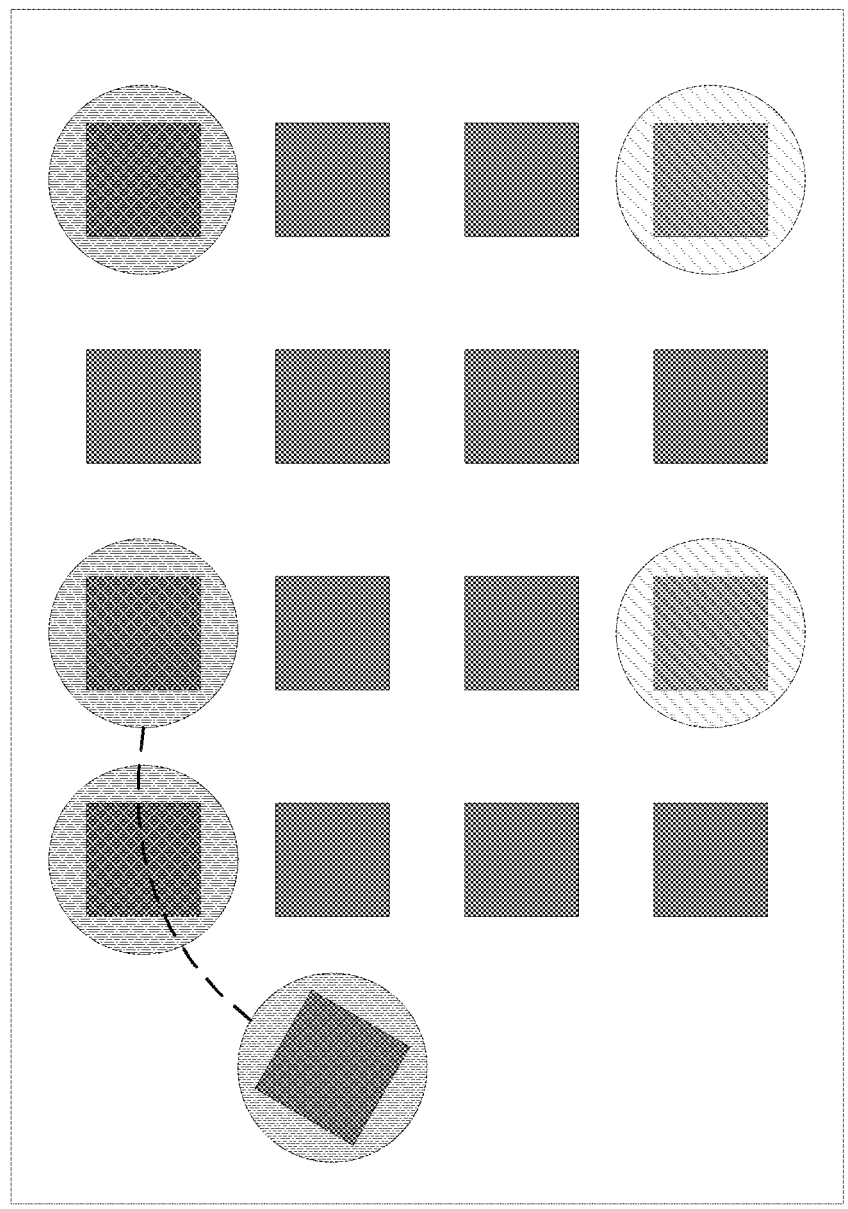
FIG. 2-b

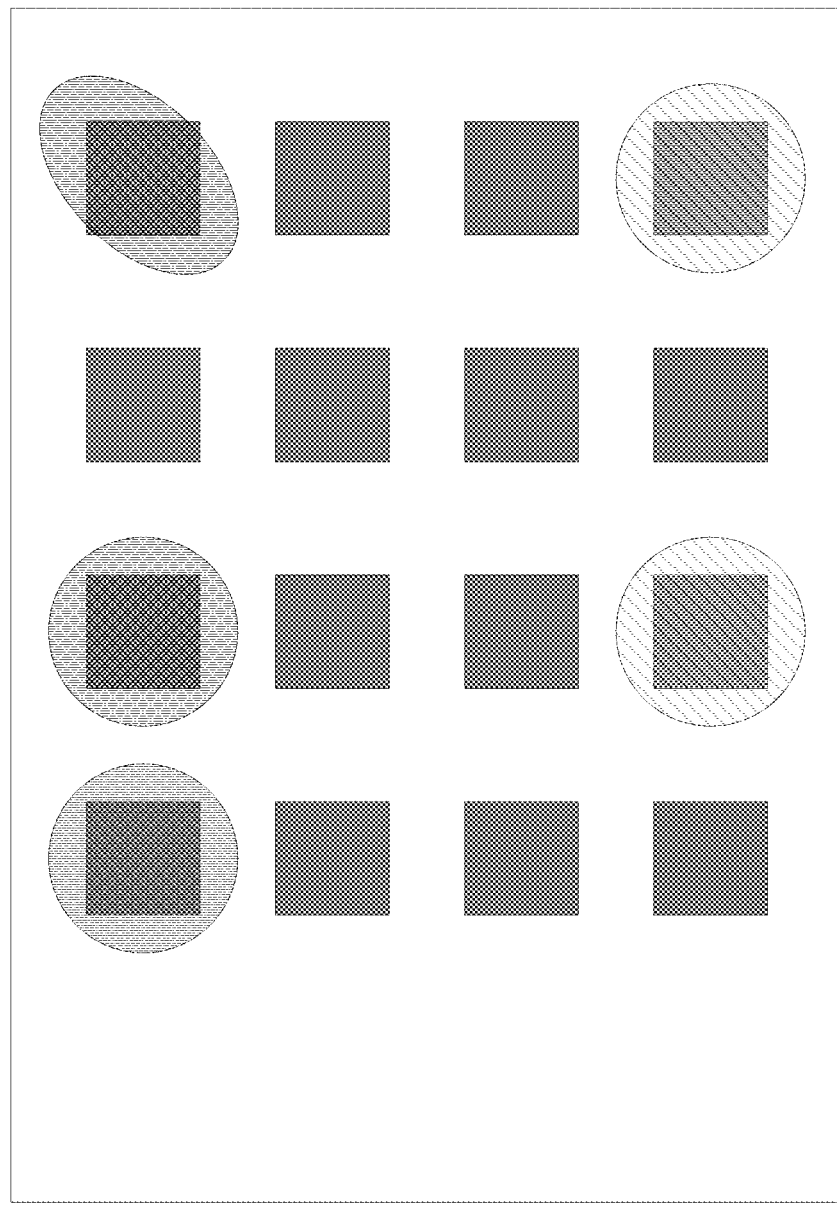
FIG. 2-c

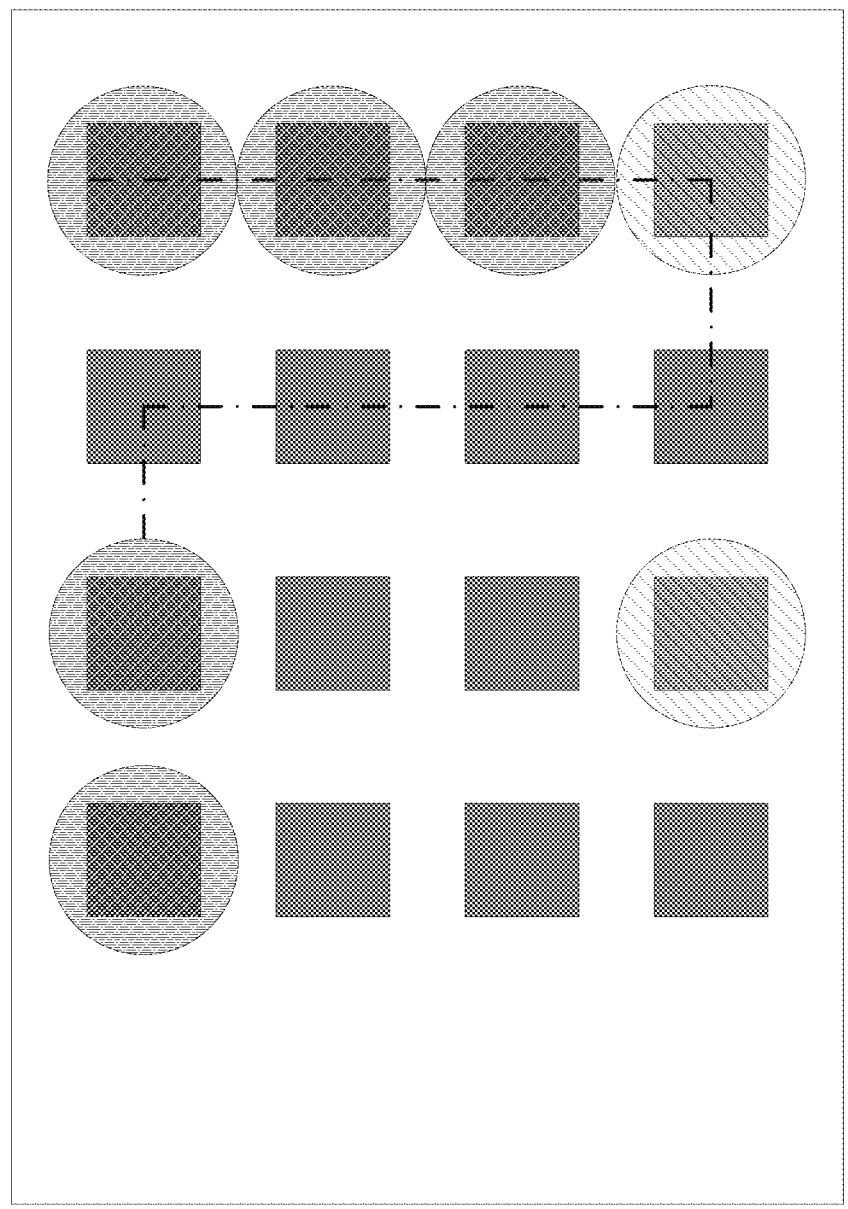
FIG. 2-d

METHOD FOR MANAGING TASK ON TERMINAL DEVICE, AND TERMINAL DEVICE

CROSS-REFERENCE TO RELATED APPLICATIONS

This application is a continuation of International Patent Application No. PCT/CN2014/071923, filed on Feb. 10, 2014, which claims priority to Chinese Patent Application No. 201310328889.1, filed on Jul. 31, 2013, both of which are hereby incorporated by reference in their entireties.

TECHNICAL FIELD

The present invention relates to the field of electronic technologies, and in particular, to a method for managing a task on a terminal device, and the terminal device.

BACKGROUND

At present, mobile smart terminals become increasingly popular and are widely used. On one hand, numerous application programs provide a variety of experience for a user; however, on the other hand, running of these application programs also causes great power consumption of a mobile smart terminal.

When the user returns to a desktop, the user usually does not know which threads are still running in the background, which causes a waste of power. In particular, some applications or viruses may enable a thread or a service in a case in which the user is uninformed, but the user at present cannot know running statuses of these applications to disable these applications in time, which causes a waste of a large amount of power and traffic.

SUMMARY

Embodiments of the present invention provide a method for managing a task on a terminal device, and the terminal device, so as to improve convenience and flexibility in disabling an application and enhance user experience.

According to a first aspect, an embodiment of the present invention provides a method for managing a task on a terminal device, where the method may include: monitoring whether a first application on the terminal device is running, and monitoring a user's action of operating a desktop of the terminal device; and displaying, on the desktop of the terminal device, a running-state icon corresponding to the first application if it is detected that the first application is running, and disabling the first application if it is detected that the first application is running and the detected user action meets a preset disabling condition corresponding to the first application; or displaying, on the desktop of the terminal device, a disabled-state icon corresponding to the first application if it is detected that the first application is in a disabled state, where the running-state icon corresponding to the first application and the disabled-state icon corresponding to the first application have different appearances.

With reference to the first aspect, in a first possible implementation manner, the monitoring whether a first application on the terminal device is running includes: monitoring, by using a thread status pool, whether the first application on the terminal device is running, where the thread status pool is a system thread.

With reference to the first aspect or the first possible implementation manner of the first aspect, in a second possible implementation manner, current memory usage of the first application is displayed in the running-state icon corresponding to the first application.

With reference to the first aspect, or the first possible implementation manner of the first aspect, or the second possible implementation manner of the first aspect, in a third possible implementation manner, the method further includes: setting a status of the first application to a protected state or an unprotected state according to a user instruction or a preset policy.

With reference to the third possible implementation manner of the first aspect, in a fourth possible implementation manner, the disabling the first application if it is detected that the first application is running and the detected user action meets a preset disabling condition corresponding to the first application includes: disabling the first application if it is detected that the first application is running, the first application is currently in the unprotected state, and the detected user action meets the preset disabling condition corresponding to the first application.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner, the monitoring a user's action of operating a desktop of the terminal device includes: monitoring the user's gesture, monitoring the user's moving track, monitoring the user's voice, and/or monitoring a touch track performed by the user on a touch sensor included in the terminal device.

With reference to the fifth possible implementation manner of the first aspect, in a sixth possible implementation manner, the disabling the first application if the detected user action meets the preset disabling condition corresponding to the first application includes: disabling the first application if it is detected that the touch track performed by the user on the touch sensor included in the terminal device indicates that the running-state icon of the first application is flicked away so that the flicked-away running-state icon of the first application hits an edge of a screen;

or the disabling the first application if the detected user action meets the preset disabling condition corresponding to the first application includes: disabling the first application if it is detected that the touch track performed by the user on the touch sensor included in the terminal device indicates that the running-state icon of the first application is clamped so that a crystal ball in which the running-state icon of the first application is shrouded is broken, where the running-state icon corresponding to the first application has a crystal ball shrouding effect, and the disabled-state icon corresponding to the first application does not have the crystal ball shrouding effect;

or the first application includes multiple sub-applications, and the disabling the first application if the detected user action meets the preset disabling condition corresponding to the first application includes: disabling, in batches, the multiple sub-applications included in the first application if it is detected that the touch track performed by the user on the touch sensor included in the terminal device passes through the multiple sub-applications included in the first application at a moving speed greater than or equal to a first speed threshold.

With reference to the fifth possible implementation manner of the first aspect, in a seventh possible implementation manner, that the detected user action meets the preset disabling condition corresponding to the first application is determined by using any one of the following methods:

matching a touch end point of the detected touch track performed by the user on the touch sensor included in the terminal device with at least one standard touch point model of a first type, and if the matching succeeds, determining that the detected user action meets the preset disabling condition corresponding to the first application; or matching a touch start point and a touch end point of the detected touch track performed by the user on the touch sensor included in the terminal device with at least one standard touch point model of a second type, and if the matching succeeds, determining that the detected user action meets the preset disabling condition corresponding to the first application; or determining a touch direction corresponding to the detected touch track performed by the user on the touch sensor included in the terminal device, matching the determined touch direction with at least one standard touch track model of a first type, and if a deviation between the determined touch direction and a standard touch direction that is included in one standard touch track model of the at least one standard touch track model of the first type is less than a third threshold, determining that the detected user action meets the preset disabling condition corresponding to the first application; or determining a touch graph corresponding to the detected touch track performed by the user on the touch sensor included in the terminal device, matching the determined touch graph with at least one standard touch track model of a second type, and if a similarity between the determined touch graph and a standard touch graph that is included in one standard touch track model of the second type of the at least one standard touch track model of the second type is greater than a fourth threshold, determining that the detected user action meets the preset disabling condition corresponding to the first application; or determining a moving direction corresponding to the user's moving track detected by using a camera included in the terminal device, matching the determined moving direction with at least one standard moving track model of a first type, and if a deviation between the determined moving direction and a standard moving direction that corresponds to one standard moving track model of the at least one standard moving track model of the first type is less than or equal to a threshold m1, determining that the detected user action meets the preset disabling condition corresponding to the first application; or determining a graph corresponding to the user's moving track detected by using a camera included in the terminal device, matching the determined graph with at least one standard moving track model of a second type, and if a similarity between the determined graph and a standard graph that corresponds to one standard moving track model of the at least one standard moving track model of the second type is greater than or equal to a threshold m2, determining that the detected user action meets the preset disabling condition corresponding to the first application; or determining a motion rate corresponding to the user's moving track detected by using a camera included in the terminal device, matching the determined motion rate with at least one standard moving track model of a third type, and if a deviation between the determined motion rate and a standard motion rate that corresponds to one standard moving track model of the at least one standard moving track model of the third type is less than or equal to a threshold m3, determining that the detected user action meets the preset disabling condition corresponding to the first application; or determining a motion rate corresponding to the user's moving track detected by using a camera included in the terminal device, matching the determined motion rate with a preset standard moving track model of a third type, and if the determined motion rate is greater than, or equal to a standard motion rate corresponding to the preset standard moving track model of the third type, determining that the detected user action meets the preset disabling condition corresponding to the first application; or determining a motion rate corresponding to the user's moving track detected by using a camera included in the terminal device, matching the determined motion rate with at least one standard moving track model of a fourth type, and if a deviation between the determined motion rate and at least one standard motion rate within a standard motion rate range that corresponds to one standard moving track model of the at least one standard moving track model of the fourth type is less than or equal to a threshold m4, determining that the detected user action meets the preset disabling condition corresponding to the first application; or determining a motion rate corresponding to the user's moving track detected by using a camera included in the terminal device, matching the determined motion rate with a preset standard moving track model of a fourth type, and if the determined motion rate is greater than, or equal to at least one standard motion rate within a standard motion rate range that corresponds to the preset standard moving track model of the fourth type, determining that the detected user action meets the preset disabling condition corresponding to the first application; or determining a motion displacement corresponding to the user's moving track detected by using a camera included in the terminal device, matching the determined motion displacement with at least one standard moving track model of a fifth type, and if a deviation between the determined motion displacement and a standard motion displacement that corresponds to one standard moving track model of the at least one standard moving track model of the fifth type is less than or equal to a threshold m5, determining that the detected user action meets the preset disabling condition corresponding to the first application; or determining a motion displacement corresponding to the user's moving track detected by using a camera included in the terminal device, matching the determined motion displacement with a preset standard moving track model of a fifth type, and if the determined motion displacement is greater than, less than, or equal to a standard motion displacement corresponding to the preset standard moving track model of the fifth type, determining that the detected user action meets the preset disabling condition corresponding to the first application; or determining a motion displacement corresponding to the user's moving track detected by using a camera included in the terminal device, matching the determined motion displacement with at least one standard moving track model of a sixth type, and if a deviation between the determined motion displacement and at least one standard motion displacement within a standard motion displacement range that corresponds to one standard moving track model of the at least one standard moving track model of the sixth type is less than or equal to a threshold m6, determining that the detected user action meets the preset disabling condition corresponding to the first application; or determining a motion displacement corresponding to the user's moving track detected by using a camera included in the terminal device, matching the determined motion displacement with a preset standard moving track model of a sixth type, and if the determined motion displacement is greater than, less than, or equal to at least one standard motion displacement within a standard motion displacement range that corresponds to the preset standard moving track model of the sixth type, determining that the detected user action meets the preset disabling condition corresponding to the first application; or determining a motion duration corresponding to the user's moving track detected by using a camera included in the terminal device, matching the determined motion duration with at least one standard moving track model of a seventh type, and if a deviation between the determined motion duration and a standard motion duration that corresponds to one standard moving track model of the at least one standard moving track model of the seventh type is less than or equal to a threshold m7, determining that the detected user action meets the preset disabling condition corresponding to the first application; or determining a motion duration corresponding to the user's moving track detected by using a camera included in the terminal device, matching the determined motion duration with a preset standard moving track model of a seventh type, and if the determined motion duration is greater than, less than, or equal to a standard motion duration corresponding to the preset standard moving track model of the seventh type, determining that the detected user action meets the preset disabling condition corresponding to the first application; or determining a motion duration corresponding to the user's moving track detected by using a camera included in the terminal device, matching the determined motion duration with at least one standard moving track model of an eighth type, and if a deviation between the determined motion duration and at least one standard motion duration within a standard motion duration range that corresponds to one standard moving track model of the at least one standard moving track model of the eighth type is less than or equal to a threshold m8, determining that the detected user action meets the preset disabling condition corresponding to the first application; or determining a motion duration corresponding to the user's moving track detected by using a camera included in the terminal device, matching the determined motion duration with a preset standard moving track model of an eighth type, and if the determined motion duration is greater than, less than, or equal to at least one standard motion duration within a standard motion duration range that corresponds to the preset standard moving track model of the eighth type, determining that the detected user action meets the preset disabling condition corresponding to the first application; or acquiring a volume value corresponding to the user's voice detected by using an audio monitoring apparatus included in the terminal device, matching the acquired volume value with at least one standard voice model of a first type, and if a deviation between the acquired volume value and a standard volume value that corresponds to one standard voice model of the at least one standard voice model of the first type is less than or equal to a threshold n1, determining that the detected user action meets the preset disabling condition corresponding to the first application; or acquiring a volume value corresponding to the user's voice detected by using an audio monitoring apparatus included in the terminal device, matching the acquired volume value with a preset standard voice model of a first type, and if the acquired volume value is greater than, or equal to a standard volume value corresponding to the preset standard voice model of the first type, determining that the detected user action meets the preset disabling condition corresponding to the first application; or acquiring a volume value corresponding to the user's voice detected by using an audio monitoring apparatus included in the terminal device, matching the acquired volume value with at least one standard voice model of a second type, and if a deviation between the acquired volume value and at least one standard volume value within a standard volume value range that corresponds to one standard voice model of the at least one standard voice model of the second type is less than or equal to a threshold n2, determining that the detected user action meets the preset disabling condition corresponding to the first application; or acquiring a volume value corresponding to the user's voice detected by using an audio monitoring apparatus included in the terminal device, matching the acquired volume value with a preset standard voice model of a second type, and if the acquired volume value is greater than, or equal to at least one standard volume value within a standard volume value range that corresponds to the preset standard voice model of the second type, determining that the detected user action meets the preset disabling condition corresponding to the first application; or acquiring an audio value corresponding to the user's voice detected by using an audio monitoring apparatus included in the terminal device, matching the acquired audio value with at least one standard voice model of a third type, and if a deviation between the acquired audio value and a standard audio value that corresponds to one standard voice model of the at least one standard voice model of the third type is less than or equal to a threshold n3, determining that the detected user action meets the preset disabling condition corresponding to the first application; or acquiring an audio value corresponding to the user's voice detected by using an audio monitoring apparatus included in the terminal device, matching the acquired audio value with a preset standard voice model of a third type, and if the acquired audio value is greater than, or equal to a standard audio value corresponding to the preset standard voice model of the third type, determining that the detected user action meets the preset disabling condition corresponding to the first application; or acquiring an audio value corresponding to the user's voice detected by using an audio monitoring apparatus included in the terminal device, matching the acquired audio value with at least one standard voice model of a fourth type, and if a deviation between the acquired audio value and at least one standard audio value within a standard audio value range that corresponds to one standard voice model of the at least one standard voice model of the fourth type is less than or equal to a threshold n4, determining that the detected user action meets the preset disabling condition corresponding to the first application; or acquiring an audio value corresponding to the user's voice detected by using an audio monitoring apparatus included in the terminal device, matching the acquired audio value with a preset standard voice model of a fourth type, and if the acquired audio value is greater than, or equal to at least one standard audio value within a standard audio value range that corresponds to the preset standard voice model of the fourth type, determining that the detected user action meets the preset disabling condition corresponding to the first application; or acquiring an audio variation trend corresponding to the user's voice detected by using an audio monitoring apparatus included in the terminal device, matching the acquired audio variation trend with at least one standard voice model of a fifth type, and if the acquired audio variation trend is the same as a standard audio variation trend corresponding to one standard voice model of the at least one standard voice model of the fifth type, determining that the detected user action meets the preset disabling condition corresponding to the first application; or acquiring a volume variation trend corresponding to the user's voice detected by using an audio monitoring apparatus included in the terminal device, matching the acquired volume variation trend with at least one standard voice model of a sixth type, and if the acquired volume variation trend is the same as a standard volume variation trend corresponding to one standard voice model of the at least one standard voice model of the sixth type, determining that the detected user action meets the preset disabling condition corresponding to the first application; or acquiring an audio variation rate corresponding to the user's voice detected by using an audio monitoring apparatus included in the terminal device, matching the acquired audio variation rate with at least one standard voice model of a seventh type, and if a deviation between the acquired audio variation rate and a standard audio variation rate that corresponds to one standard voice model of the at least one standard voice model of the seventh type is less than or equal to a threshold n5, determining that the detected user action meets the preset disabling condition corresponding to the first application; or acquiring an audio variation rate corresponding to the user's voice detected by using an audio monitoring apparatus included in the terminal device, matching the acquired audio variation rate with a preset standard voice model of a seventh type, and if the acquired audio variation rate is greater than, or equal to a standard audio variation rate corresponding to the preset standard voice model of the seventh type, determining that the detected user action meets the preset disabling condition corresponding to the first application; or acquiring an audio variation rate corresponding to the user's voice detected by using an audio monitoring apparatus included in the terminal device, matching the acquired audio variation rate with at least one standard voice model of an eighth type, and if a deviation between the acquired audio variation rate and at least one standard audio variation rate within a standard audio variation rate range that corresponds to one standard voice model of the at least one standard voice model of the eighth type is less than or equal to a threshold n6, determining that the detected user action meets the preset disabling condition corresponding to the first application; or acquiring an audio variation rate corresponding to the user's voice detected by using an audio monitoring apparatus included in the terminal device, matching the acquired audio variation rate with a preset standard voice model of an eighth type, and if the acquired audio variation rate is greater than, or equal to at least one standard audio variation rate within a standard audio variation rate range that corresponds to the preset standard voice model of the eighth type, determining that the detected user action meets the preset disabling condition corresponding to the first application; or acquiring a volume variation rate corresponding to the user's voice detected by using an audio monitoring apparatus included in the terminal device, matching the acquired volume variation rate with at least one standard voice model of a ninth type, and if a deviation between the acquired volume variation rate and a standard volume variation rate that corresponds to one standard voice model of the at least one standard voice model of the ninth type is less than or equal to a threshold n7, determining that the detected user action meets the preset disabling condition corresponding to the first application; or acquiring a volume variation rate corresponding to the user's voice detected by using an audio monitoring apparatus included in the terminal device, matching the acquired volume variation rate with a preset standard voice model of a ninth type, and if the acquired volume variation rate is greater than, or equal to a standard volume variation rate corresponding to the preset standard voice model of the ninth type, determining that the detected user action meets the preset disabling condition corresponding to the first application; or acquiring a volume variation rate corresponding to the user's voice detected by using an audio monitoring apparatus included in the terminal device, matching the acquired volume variation rate with at least one standard voice model of a tenth type, and if a deviation between the acquired volume variation rate and at least one standard volume variation rate within a standard volume variation rate range that corresponds to one standard voice model of the at least one standard voice model of the tenth type is less than or equal to a threshold n8, determining that the detected user action meets the preset disabling condition corresponding to the first application; or acquiring a volume variation rate corresponding to the user's voice detected by using an audio monitoring apparatus included in the terminal device, matching the acquired volume variation rate with a preset standard voice model of a tenth type, and if the acquired volume variation rate is greater than, or equal to at least one standard volume variation rate within a standard volume variation rate range that corresponds to the preset standard voice model of the tenth type, determining that the detected user action meets the preset disabling condition corresponding to the first application; or acquiring a duration corresponding to the user's voice detected by using an audio monitoring apparatus included in the terminal device, matching the acquired duration with at least one standard voice model of an eleventh type, and if a deviation between the acquired duration and a standard duration that corresponds to one standard voice model of the at least one standard voice model of the eleventh type is less than or equal to a threshold n9, determining that the detected user action meets the preset disabling condition corresponding to the first application; or acquiring a duration corresponding to the user's voice detected by using an audio monitoring apparatus included in the terminal device, matching the acquired duration with a preset standard voice model of an eleventh type, and if the acquired duration is greater than, or equal to a standard duration corresponding to the preset standard voice model of the eleventh type, determining that the detected user action meets the preset disabling condition corresponding to the first application; or acquiring a duration corresponding to the user's voice detected by using an audio monitoring apparatus included in the terminal device, matching the acquired duration with at least one standard voice model of a twelfth type, and if a deviation between the acquired duration and at least one standard duration within a standard duration range that corresponds to one standard voice model of the at least one standard voice model of the twelfth type is less than or equal to a threshold n10, determining that the detected user action meets the preset disabling condition corresponding to the first application; or acquiring a duration corresponding to the user's voice detected by using an audio monitoring apparatus included in the terminal device, matching the acquired duration with a preset standard voice model of a twelfth type, and if the acquired duration is greater than, or equal to at least one standard duration within a standard duration range that corresponds to the preset standard voice model of the twelfth type, determining that the detected user action meets the preset disabling condition corresponding to the first application; or converting the user's voice detected by using an audio monitoring apparatus included in the terminal device into a corresponding digital voice signal, matching the digital voice signal obtained after conversion with at least one standard voice model of a thirteenth type, and if a deviation between the digital voice signal and a standard digital voice signal that corresponds to one standard voice model of the at least one standard voice model of the thirteenth type is less than or equal to a threshold n11, determining that the detected user action meets the preset disabling condition corresponding to the first application.

According to a second aspect, an embodiment of the present invention provides a terminal device, where the terminal device may include:

a running monitoring unit, configured to monitor whether a first application on the terminal device is running;

an action monitoring unit, configured to monitor a user's action of operating a desktop of the terminal device;

an icon displaying unit, configured to display, on the desktop of the terminal device, a running-state icon corresponding to the first application if the running monitoring unit detects that the first application is running, or display, on the desktop of the terminal device, a disabled-state icon corresponding to the first application if the running monitoring unit detects that the first application is in a disabled state, where the running-state icon corresponding to the first application and the disabled-state icon corresponding to the first application have different appearances; and a control unit, configured to disable the first application if the running monitoring unit detects that the first application is running and the user action detected by the action monitoring unit meets a preset disabling condition corresponding to the first application.

With reference to the second aspect, in a first possible implementation manner, the running monitoring unit is specifically configured to monitor, by using a thread status pool, whether the first application on the terminal device is running, where the thread status pool is a system thread.

With reference to the second aspect or the first possible implementation manner of the second aspect, in a second possible implementation manner, the action monitoring unit is specifically configured to monitor the user's gesture, monitor the user's moving track, monitor the user's voice, and/or monitor a touch track performed by the user on a touch sensor included in the terminal device.

With reference to the second possible implementation manner of the second aspect, in a third possible implementation manner, the control unit is specifically configured to disable the first application if the running monitoring unit detects that the first application is running, and if the action monitoring unit detects that the touch track performed by the user on the touch sensor indicates that the running-state icon of the first application is flicked away so that the flicked-away running-state icon of the first application hits an edge of a screen; or the control unit is specifically configured to disable the first application if the running monitoring unit detects that the first application is running, and if the action monitoring unit detects that the touch track performed by the user on the touch sensor indicates that the running-state icon of the first application is clamped so that a crystal ball in which the running-state icon of the first application is shrouded is broken, where the running-state icon corresponding to the first application has a crystal ball shrouding effect, and the disabled-state icon corresponding to the first application does not have the crystal ball shrouding effect; or the control unit is specifically configured to disable, in batches, multiple sub-applications included in the first application if the running monitoring unit detects that the first application is running, and if the action monitoring unit detects that the touch track performed by the user on the touch sensor passes through the multiple sub-applications included in the first application at a moving speed greater than or equal to a first speed threshold.

With reference to the second possible implementation manner of the second aspect, in a fourth possible implementation manner, the control unit is specifically configured to:

if the running monitoring unit detects that the first application is running, match a touch end point of the touch track that is detected by the action monitoring unit and is performed by the user on the touch sensor with at least one standard touch point model of a first type, and if the matching succeeds, determine that the user action detected by the action monitoring unit meets the preset disabling condition corresponding to the first application, and disable the first application; or if the running monitoring unit detects that the first application is running, match a touch start point and a touch end point of the touch track that is detected by the action monitoring unit and is performed by the user on the touch sensor with at least one standard touch point model of a second type, and if the matching succeeds, determine that the user action detected by the action monitoring unit meets the preset disabling condition corresponding to the first application, and disable the first application; or if the running monitoring unit detects that the first application is running, determine a touch direction corresponding to the touch track that is detected by the action monitoring unit and is performed by the user on the touch sensor, match the determined touch direction with at least one standard touch track model of a first type, and if a deviation between the determined touch direction and a standard touch direction that is included in one standard touch track model of the at least one standard touch track model of the first type is less than a third threshold, determine that the user action detected by the action monitoring unit meets the preset disabling condition corresponding to the first application, and disable the first application; or if the running monitoring unit detects that the first application is running, determine a touch graph corresponding to the touch track that is detected by the action monitoring unit and is performed by the user on the touch sensor, match the determined touch graph with at least one standard touch track model of a second type, and if a similarity between the determined touch graph and a standard touch graph that is included in one standard touch track model of the second type of the at least one standard touch track model of the second type is greater than a fourth threshold, determine that the user action detected by the action monitoring unit meets the preset disabling condition corresponding to the first application, and disable the first application; or if the running monitoring unit detects that the first application is running, determine a moving direction corresponding to the user's moving track detected by the action monitoring unit by using a camera, match the determined moving direction with at least one standard moving track model of a first type, and if a deviation between the determined moving direction and a standard moving direction that corresponds to one standard moving track model of the at least one standard moving track model of the first type is less than or equal to a threshold m1, determine that the user action detected by the action monitoring unit meets the preset disabling condition corresponding to the first application, and disable the first application, where the terminal device further includes the camera; or if the running monitoring unit detects that the first application is running, determine a graph corresponding to the user's moving track detected by the action monitoring unit by using a camera, match the determined graph with at least one standard moving track model of a second type, and if a similarity between the determined graph and a standard graph that corresponds to one standard moving track model of the at least one standard moving track model of the second type is greater than or equal to a threshold m2, determine that the user action detected by the action monitoring unit meets the preset disabling condition corresponding to the first application, and disable the first application; or if the running monitoring unit detects that the first application is running, determine a motion rate corresponding to the user's moving track detected by the action monitoring unit by using a camera, match the determined motion rate with at least one standard moving track model of a third type, and if a deviation between the determined motion rate and a standard motion rate that corresponds to one standard moving track model of the at least one standard moving track model of the third type is less than or equal to a threshold m3, determine that the user action detected by the action monitoring unit meets the preset disabling condition corresponding to the first application, and disable the first application; or if the running monitoring unit detects that the first application is running, determine a motion rate corresponding to the user's moving track detected by the action monitoring unit by using a camera, match the determined motion rate with a preset standard moving track model of a third type, and if the determined motion rate is greater than, or equal to a standard motion rate corresponding to the preset standard moving track model of the third type, determine that the user action detected by the action monitoring unit meets the preset disabling condition corresponding to the first application, and disable the first application; or if the running monitoring unit detects that the first application is running, determine a motion rate corresponding to the user's moving track detected by the action monitoring unit by using a camera, match the determined motion rate with at least one standard moving track model of a fourth type, and if a deviation between the determined motion rate and at least one standard motion rate within a standard motion rate range that corresponds to one standard moving track model of the at least one standard moving track model of the fourth type is less than or equal to a threshold m4, determine that the user action detected by the action monitoring unit meets the preset disabling condition corresponding to the first application, and disable the first application; or if the running monitoring unit detects that the first application is running, determine a motion rate corresponding to the user's moving track detected by the action monitoring unit by using a camera, match the determined motion rate with a preset standard moving track model of a fourth type, and if the determined motion rate is greater than, or equal to at least one standard motion rate within a standard motion rate range that corresponds to the preset standard moving track model of the fourth type, determine that the user action detected by the action monitoring unit meets the preset disabling condition corresponding to the first application, and disable the first application; or if the running monitoring unit detects that the first application is running, determine a motion displacement corresponding to the user's moving track detected by the action monitoring unit by using a camera, match the determined motion displacement with at least one standard moving track model of a fifth type, and if a deviation between the determined motion displacement and a standard motion displacement that corresponds to one standard moving track model of the at least one standard moving track model of the fifth type is less than or equal to a threshold m5, determine that the user action detected by the action monitoring unit meets the preset disabling condition corresponding to the first application, and disable the first application; or if the running monitoring unit detects that the first application is running, determine a motion displacement corresponding to the user's moving track detected by the action monitoring unit by using a camera, match the determined motion displacement with a preset standard moving track model of a fifth type, and if the determined motion displacement is greater than, less than, or equal to a standard motion displacement corresponding to the preset standard moving track model of the fifth type, determine that the user action detected by the action monitoring unit meets the preset disabling condition corresponding to the first application, and disable the first application; or if the running monitoring unit detects that the first application is running, determine a motion displacement corresponding to the user's moving track detected by the action monitoring unit by using a camera, match the determined motion displacement with at least one standard moving track model of a sixth type, and if a deviation between the determined motion displacement and at least one standard motion displacement within a standard motion displacement range that corresponds to one standard moving track model of the at least one standard moving track model of the sixth type is less than or equal to a threshold m6, determine that the user action detected by the action monitoring unit meets the preset disabling condition corresponding to the first application, and disable the first application; or if the running monitoring unit detects that the first application is running, determine a motion displacement corresponding to the user's moving track detected by the action monitoring unit by using a camera, match the determined motion displacement with a preset standard moving track model of a sixth type, and if the determined motion displacement is greater than, less than, or equal to at least one standard motion displacement within a standard motion displacement range that corresponds to the preset standard moving track model of the sixth type, determine that the user action detected by the action monitoring unit meets the preset disabling condition corresponding to the first application, and disable the first application; or if the running monitoring unit detects that the first application is running, determine a motion duration corresponding to the user's moving track detected by the action monitoring unit by using a camera, match the determined motion duration with at least one standard moving track model of a seventh type, and if a deviation between the determined motion duration and a standard motion duration that corresponds to one standard moving track model of the at least one standard moving track model of the seventh type is less than or equal to a threshold m7, determine that the detected user action meets the preset disabling condition corresponding to the first application, and disable the first application; or if the running monitoring unit detects that the first application is running, determine a motion duration corresponding to the user's moving track detected by the action monitoring unit by using a camera, match the determined motion duration with a preset standard moving track model of a seventh type, and if the determined motion duration is greater than, less than, or equal to a standard motion duration corresponding to the preset standard moving track model of the seventh type, determine that the user action detected by the action monitoring unit meets the preset disabling condition corresponding to the first application, and disable the first application; or if the running monitoring unit detects that the first application is running, determine a motion duration corresponding to the user's moving track detected by the action monitoring unit by using a camera, match the determined motion duration with at least one standard moving track model of an eighth type, and if a deviation between the determined motion duration and at least one standard motion duration within a standard motion duration range that corresponds to one standard moving track model of the at least one standard moving track model of the eighth type is less than or equal to a threshold m8, determine that the user action detected by the action monitoring unit meets the preset disabling condition corresponding to the first application, and disable the first application; or if the running monitoring unit detects that the first application is running, determine a motion duration corresponding to the user's moving track detected by the action monitoring unit by using a camera, match the determined motion duration with a preset standard moving track model of an eighth type, and if the determined motion duration is greater than, less than, or equal to at least one standard motion duration within a standard motion duration range that corresponds to the preset standard moving track model of the eighth type, determine that the user action detected by the action monitoring unit meets the preset disabling condition corresponding to the first application, and disable the first application; or if the running monitoring unit detects that the first application is running, acquire a volume value corresponding to the user's voice detected by the action monitoring unit by using an audio monitoring apparatus, match the acquired volume value with at least one standard voice model of a first type, and if a deviation between the acquired volume value and a standard volume value that corresponds to one standard voice model of the at least one standard voice model of the first type is less than or equal to a threshold n1, determine that the user action detected by the action monitoring unit meets the preset disabling condition corresponding to the first application, and disable the first application, where the terminal device further includes the audio monitoring apparatus; or if the running monitoring unit detects that the first application is running, acquire a volume value corresponding to the user's voice detected by the action monitoring unit by using an audio monitoring apparatus, match the acquired volume value with a preset standard voice model of a first type, and if the acquired volume value is greater than, or equal to a standard volume value corresponding to the preset standard voice model of the first type, determine that the user action detected by the action monitoring unit meets the preset disabling condition corresponding to the first application, and disable the first application; or if the running monitoring unit detects that the first application is running, acquire a volume value corresponding to the user's voice detected by the action monitoring unit by using an audio monitoring apparatus, match the acquired volume value with at least one standard voice model of a second type, and if a deviation between the acquired volume value and at least one standard volume value within a standard volume value range that corresponds to one standard voice model of the at least one standard voice model of the second type is less than or equal to a threshold n2, determine that the user action detected by the action monitoring unit meets the preset disabling condition corresponding to the first application, and disable the first application; or if the running monitoring unit detects that the first application is running, acquire a volume value corresponding to the user's voice detected by the action monitoring unit by using an audio monitoring apparatus, match the acquired volume value with a preset standard voice model of a second type, and if the acquired volume value is greater than, or equal to at least one standard volume value within a standard volume value range that corresponds to the preset standard voice model of the second type, determine that the user action detected by the action monitoring unit meets the preset disabling condition corresponding to the first application, and disable the first application; or if the running monitoring unit detects that the first application is running, acquire an audio value corresponding to the user's voice detected by the action monitoring unit by using an audio monitoring apparatus, match the acquired audio value with at least one standard voice model of a third type, and if a deviation between the acquired audio value and a standard audio value that corresponds to one standard voice model of the at least one standard voice model of the third type is less than or equal to a threshold n3, determine that the user action detected by the action monitoring unit meets the preset disabling condition corresponding to the first application, and disable the first application; or if the running monitoring unit detects that the first application is running, acquire an audio value corresponding to the user's voice detected by the action monitoring unit by using the audio monitoring apparatus, match the acquired audio value with a preset standard voice model of a third type, and if the acquired audio value is greater than, or equal to a standard audio value corresponding to the preset standard voice model of the third type, determine that the user action detected by the action monitoring unit meets the preset disabling condition corresponding to the first application, and disable the first application; or if the running monitoring unit detects that the first application is running, acquire an audio value corresponding to the user's voice detected by the action monitoring unit by using an audio monitoring apparatus, match the acquired audio value with at least one standard voice model of a fourth type, and if a deviation between the acquired audio value and at least one standard audio value within a standard audio value range that corresponds to one standard voice model of the at least one standard voice model of the fourth type is less than or equal to a threshold n4, determine that the user action detected by the action monitoring unit meets the preset disabling condition corresponding to the first application, and disable the first application; or if the running monitoring unit detects that the first application is running, acquire an audio value corresponding to the user's voice detected by the action monitoring unit by using an audio monitoring apparatus, match the acquired audio value with a preset standard voice model of a fourth type, and if the acquired audio value is greater than, or equal to at least one standard audio value within a standard audio value range that corresponds to the preset standard voice model of the fourth type, determine that the user action detected by the action monitoring unit meets the preset disabling condition corresponding to the first application, and disable the first application; or if the running monitoring unit detects that the first application is running, acquire an audio variation trend corresponding to the user's voice detected by the action monitoring unit by using an audio monitoring apparatus, match the acquired audio variation trend with at least one standard voice model of a fifth type, and if the acquired audio variation trend is the same as a standard audio variation trend corresponding to one standard voice model of the at least one standard voice model of the fifth type, determine that the user action detected by the action monitoring unit meets the preset disabling condition corresponding to the first application, and disable the first application; or if the running monitoring unit detects that the first application is running, acquire a volume variation trend corresponding to the user's voice detected by the action monitoring unit by using an audio monitoring apparatus, match the acquired volume variation trend with at least one standard voice model of a sixth type, and if the acquired volume variation trend is the same as a standard volume variation trend corresponding to one standard voice model of the at least one standard voice model of the sixth type, determine that the user action detected by the action monitoring unit meets the preset disabling condition corresponding to the first application, and disable the first application; or if the running monitoring unit detects that the first application is running, acquire an audio variation rate corresponding to the user's voice detected by the action monitoring unit by using an audio monitoring apparatus, match the acquired audio variation rate with at least one standard voice model of a seventh type, and if a deviation between the acquired audio variation rate and a standard audio variation rate that corresponds to one standard voice model of the at least one standard voice model of the seventh type is less than or equal to a threshold n5, determine that the user action detected by the action monitoring unit meets the preset disabling condition corresponding to the first application, and disable the first application; or if the running monitoring unit detects that the first application is running, acquire an audio variation rate corresponding to the user's voice detected by the action monitoring unit by using an audio monitoring apparatus, match the acquired audio variation rate with a preset standard voice model of a seventh type, and if the acquired audio variation rate is greater than, or equal to a standard audio variation rate corresponding to the preset standard voice model of the seventh type, determine that the user action detected by the action monitoring unit meets the preset disabling condition corresponding to the first application, and disable the first application; or if the running monitoring unit detects that the first application is running, acquire an audio variation rate corresponding to the user's voice detected by the action monitoring unit by using an audio monitoring apparatus, match the acquired audio variation rate with at least one standard voice model of an eighth type, and if a deviation between the acquired audio variation rate and at least one standard audio variation rate within a standard audio variation rate range that corresponds to one standard voice model of the at least one standard voice model of the eighth type is less than or equal to a threshold n6, determine that the user action detected by the action monitoring unit meets the preset disabling condition corresponding to the first application, and disable the first application; or if the running monitoring unit detects that the first application is running, acquire an audio variation rate corresponding to the user's voice detected by the action monitoring unit by using an audio monitoring apparatus, match the acquired audio variation rate with a preset standard voice model of an eighth type, and if the acquired audio variation rate is greater than, or equal to at least one standard audio variation rate within a standard audio variation rate range that corresponds to the preset standard voice model of the eighth type, determine that the user action detected by the action monitoring unit meets the preset disabling condition corresponding to the first application, and disable the first application; or if the running monitoring unit detects that the first application is running, acquire a volume variation rate corresponding to the user's voice detected by the action monitoring unit by using an audio monitoring apparatus, match the acquired volume variation rate with at least one standard voice model of a ninth type, and if a deviation between the acquired volume variation rate and a standard volume variation rate that corresponds to one standard voice model of the at least one standard voice model of the ninth type is less than or equal to a threshold n7, determine that the user action detected by the action monitoring unit meets the preset disabling condition corresponding to the first application, and disable the first application; or if the running monitoring unit detects that the first application is running, acquire a volume variation rate corresponding to the user's voice detected by the action monitoring unit by using an audio monitoring apparatus, match the acquired volume variation rate with a preset standard voice model of a ninth type, and if the acquired volume variation rate is greater than, or equal to a standard volume variation rate corresponding to the preset standard voice model of the ninth type, determine that the user action detected by the action monitoring unit meets the preset disabling condition corresponding to the first application, and disable the first application; or if the running monitoring unit detects that the first application is running, acquire a volume variation rate corresponding to the user's voice detected by the action monitoring unit by using an audio monitoring apparatus, match the acquired volume variation rate with at least one standard voice model of a tenth type, and if a deviation between the acquired volume variation rate and at least one standard volume variation rate within a standard volume variation rate range that corresponds to one standard voice model of the at least one standard voice model of the tenth type is less than or equal to a threshold n8, determine that the user action detected by the action monitoring unit meets the preset disabling condition corresponding to the first application, and disable the first application; or if the running monitoring unit detects that the first application is running, acquire a volume variation rate corresponding to the user's voice detected by the action monitoring unit by using an audio monitoring apparatus, match the acquired volume variation rate with a preset standard voice model of a tenth type, and if the acquired volume variation rate is greater than, or equal to at least one standard volume variation rate within a standard volume variation rate range that corresponds to the preset standard voice model of the tenth type, determine that the user action detected by the action monitoring unit meets the preset disabling condition corresponding to the first application, and disable the first application; or if the running monitoring unit detects that the first application is running, acquire a duration corresponding to the user's voice detected by the action monitoring unit by using an audio monitoring apparatus, match the acquired duration with at least one standard voice model of an eleventh type, and if a deviation between the acquired duration and a standard duration that corresponds to one standard voice model of the at least one standard voice model of the eleventh type is less than or equal to a threshold $n9$, determine that the user action detected by the action monitoring unit meets the preset disabling condition corresponding to the first application, and disable the first application; or if the running monitoring unit detects that the first application is running, acquire a duration corresponding to the user's voice detected by the action monitoring unit by using an audio monitoring apparatus, match the acquired duration with a preset standard voice model of an eleventh type, and if the acquired duration is greater than, or equal to a standard duration corresponding to the preset standard voice model of the eleventh type, determine that the user action detected by the action monitoring unit meets the preset disabling condition corresponding to the first application, and disable the first application; or if the running monitoring unit detects that the first application is running, acquire a duration corresponding to the user's voice detected by the action monitoring unit by using an audio monitoring apparatus, match the acquired duration with at least one standard voice model of a twelfth type, and if a deviation between the acquired duration and at least one standard duration within a standard duration range that corresponds to one standard voice model of the at least one standard voice model of the twelfth type is less than or equal to a threshold $n10$, determine that the user action detected by the action monitoring unit meets the preset disabling condition corresponding to the first application, and disable the first application; or if the running monitoring unit detects that the first application is running, acquire a duration corresponding to the user's voice detected by the action monitoring unit by using an audio monitoring apparatus, match the acquired duration with a preset standard voice model of a twelfth type, and if the acquired duration is greater than, or equal to at least one standard duration within a standard duration range that corresponds to the preset standard voice model of the twelfth type, determine that the user action detected by the action monitoring unit meets the preset disabling condition corresponding to the first application, and disable the first application; or if the running monitoring unit detects that the first application is running, convert the user's voice detected by the action monitoring unit by using an audio monitoring apparatus into a corresponding digital voice signal, match the digital voice signal obtained after conversion with at least one standard voice model of a thirteenth type, and if a deviation between the digital voice signal and a standard digital voice signal that corresponds to one standard voice model of the at least one standard voice model of the thirteenth type is less than or equal to a threshold $n11$, determine that the user action detected by the action monitoring unit meets the preset disabling condition corresponding to the first application, and disable the first application.

According to a third aspect, an embodiment of the present invention provides a terminal device, including a device screen and a threading module, where the threading module is connected to the device screen, where:

the threading module is configured to: monitor whether a first application on the terminal device is running, and monitor a user's action of operating a desktop of the terminal device; and if it is detected that the first application is running, control the device screen to display a running-state icon corresponding to the first application, and disable the first application if it is detected that the first application is running and the detected user action meets a preset disabling condition corresponding to the first application; or if it is detected that the first application is in a disabled state, control the device screen to display a disabled-state icon corresponding to the first application; and the device screen is configured to display, under the control of the threading module, the running-state icon corresponding to the first application or the disabled-state icon corresponding to the first application, where the running-state icon corresponding to the first application and the disabled-state icon corresponding to the first application have different appearances.

With reference to the third aspect, in a first possible implementation manner, the device screen is a touch sensor, or the terminal device further includes a touch sensor; and in the aspect of monitoring the user's action of operating the desktop of the terminal device, the threading module is specifically configured to monitor the user's gesture, monitor the user's moving track, monitor the user's voice, and/or monitor a touch track performed by the user on the touch sensor.

With reference to the first possible implementation manner of the third aspect, in a second possible implementation manner, in the aspect of disabling the first application if it is detected that the first application is running and the detected user action meets the preset disabling condition corresponding to the first application, the threading module is specifically configured to disable the first application if it is detected that the first application is running, and if it is detected that the touch track performed by the user on the touch sensor indicates that the running-state icon of the first application is flicked away so that the flicked-away running-state icon of the first application hits an edge of a screen; or disable the first application if it is detected that the first application is running, and if it is detected that the touch track performed by the user on the touch sensor indicates that the running-state icon of the first application is clamped so that a crystal ball in which the running-state icon of the first application is shrouded is broken, where the running-state icon corresponding to the first application has a crystal ball shrouding effect, and the disabled-state icon corresponding to the first application does not have the crystal ball shrouding effect; or disable, in batches, multiple sub-applications included in the first application if it is detected that the first application is running, and if it is detected that the touch track performed by the user on the touch sensor passes through the multiple sub-applications included in the first application at a moving speed greater than or equal to a first speed threshold.

With reference to the first possible implementation manner of the third aspect, in a second possible implementation manner, the threading module determines, according to any one of the following manners, that the detected user action meets the preset disabling condition corresponding to the first application:

matching a touch end point of the detected touch track performed by the user on the touch sensor with at least one standard touch point model of a first type, and if the matching succeeds, determining that the detected user action meets the preset disabling condition corresponding to the first application; or matching a touch start point and a touch end point of the detected touch track performed by the user on the touch sensor with at least one standard touch point model of a second type, and if the matching succeeds, determining that the detected user action meets the preset disabling condition corresponding to the first application; or determining a touch direction corresponding to the detected touch track performed by the user on the touch sensor, matching the determined touch direction with at least one standard touch track model of a first type, and if a deviation between the determined touch direction and a standard touch direction that is included in one standard touch track model of the at least one standard touch track model of the first type is less than a third threshold, determining that the detected user action meets the preset disabling condition corresponding to the first application; or determining a touch graph corresponding to the detected touch track performed by the user on the touch sensor, matching the determined touch graph with at least one standard touch track model of a second type, and if a similarity between the determined touch graph and a standard touch graph that is included in one standard touch track model of the second type of the at least one standard touch track model of the second type is greater than a fourth threshold, determining that the detected user action meets the preset disabling condition corresponding to the first application; or determining a moving direction corresponding to the user's moving track detected by using a camera, matching the determined moving direction with at least one standard moving track model of a first type, and if a deviation between the determined moving direction and a standard moving direction that corresponds to one standard moving track model of the at least one standard moving track model of the first type is less than or equal to a threshold m1, determining that the detected user action meets the preset disabling condition corresponding to the first application, where the terminal device further includes the camera; or determining a graph corresponding to the user's moving track detected by using a camera, matching the determined graph with at least one standard moving track model of a second type, and if a similarity between the determined graph and a standard graph that corresponds to one standard moving track model of the at least one standard moving track model of the second type is greater than or equal to a threshold m2, determining that the detected user action meets the preset disabling condition corresponding to the first application; or determining a motion rate corresponding to the user's moving track detected by using a camera, matching the determined motion rate with at least one standard moving track model of a third type, and if a deviation between the determined motion rate and a standard motion rate that corresponds to one standard moving track model of the at least one standard moving track model of the third type is less than or equal to a threshold m3, determining that the detected user action meets the preset disabling condition corresponding to the first application; or determining a motion rate corresponding to the user's moving track detected by using a camera, matching the determined motion rate with a preset standard moving track model of a third type, and if the determined motion rate is greater than, or equal to a standard motion rate corresponding to the preset standard moving track model of the third type, determining that the detected user action meets the preset disabling condition corresponding to the first application; or determining a motion rate corresponding to the user's moving track detected by using a camera, matching the determined motion rate with at least one standard moving track model of a fourth type, and if a deviation between the determined motion rate and at least one standard motion rate within a standard motion rate range that corresponds to one standard moving track model of the at least one standard moving track model of the fourth type is less than or equal to a threshold m4, determining that the detected user action meets the preset disabling condition corresponding to the first application; or determining a motion rate corresponding to the user's moving track detected by using a camera, matching the determined motion rate with a preset standard moving track model of a fourth type, and if the determined motion rate is greater than, or equal to at least one standard motion rate within a standard motion rate range that corresponds to the preset standard moving track model of the fourth type, determining that the detected user action meets the preset disabling condition corresponding to the first application; or determining a motion displacement corresponding to the user's moving track detected by using a camera, matching the determined motion displacement with at least one standard moving track model of a fifth type, and if a deviation between the determined motion displacement and a standard motion displacement that corresponds to one standard moving track model of the at least one standard moving track model of the fifth type is less than or equal to a threshold m5, determining that the detected user action meets the preset disabling condition corresponding to the first application; or determining a motion displacement corresponding to the user's moving track detected by using a camera, matching the determined motion displacement with a preset standard moving track model of a fifth type, and if the determined motion displacement is greater than, less than, or equal to a standard motion displacement corresponding to the preset standard moving track model of the fifth type, determining that the detected user action meets the preset disabling condition corresponding to the first application; or determining a motion displacement corresponding to the user's moving track detected by using a camera, matching the determined motion displacement with at least one standard moving track model of a sixth type, and if a deviation between the determined motion displacement and at least one standard motion displacement within a standard motion displacement range that corresponds to one standard moving track model of the at least one standard moving track model of the sixth type is less than or equal to a threshold m6, determining that the detected user action meets the preset disabling condition corresponding to the first application; or determining a motion displacement corresponding to the user's moving track detected by using a camera, matching the determined motion displacement with a preset standard moving track model of a sixth type, and if the determined motion displacement is greater than, less than, or equal to at least one standard motion displacement within a standard motion displacement range that corresponds to the preset standard moving track model of the sixth type, determining that the detected user action meets the preset disabling condition corresponding to the first application; or determining a motion duration corresponding to the user's moving track detected by using a camera, matching the determined motion duration with at least one standard moving track model of a seventh type, and if a deviation between the determined motion duration and a standard motion duration that corresponds to one standard moving track model of the at least one standard moving track model of the seventh type is less than or equal to a threshold m7, determining that the detected user action meets the preset disabling condition corresponding to the first application; or determining a motion duration corresponding to the user's moving track detected by using a camera, matching the determined motion duration with a preset standard moving track model of a seventh type, and if the determined motion duration is greater than, less than, or equal to a standard motion duration corresponding to the preset standard moving track model of the seventh type, determining that the detected user action meets the preset disabling condition corresponding to the first application; or determining a motion duration corresponding to the user's moving track detected by using a camera, matching the determined motion duration with at least one standard moving track model of an eighth type, and if a deviation between the determined motion duration and at least one standard motion duration within a standard motion duration range that corresponds to one standard moving track model of the at least one standard moving track model of the eighth type is less than or equal to a threshold m8, determining that the detected user action meets the preset disabling condition corresponding to the first application; or determining a motion duration corresponding to the user's moving track detected by using a camera, matching the determined motion duration with a preset standard moving track model of an eighth type, and if the determined motion duration is greater than, less than, or equal to at least one standard motion duration within a standard motion duration range that corresponds to the preset standard moving track model of the eighth type, determining that the detected user action meets the preset disabling condition corresponding to the first application; or acquiring a volume value corresponding to the user's voice detected by using an audio monitoring apparatus, matching the acquired volume value with at least one standard voice model of a first type, and if a deviation between the acquired volume value and a standard volume value that corresponds to one standard voice model of the at least one standard voice model of the first type is less than or equal to a threshold n1, determining that the detected user action meets the preset disabling condition corresponding to the first application, where the terminal device further includes the audio monitoring apparatus; or acquiring a volume value corresponding to the user's voice detected by using an audio monitoring apparatus, matching the acquired volume value with a preset standard voice model of a first type, and if the acquired volume value is greater than, or equal to a standard volume value corresponding to the preset standard voice model of the first type, determining that the detected user action meets the preset disabling condition corresponding to the first application; or acquiring a volume value corresponding to the user's voice detected by using an audio monitoring apparatus, matching the acquired volume value with at least one standard voice model of a second type, and if a deviation between the acquired volume value and at least one standard volume value within a standard volume value range that corresponds to one standard voice model of the at least one standard voice model of the second type is less than or equal to a threshold n2, determining that the detected user action meets the preset disabling condition corresponding to the first application; or acquiring a volume value corresponding to the user's voice detected by using an audio monitoring apparatus, matching the acquired volume value with a preset standard voice model of a second type, and if the acquired volume value is greater than, or equal to at least one standard volume value within a standard volume value range that corresponds to the preset standard voice model of the second type, determining that the detected user action meets the preset disabling condition corresponding to the first application; or acquiring an audio value corresponding to the user's voice detected by using an audio monitoring apparatus, matching the acquired audio value with at least one standard voice model of a third type, and if a deviation between the acquired audio value and a standard audio value that corresponds to one standard voice model of the at least one standard voice model of the third type is less than or equal to a threshold n3, determining that the detected user action meets the preset disabling condition corresponding to the first application; or acquiring an audio value corresponding to the user's voice detected by using an audio monitoring apparatus, matching the acquired audio value with a preset standard voice model of a third type, and if the acquired audio value is greater than, or equal to a standard audio value corresponding to the preset standard voice model of the third type, determining that the detected user action meets the preset disabling condition corresponding to the first application; or acquiring an audio value corresponding to the user's voice detected by using an audio monitoring apparatus, matching the acquired audio value with at least one standard voice model of a fourth type, and if a deviation between the acquired audio value and at least one standard audio value within a standard audio value range that corresponds to one standard voice model of the at least one standard voice model of the fourth type is less than or equal to a threshold n4, determining that the detected user action meets the preset disabling condition corresponding to the first application; or acquiring an audio value corresponding to the user's voice detected by using an audio monitoring apparatus, matching the acquired audio value with a preset standard voice model of a fourth type, and if the acquired audio value is greater than, or equal to at least one standard audio value within a standard audio value range that corresponds to the preset standard voice model of the fourth type, determining that the detected user action meets the preset disabling condition corresponding to the first application; or acquiring an audio variation trend corresponding to the user's voice detected by using an audio monitoring apparatus, matching the acquired audio variation trend with at least one standard voice model of a fifth type, and if the acquired audio variation trend is the same as a standard audio variation trend corresponding to one standard voice model of the at least one standard voice model of the fifth type, determining that the detected user action meets the preset disabling condition corresponding to the first application; or acquiring a volume variation trend corresponding to the user's voice detected by using an audio monitoring apparatus, matching the acquired volume variation trend with at least one standard voice model of a sixth type, and if the acquired volume variation trend is the same as a standard volume variation trend corresponding to one standard voice model of the at least one standard voice model of the sixth type, determining that the detected user action meets the preset disabling condition corresponding to the first application; or acquiring an audio variation rate corresponding to the user's voice detected by using an audio monitoring apparatus, matching the acquired audio variation rate with at least one standard voice model of a seventh type, and if a deviation between the acquired audio variation rate and a standard audio variation rate that corresponds to one standard voice model of the at least one standard voice model of the seventh type is less than or equal to a threshold n5, determining that the detected user action meets the preset disabling condition corresponding to the first application; or acquiring an audio variation rate corresponding to the user's voice detected by using an audio monitoring apparatus, matching the acquired audio variation rate with a preset standard voice model of a seventh type, and if the acquired audio variation rate is greater than, or equal to a standard audio variation rate corresponding to the preset standard voice model of the seventh type, determining that the detected user action meets the preset disabling condition corresponding to the first application; or acquiring an audio variation rate corresponding to the user's voice detected by using an audio monitoring apparatus, matching the acquired audio variation rate with at least one standard voice model of an eighth type, and if a deviation between the acquired audio variation rate and at least one standard audio variation rate within a standard audio variation rate range that corresponds to one standard voice model of the at least one standard voice model of the eighth type is less than or equal to a threshold n6, determining that the detected user action meets the preset disabling condition corresponding to the first application; or acquiring an audio variation rate corresponding to the user's voice detected by using an audio monitoring apparatus, matching the acquired audio variation rate with a preset standard voice model of an eighth type, and if the acquired audio variation rate is greater than, or equal to at least one standard audio variation rate within a standard audio variation rate range that corresponds to the preset standard voice model of the eighth type, determining that the detected user action meets the preset disabling condition corresponding to the first application; or acquiring a volume variation rate corresponding to the user's voice detected by using an audio monitoring apparatus, matching the acquired volume variation rate with at least one standard voice model of a ninth type, and if a deviation between the acquired volume variation rate and a standard volume variation rate that corresponds to one standard voice model of the at least one standard voice model of the ninth type is less than or equal to a threshold n7, determining that the detected user action meets the preset disabling condition corresponding to the first application; or acquiring a volume variation rate corresponding to the user's voice detected by using an audio monitoring apparatus, matching the acquired volume variation rate with a preset standard voice model of a ninth type, and if the acquired volume variation rate is greater than, or equal to a standard volume variation rate corresponding to the preset standard voice model of the ninth type, determining that the detected user action meets the preset disabling condition corresponding to the first application; or acquiring a volume variation rate corresponding to the user's voice detected by using an audio monitoring apparatus, matching the acquired volume variation rate with at least one standard voice model of a tenth type, and if a deviation between the acquired volume variation rate and at least one standard volume variation rate within a standard volume variation rate range that corresponds to one standard voice model of the at least one standard voice model of the tenth type is less than or equal to a threshold n8, determining that the detected user action meets the preset disabling condition corresponding to the first application; or acquiring a volume variation rate corresponding to the user's voice detected by using an audio monitoring apparatus, matching the acquired volume variation rate with a preset standard voice model of a tenth type, and if the acquired volume variation rate is greater than, or equal to at least one standard volume variation rate within a standard volume variation rate range that corresponds to the preset standard voice model of the tenth type, determining that the detected user action meets the preset disabling condition corresponding to the first application; or acquiring a duration corresponding to the user's voice detected by using an audio monitoring apparatus, matching the acquired duration with at least one standard voice model of an eleventh type, and if a deviation between the acquired duration and a standard duration that corresponds to one standard voice model of the at least one standard voice model of the eleventh type is less than or equal to a threshold n9, determining that the detected user action meets the preset disabling condition corresponding to the first application; or acquiring a duration corresponding to the user's voice detected by using an audio monitoring apparatus, matching the acquired duration with a preset standard voice model of an eleventh type, and if the acquired duration is greater than, or equal to a standard duration corresponding to the preset standard voice model of the eleventh type, determining that the detected user action meets the preset disabling condition corresponding to the first application; or acquiring a duration corresponding to the user's voice detected by using an audio monitoring apparatus, matching the acquired duration with at least one standard voice model of a twelfth type, and if a deviation between the acquired duration and at least one standard duration within a standard duration range that corresponds to one standard voice model of the at least one standard voice model of the twelfth type is less than or equal to a threshold n10, determining that the detected user action meets the preset disabling condition corresponding to the first application; or acquiring a duration corresponding to the user's voice detected by using an audio monitoring apparatus, matching the acquired duration with a preset standard voice model of a twelfth type, and if the acquired duration is greater than, or equal to at least one standard duration within a standard duration range that corresponds to the preset standard voice model of the twelfth type, determining that the detected user action meets the preset disabling condition corresponding to the first application; or converting the user's voice detected by using an audio monitoring apparatus into a corresponding digital voice signal, matching the digital voice signal obtained after conversion with at least one standard voice model of a thirteenth type, and if a deviation between the digital voice signal and a standard digital voice signal that corresponds to one standard voice model of the at least one standard voice model of the thirteenth type is less than or equal to a threshold n11, determining that the detected user action meets the preset disabling condition corresponding to the first application.

According to a fourth aspect, the present invention provides a terminal device, including a threador and a memory, where:

the threador invokes code stored in the memory, so as to: monitor whether a first application on the terminal device is running, and monitor a user's action of operating a desktop of the terminal device; and display, on the desktop of the terminal device, a running-state icon corresponding to the first application if it is detected that the first application is running, and disable the first application if it is detected that the first application is running and the detected user action meets a preset disabling condition corresponding to the first application; or display, on the desktop of the terminal device, a disabled-state icon corresponding to the first application if it is detected that the first application is in a disabled state, where the running-state icon corresponding to the first application and the disabled-state icon corresponding to the first application have different appearances.

With reference to the fourth aspect, in a first possible implementation manner of the fourth aspect, in the aspect of monitoring whether the first application on the terminal device is running, the threador is specifically configured to monitor, by using a thread status pool, whether the first application on the terminal device is running, where the thread status pool is a system thread.

With reference to the fourth aspect or the first possible implementation manner of the fourth aspect, in a second possible implementation manner of the fourth aspect, current memory usage of the first application is displayed in the running-state icon corresponding to the first application.

With reference to the fourth aspect, or the first possible implementation manner of the fourth aspect, or the second possible implementation manner of the fourth aspect, in a third possible implementation manner of the fourth aspect, the threador is further configured to set a status of the first application to a protected state or an unprotected state according to a user instruction or a preset policy.

With reference to the third possible implementation manner of the fourth aspect, in a fourth possible implementation manner of the fourth aspect, in the aspect of disabling the first application if it is detected that the first application is running and the detected user action meets the preset disabling condition corresponding to the first application, the threador is specifically configured to disable the first application if it is detected that the first application is running, the first application is currently in the unprotected state, and the detected user action meets the preset disabling condition corresponding to the first application.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, in a fifth possible implementation manner of the fourth aspect, in the aspect of monitoring the user's action of operating the desktop of the terminal device, the threador is specifically configured to monitor the user's gesture, monitor the user's moving track, monitor the user's voice, and/or monitor a touch track performed by the user on a touch sensor included in the terminal device.

With reference to the fifth possible implementation manner of the fourth aspect, in a sixth possible implementation manner of the fourth aspect, in the aspect of disabling the first application if the detected user action meets the preset disabling condition corresponding to the first application, the threador is specifically configured to disable the first application if it is detected that the touch track performed by the user on the touch sensor included in the terminal device indicates that the running-state icon of the first application is flicked away so that the flicked-away running-state icon of the first application hits an edge of a screen; or in the aspect of disabling the first application if the detected user action meets the preset disabling condition corresponding to the first application, the threador is specifically configured to disable the first application if it is detected that the touch track performed by the user on the touch sensor included in the terminal device indicates that the running-state icon of the first application is clamped so that a crystal ball in which the running-state icon of the first application is shrouded is broken, where the running-state icon corresponding to the first application has a crystal ball shrouding effect, and the disabled-state icon corresponding to the first application does not have the crystal ball shrouding effect; or the first application includes multiple sub-applications, and in the aspect of disabling the first application if the detected user action meets the preset disabling condition corresponding to the first application, the threador is specifically configured to disable, in batches, the multiple sub-applications included in the first application if it is detected that the touch track performed by the user on the touch sensor included in the terminal device passes through the multiple sub-applications included in the first application at a moving speed greater than or equal to a first speed threshold.

With reference to the fifth possible implementation manner of the fourth aspect, in a seventh possible implementation manner of the fourth aspect, that the user action detected by the threador meets the preset disabling condition corresponding to the first application is determined by using any one of the following methods:

matching a touch end point of the detected touch track performed by the user on the touch sensor included in the terminal device with at least one standard touch point model of a first type, and if the matching succeeds, determining that the detected user action meets the preset disabling condition corresponding to the first application; or matching a touch start point and a touch end point of the detected touch track performed by the user on the touch sensor included in the terminal device with at least one standard touch point model of a second type, and if the matching succeeds, determining that the detected user action meets the preset disabling condition corresponding to the first application; or determining a touch direction corresponding to the detected touch track performed by the user on the touch sensor included in the terminal device, matching the determined touch direction with at least one standard touch track model of a first type, and if a deviation between the determined touch direction and a standard touch direction that is included in one standard touch track model of the at least one standard touch track model of the first type is less than a third threshold, determining that the detected user action meets the preset disabling condition corresponding to the first application; or determining a touch graph corresponding to the detected touch track performed by the user on the touch sensor included in the terminal device, matching the determined touch graph with at least one standard touch track model of a second type, and if a similarity between the determined touch graph and a standard touch graph that is included in one standard touch track model of the second type of the at least one standard touch track model of the second type is greater than a fourth threshold, determining that the detected user action meets the preset disabling condition corresponding to the first application; or determining a moving direction corresponding to the user's moving track detected by using a camera included in the terminal device, matching the determined moving direction with at least one standard moving track model of a first type, and if a deviation between the determined moving direction and a standard moving direction that corresponds to one standard moving track model of the at least one standard moving track model of the first type is less than or equal to a threshold m1, determining that the detected user action meets the preset disabling condition corresponding to the first application; or determining a graph corresponding to the user's moving track detected by using a camera included in the terminal device, matching the determined graph with at least one standard moving track model of a second type, and if a similarity between the determined graph and a standard graph that corresponds to one standard moving track model of the at least one standard moving track model of the second type is greater than or equal to a threshold m2, determining that the detected user action meets the preset disabling condition corresponding to the first application; or determining a motion rate corresponding to the user's moving track detected by using a camera included in the terminal device, matching the determined motion rate with at least one standard moving track model of a third type, and if a deviation between the determined motion rate and a standard motion rate that corresponds to one standard moving track model of the at least one standard moving track model of the third type is less than or equal to a threshold m3, determining that the detected user action meets the preset disabling condition corresponding to the first application; or determining a motion rate corresponding to the user's moving track detected by using a camera included in the terminal device, matching the determined motion rate with a preset standard moving track model of a third type, and if the determined motion rate is greater than, or equal to a standard motion rate corresponding to the preset standard moving track model of the third type, determining that the detected user action meets the preset disabling condition corresponding to the first application; or determining a motion rate corresponding to the user's moving track detected by using a camera included in the terminal device, matching the determined motion rate with at least one standard moving track model of a fourth type, and if a deviation between the determined motion rate and at least one standard motion rate within a standard motion rate range that corresponds to one standard moving track model of the at least one standard moving track model of the fourth type is less than or equal to a threshold m4, determining that the detected user action meets the preset disabling condition corresponding to the first application; or determining a motion rate corresponding to the user's moving track detected by using a camera included in the terminal device, matching the determined motion rate with a preset standard moving track model of a fourth type, and if the determined motion rate is greater than, or equal to at least one standard motion rate within a standard motion rate range that corresponds to the preset standard moving track model of the fourth type, determining that the detected user action meets the preset disabling condition corresponding to the first application; or determining a motion displacement corresponding to the user's moving track detected by using a camera included in the terminal device, matching the determined motion displacement with at least one standard moving track model of a fifth type, and if a deviation between the determined motion displacement and a standard motion displacement that corresponds to one standard moving track model of the at least one standard moving track model of the fifth type is less than or equal to a threshold m5, determining that the detected user action meets the preset disabling condition corresponding to the first application; or determining a motion displacement corresponding to the user's moving track detected by using a camera included in the terminal device, matching the determined motion displacement with a preset standard moving track model of a fifth type, and if the determined motion displacement is greater than, less than, or equal to a standard motion displacement corresponding to the preset standard moving track model of the fifth type, determining that the detected user action meets the preset disabling condition corresponding to the first application; or determining a motion displacement corresponding to the user's moving track detected by using a camera included in the terminal device, matching the determined motion displacement with at least one standard moving track model of a sixth type, and if a deviation between the determined motion displacement and at least one standard motion displacement within a standard motion displacement range that corresponds to one standard moving track model of the at least one standard moving track model of the sixth type is less than or equal to a threshold m6, determining that the detected user action meets the preset disabling condition corresponding to the first application; or determining a motion displacement corresponding to the user's moving track detected by using a camera included in the terminal device, matching the determined motion displacement with a preset standard moving track model of a sixth type, and if the determined motion displacement is greater than, less than, or equal to at least one standard motion displacement within a standard motion displacement range that corresponds to the preset standard moving track model of the sixth type, determining that the detected user action meets the preset disabling condition corresponding to the first application; or determining a motion duration corresponding to the user's moving track detected by using a camera included in the terminal device, matching the determined motion duration with at least one standard moving track model of a seventh type, and if a deviation between the determined motion duration and a standard motion duration that corresponds to one standard moving track model of the at least one standard moving track model of the seventh type is less than or equal to a threshold m7, determining that the detected user action meets the preset disabling condition corresponding to the first application; or determining a motion duration corresponding to the user's moving track detected by using a camera included in the terminal device, matching the determined motion duration with a preset standard moving track model of a seventh type, and if the determined motion duration is greater than, less than, or equal to a standard motion duration corresponding to the preset standard moving track model of the seventh type, determining that the detected user action meets the preset disabling condition corresponding to the first application; or determining a motion duration corresponding to the user's moving track detected by using a camera included in the terminal device, matching the determined motion duration with at least one standard moving track model of an eighth type, and if a deviation between the determined motion duration and at least one standard motion duration within a standard motion duration range that corresponds to one standard moving track model of the at least one standard moving track model of the eighth type is less than or equal to a threshold m8, determining that the detected user action meets the preset disabling condition corresponding to the first application; or determining a motion duration corresponding to the user's moving track detected by using a camera included in the terminal device, matching the determined motion duration with a preset standard moving track model of an eighth type, and if the determined motion duration is greater than, less than, or equal to at least one standard motion duration within a standard motion duration range that corresponds to the preset standard moving track model of the eighth type, determining that the detected user action meets the preset disabling condition corresponding to the first application; or acquiring a volume value corresponding to the user's voice detected by using an audio monitoring apparatus included in the terminal device, matching the acquired volume value with at least one standard voice model of a first type, and if a deviation between the acquired volume value and a standard volume value that corresponds to one standard voice model of the at least one standard voice model of the first type is less than or equal to a threshold n1, determining that the detected user action meets the preset disabling condition corresponding to the first application; or acquiring a volume value corresponding to the user's voice detected by using an audio monitoring apparatus included in the terminal device, matching the acquired volume value with a preset standard voice model of a first type, and if the acquired volume value is greater than, or equal to a standard volume value corresponding to the preset standard voice model of the first type, determining that the detected user action meets the preset disabling condition corresponding to the first application; or acquiring a volume value corresponding to the user's voice detected by using an audio monitoring apparatus included in the terminal device, matching the acquired volume value with at least one standard voice model of a second type, and if a deviation between the acquired volume value and at least one standard volume value within a standard volume value range that corresponds to one standard voice model of the at least one standard voice model of the second type is less than or equal to a threshold n2, determining that the detected user action meets the preset disabling condition corresponding to the first application; or acquiring a volume value corresponding to the user's voice detected by using an audio monitoring apparatus included in the terminal device, matching the acquired volume value with a preset standard voice model of a second type, and if the acquired volume value is greater than, or equal to at least one standard volume value within a standard volume value range that corresponds to the preset standard voice model of the second type, determining that the detected user action meets the preset disabling condition corresponding to the first application; or acquiring an audio value corresponding to the user's voice detected by using an audio monitoring apparatus included in the terminal device, matching the acquired audio value with at least one standard voice model of a third type, and if a deviation between the acquired audio value and a standard audio value that corresponds to one standard voice model of the at least one standard voice model of the third type is less than or equal to a threshold n3, determining that the detected user action meets the preset disabling condition corresponding to the first application; or acquiring an audio value corresponding to the user's voice detected by using an audio monitoring apparatus included in the terminal device, matching the acquired audio value with a preset standard voice model of a third type, and if the acquired audio value is greater than, or equal to a standard audio value corresponding to the preset standard voice model of the third type, determining that the detected user action meets the preset disabling condition corresponding to the first application; or acquiring an audio value corresponding to the user's voice detected by using an audio monitoring apparatus included in the terminal device, matching the acquired audio value with at least one standard voice model of a fourth type, and if a deviation between the acquired audio value and at least one standard audio value within a standard audio value range that corresponds to one standard voice model of the at least one standard voice model of the fourth type is less than or equal to a threshold n4, determining that the detected user action meets the preset disabling condition corresponding to the first application; or acquiring an audio value corresponding to the user's voice detected by using an audio monitoring apparatus included in the terminal device, matching the acquired audio value with a preset standard voice model of a fourth type, and if the acquired audio value is greater than, or equal to at least one standard audio value within a standard audio value range that corresponds to the preset standard voice model of the fourth type, determining that the detected user action meets the preset disabling condition corresponding to the first application; or acquiring an audio variation trend corresponding to the user's voice detected by using an audio monitoring apparatus included in the terminal device, matching the acquired audio variation trend with at least one standard voice model of a fifth type, and if the acquired audio variation trend is the same as a standard audio variation trend corresponding to one standard voice model of the at least one standard voice model of the fifth type, determining that the detected user action meets the preset disabling condition corresponding to the first application; or acquiring a volume variation trend corresponding to the user's voice detected by using an audio monitoring apparatus included in the terminal device, matching the acquired volume variation trend with at least one standard voice model of a sixth type, and if the acquired volume variation trend is the same as a standard volume variation trend corresponding to one standard voice model of the at least one standard voice model of the sixth type, determining that the detected user action meets the preset disabling condition corresponding to the first application; or acquiring an audio variation rate corresponding to the user's voice detected by using an audio monitoring apparatus included in the terminal device, matching the acquired audio variation rate with at least one standard voice model of a seventh type, and if a deviation between the acquired audio variation rate and a standard audio variation rate that corresponds to one standard voice model of the at least one standard voice model of the seventh type is less than or equal to a threshold n5, determining that the detected user action meets the preset disabling condition corresponding to the first application; or acquiring an audio variation rate corresponding to the user's voice detected by using an audio monitoring apparatus included in the terminal device, matching the acquired audio variation rate with a preset standard voice model of a seventh type, and if the acquired audio variation rate is greater than, or equal to a standard audio variation rate corresponding to the preset standard voice model of the seventh type, determining that the detected user action meets the preset disabling condition corresponding to the first application; or acquiring an audio variation rate corresponding to the user's voice detected by using an audio monitoring apparatus included in the terminal device, matching the acquired audio variation rate with at least one standard voice model of an eighth type, and if a deviation between the acquired audio variation rate and at least one standard audio variation rate within a standard audio variation rate range that corresponds to one standard voice model of the at least one standard voice model of the eighth type is less than or equal to a threshold n6, determining that the detected user action meets the preset disabling condition corresponding to the first application; or acquiring an audio variation rate corresponding to the user's voice detected by using an audio monitoring apparatus included in the terminal device, matching the acquired audio variation rate with a preset standard voice model of an eighth type, and if the acquired audio variation rate is greater than, or equal to at least one standard audio variation rate within a standard audio variation rate range that corresponds to the preset standard voice model of the eighth type, determining that the detected user action meets the preset disabling condition corresponding to the first application; or acquiring a volume variation rate corresponding to the user's voice detected by using an audio monitoring apparatus included in the terminal device, matching the acquired volume variation rate with at least one standard voice model of a ninth type, and if a deviation between the acquired volume variation rate and a standard volume variation rate that corresponds to one standard voice model of the at least one standard voice model of the ninth type is less than or equal to a threshold n7, determining that the detected user action meets the preset disabling condition corresponding to the first application; or acquiring a volume variation rate corresponding to the user's voice detected by using an audio monitoring apparatus included in the terminal device, matching the acquired volume variation rate with a preset standard voice model of a ninth type, and if the acquired volume variation rate is greater than, or equal to a standard volume variation rate corresponding to the preset standard voice model of the ninth type, determining that the detected user action meets the preset disabling condition corresponding to the first application; or acquiring a volume variation rate corresponding to the user's voice detected by using an audio monitoring apparatus included in the terminal device, matching the acquired volume variation rate with at least one standard voice model of a tenth type, and if a deviation between the acquired volume variation rate and at least one standard volume variation rate within a standard volume variation rate range that corresponds to one standard voice model of the at least one standard voice model of the tenth type is less than or equal to a threshold n8, determining that the detected user action meets the preset disabling condition corresponding to the first application; or acquiring a volume variation rate corresponding to the user's voice detected by using an audio monitoring apparatus included in the terminal device, matching the acquired volume variation rate with a preset standard voice model of a tenth type, and if the acquired volume variation rate is greater than, or equal to at least one standard volume variation rate within a standard volume variation rate range that corresponds to the preset standard voice model of the tenth type, determining that the detected user action meets the preset disabling condition corresponding to the first application; or acquiring a duration corresponding to the user's voice detected by using an audio monitoring apparatus included in the terminal device, matching the acquired duration with at least one standard voice model of an eleventh type, and if a deviation between the acquired duration and a standard duration that corresponds to one standard voice model of the at least one standard voice model of the eleventh type is less than or equal to a threshold n9, determining that the detected user action meets the preset disabling condition corresponding to the first application; or acquiring a duration corresponding to the user's voice detected by using an audio monitoring apparatus included in the terminal device, matching the acquired duration with a preset standard voice model of an eleventh type, and if the acquired duration is greater than, or equal to a standard duration corresponding to the preset standard voice model of the eleventh type, determining that the detected user action meets the preset disabling condition corresponding to the first application; or acquiring a duration corresponding to the user's voice detected by using an audio monitoring apparatus included in the terminal device, matching the acquired duration with at least one standard voice model of a twelfth type, and if a deviation between the acquired duration and at least one standard duration within a standard duration range that corresponds to one standard voice model of the at least one standard voice model of the twelfth type is less than or equal to a threshold n10, determining that the detected user action meets the preset disabling condition corresponding to the first application; or acquiring a duration corresponding to the user's voice detected by using an audio monitoring apparatus included in the terminal device, matching the acquired duration with a preset standard voice model of a twelfth type, and if the acquired duration is greater than, or equal to at least one standard duration within a standard duration range that corresponds to the preset standard voice model of the twelfth type, determining that the detected user action meets the preset disabling condition corresponding to the first application; or converting the user's voice detected by using an audio monitoring apparatus included in the terminal device into a corresponding digital voice signal, matching the digital voice signal obtained after conversion with at least one standard voice model of a thirteenth type, and if a deviation between the digital voice signal and a standard digital voice signal that corresponds to one standard voice model of the at least one standard voice model of the thirteenth type is less than or equal to a threshold n11, determining that the detected user action meets the preset disabling condition corresponding to the first application.

According to a fifth aspect, an embodiment of the present invention provides a computer storage medium, where the computer storage medium may store a program, and the program is used for executing a part or all of steps of any method for managing a task on a terminal device according to the foregoing embodiments.

It may be learned from the foregoing that, in the solutions provided in some embodiments of the present invention, whether a first application on a terminal device is running is monitored, and a user's action of operating a desktop of the terminal device is monitored; a running-state icon corresponding to the first application is displayed on the desktop if it is detected that the first application is running, or a disabled-state icon corresponding to the first application is displayed on the desktop if it is detected that the first application is in a disabled state, where the running-state icon corresponding to the first application and the disabled-state icon corresponding to the first application have different appearances; and the first application is disabled if the first application is running and the detected user action meets a preset disabling condition corresponding to the first application. When the first application is running, the running-state icon corresponding to the first application is displayed, and when the first application is in the disabled state, the disabled-state icon corresponding to the first application is displayed; for a running-state icon and a disabled-state icon of a same application, different appearances are displayed on the desktop. In this way, the user is shielded from professional data in the background of an operating system, and meanwhile, it is convenient for the user to learn a running status of each application in the system in a more visualized and clearer manner. In addition, when the detected user action meets the preset disabling condition corresponding to the first application, the first application that is running is disabled, and this mechanism helps the user to easily and quickly disable some unnecessary applications, which helps improve convenience and flexibility in disabling an application and enhance user experience, and meanwhile helps save energy.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 1-*a* is a schematic flowchart of a method for managing a task on a terminal device according to an embodiment of the present invention;

FIG. 1-*b* is a schematic flowchart of another method for managing a task on a terminal device according to an embodiment of the present invention;

FIG. 1-*c* is a schematic flowchart of another method for managing a task on a terminal device according to an embodiment of the present invention;

FIG. 1-*d* is a schematic diagram of an architecture of a terminal device according to an embodiment of the present invention;

FIG. 2-*a* is a schematic diagram of application icon displaying on a desktop according to an embodiment of the present invention;

FIG. 2-*b* is a schematic diagram in which an application icon displayed on a desktop is flicked away according to an embodiment of the present invention;

FIG. 2-*c* is a schematic diagram in which an application icon displayed on a desktop is clamped according to an embodiment of the present invention;

FIG. 2-*d* is a schematic diagram in which application icons displayed on a desktop are slid in batches according to an embodiment of the present invention;

DESCRIPTION OF EMBODIMENTS

Figure 3:
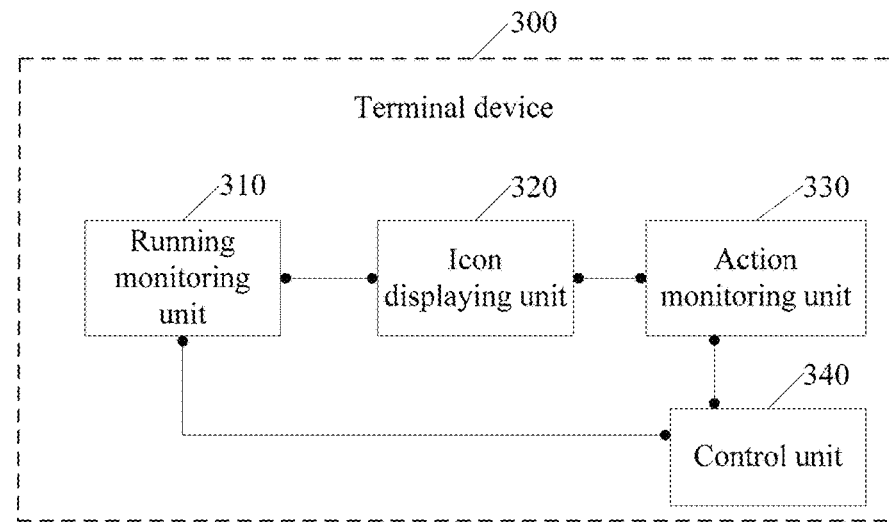
FIG. 3 is a schematic diagram of a terminal device according to an embodiment of the present invention.

Embodiments of the present invention provide a method for managing a task on a terminal device, and the terminal device, so as to improve convenience and flexibility in disabling an application and enhance user experience.

To make the invention objectives, features, and advantages of the present invention clearer and more comprehensible, the following clearly describes the technical solutions in the embodiments of the present invention with reference to the accompanying drawings in the embodiments of the present invention. Apparently, the embodiments described in the following are merely some but not all of the embodiments of the present invention. All other embodiments obtained by persons of ordinary skill in the art based on the embodiments of the present invention without creative efforts shall fall within the protection scope of the present invention.

Detailed descriptions are separately provided in the following.

In the specification, claims, and accompanying drawings of the present invention, the terms "first", "second", "third", "fourth", and so on (if they exist) are intended to distinguish between similar objects but do not necessarily indicate a specific order. It should be understood that data termed in such a way are interchangeable in proper circumstances so that the embodiments of the present invention described herein can, for example, be implemented in orders except the order illustrated or described herein. Moreover, the terms "include", "contain" and any other variants mean to cover the non-exclusive inclusion, for example, a PROCESS, method, system, product, or device that includes a list of steps or units is not necessarily limited to those steps or units, but may include other steps or units not expressly listed or inherent to such a PROCESS, method, system, product, or device.

In an embodiment of a method for managing a task on a terminal device of the present invention, the method may include: monitoring whether a first application on the terminal device is running, and monitoring a user's action of operating a desktop of the terminal device; and displaying, on the desktop of the terminal device, a running-state icon corresponding to the first application if it is detected that the first application is running, and disabling the first application if it is detected that the first application is running and the detected user action meets a preset disabling condition corresponding to the first application; or displaying, on the desktop, a disabled-state icon corresponding to the first application if it is detected that the first application is in a disabled state, where the running-state icon corresponding to the first application and the disabled-state icon corresponding to the first application have different appearances.

First, referring to FIG. 1-*a*, FIG. 1-*a* is a schematic flowchart of a method for managing a task on a terminal device according to an embodiment of the present invention, where the method may include the following steps:

101. Monitor whether a first application on the terminal device is running.

102. Monitor a user's action of operating a desktop of the terminal device.

Monitoring the user's action may include monitoring one or more user's actions.

In some embodiments of the present invention, the monitoring a user's action may include: monitoring the user's gesture, monitoring the user's moving track, monitoring the user's voice, monitoring a variation of a distance between the user and the terminal device, and/or monitoring a touch track performed by the user on a touch sensor, and the like. The monitoring the user's gesture may include monitoring the user's non-contact gesture and/or the user's contact gesture.

It may be understood that step 101 and step 102 may not be necessarily performed in order, and may be performed synchronously.

The first application may be one application, or may include multiple sub-applications. For example, the first application may be an E-mail application, a real-time communication application (for example, QQ or WeChat), a social application (for example, a microblog application), an infrared application, a Bluetooth application, a WiFi application, a picture browsing application, a news reader application, and/or a game application.

In some embodiments of the present invention, a system thread or another manner may be used to monitor whether the first application is running. For example, a thread status pool may be used to monitor whether the first application is running, where the thread status pool is a system thread.

In some embodiments of the present invention, a global thread status may be monitored in the thread status pool, and the thread status pool may store detected data by using a linked list or in another manner. A system thread pool may be used as an index of all threads in a system, and a thread may be maintained in a thread registration/deregistration manner. The thread status pool may be considered as a special daemon, where the daemon may have highest access permission and is used to refresh and synchronize a thread status in the system thread pool in real time.

In some embodiments of the present invention, a same quantity of menu data lists may be maintained in the thread status pool according to a quantity of desktops of the user. Each menu data list corresponds to all programs (including threads) on one desktop, where each line of a menu data list may correspond to one thread, and may record a version number of a status of the thread.

In some embodiments of the present invention, A thread information field stored in the thread status pool may include at least one of the following fields: a thread status, IO information, thread begin (end) time, a desktop menu on which a thread is located, a thread protection flag bit, a thread extension bit, and the like.

For example, the following structure may be used to store related information of a thread.

Struct thread_info
{

-continued

| Int ThreadID; | //thread number |
| Int ParentThreadID; | //parent thread number |
| Int currentID; | //version number of thread status information |
| Int ThreadbeginTime; | thread begin time |
| Int ThreadendTime; | thread end time |
| Int Protectflag; | //protection flag bit |
| Char Threadposition; | //position of a menu on which a thread is located |
| Char Backup; | //extension bit |
| Struct ThreadStatus; | //thread status (suspended/running/end) |
| Struct IOinfo; | //IO information (CPU/memory usage, energy consumption statistics, network resources, data IO, and the like) |

}

Certainly, in a practical application, related information of a thread may be stored in other manners.

In some embodiments of the present invention, each time a thread status changes (including changes of statuses such as a protection flag bit, a thread status, and a position at which a thread is located), a version number of thread status information may increase by 1. One version number may also be maintained in a thread form maintained in the system thread pool. When the thread status pool and the system thread pool are synchronizing with each other, values of version numbers of the thread status pool and the system thread pool may be compared in a traversal manner. If a version number of thread status information of a thread in the form maintained in the system thread pool is earlier than a version number of thread status information of a corresponding thread maintained in the thread status pool, the version numbers of the thread status information are synchronized with each other (that is, the version number of the thread status information of the corresponding thread in the form maintained in the system thread pool is modified), and a corresponding icon on the desktop may also be updated synchronously.

102. Display, on the desktop of the terminal device, a running-state icon corresponding to the first application if it is detected that the first application is running, and disable the first application if it is detected that the first application is running and the detected user action meets a preset disabling condition corresponding to the first application; or display, on the desktop, a disabled-state icon corresponding to the first application if it is detected that the first application is in a disabled state, where the running-state icon corresponding to the first application and the disabled-state icon corresponding to the first application have different appearances.

As the name implies, a running-state icon corresponding to an application (for example, the first application) is an icon correspondingly displayed on the desktop of the terminal device when the application is in a running state; likewise, a disabled-state icon corresponding to an application (for example, the first application) is an icon correspondingly displayed on the desktop of the terminal device when the application is in a disabled state. That is, when a running-state icon corresponding to an application is displayed on the desktop of the terminal device, it indicates that the application is currently in a running state, and when a disabled-state icon corresponding to an application is displayed on the desktop of the terminal device, it indicates that the application is currently in a disabled state.

In some embodiments of the present invention, the running-state icon corresponding to the first application and the disabled-state icon corresponding to the first application may vary in brightness, shape, color, size, or the like. For example, the running-state icon corresponding to the first application may have a crystal ball or bubble shrouding effect, or a light reflecting or specular effect; and the disabled-state icon corresponding to the first application may not have the crystal ball or bubble shrouding effect, or may have a non-reflective or non-specular effect. That the running-state icon corresponding to the first application and the disabled-state icon corresponding to the first application have different appearances aims to help a user to visually and conveniently distinguish, according to an appearance of an application icon, whether a corresponding application is in a running state. Therefore, any icon appearance difference that helps a user to visually distinguish whether an application is in a running state or in a disabled state is theoretically acceptable.

In some embodiments of the present invention, information such as current memory usage of the first application may further be displayed in the running-state icon corresponding to the first application.

In some embodiments of the present invention, some applications may be set to a protected state or an unprotected state. For an application in an unprotected state, the user may freely disable the application according to a requirement; and for an application in a protected state, the user is not allowed to randomly disable the application, so as to prevent a misoperation of the user. For example, as a security protection tool of a mobile phone, the 360 Mobile Security may be set as a protected application, and the user is not allowed to randomly disable such kind of application. For example, refer to 102*b* in FIG. 1-*b*: Set a status of the first application to a protected state or an unprotected state according to a user instruction or a preset policy. It may be understood that steps 101, 102, and 102*b* may not be necessarily performed in order, and may be performed synchronously. Setting the first application to the protected state or the unprotected state according to the preset policy may include, for example, if the first application is a security application or a core system application, setting the first application to the protected state or the unprotected state, from which setting the first application according to another preset policy can be deduced.

For example, if the first application is running, the first application is currently in the unprotected state, and the detected user action meets the preset disabling condition corresponding to the first application, the first application is disabled. In addition, if the first application is running and the first application is currently in the protected state, even if the detected user action meets the preset disabling condition corresponding to the first application, the first application is not disabled, for example, the first application may be disabled after being set to the unprotected state.

In some embodiments of the present invention, if the running-state icon corresponding to the first application has the crystal ball or bubble shrouding effect, and the disabled-state icon corresponding to the first application does not have the crystal ball or bubble shrouding effect, disabling the first application if the detected user action meets the preset disabling condition corresponding to the first application may include:

disabling the first application if it is detected that the touch track performed by the user on the touch sensor indicates that the running-state icon of the first application is flicked away so that the flicked-away running-state icon of the first application hits an edge of a screen.

For example, when an application icon is flicked away, touch (touch) operation information of the user may be recorded, for example, the touch operation information may include a position (for example, coordinates) of the application icon on which the user taps, a flicking track, a flicking direction, and a flicking rate. A rotating track, a rotating distance, and the like of the icon may be calculated according to the information. For example, when the flicked-away icon "hits the edge", if the application is unprotected, a thread corresponding to the application is disabled (that is, in this case, the application is disabled); and if the application is protected, only an interface animation effect may be generated but the thread corresponding to the application is not disabled (that is, in this case, the application is not disabled).

In a practical application, for example, whether the flicked-away icon "hits the edge" may be determined based on the following formulas:

$Y1=Y0+S1*\cos\theta;$ $X1=X0+S1*\sin\theta;$ $S1=(S0*S0)/(2at).$

X0/Y0 is a position at which the icon is located when the user's finger leaves the screen, t is a duration of a flicking event, a is a system constant, S0 represents a flicking rate, θ represents an included angle between a flicking direction and a screen length or width direction. Finally, by determining whether a value of Y1 or X1 exceeds a coordinate value of the edge of the screen, whether the flicked-away icon "hits the edge" may be determined.

Referring to FIG. 2-*a*, FIG. 2-*a* shows a desktop on which multiple application icons are displayed. An icon shrouded in a circular shadow is an icon of an application that is running, and an icon that is not shrouded in a circular shadow is an icon of an application that is not running. An icon shrouded in a grid shadow is an icon of an application that is running and is unprotected, and an icon shrouded in a diagonal shadow is an icon of an application that is running and is protected. As shown in FIG. 2-*b*, a touch-flicking rate and direction of the user, and time when the user's finger leaves the screen are monitored, and whether a final placement of the application is in contact with the edge of the screen is determined by means of calculation. Once the icon shrouded in the grid shadow hits the edge, a grid shadow background of the icon shrouded in the grid shadow is broken, and in this case, a corresponding application is disabled.

For example, as shown in FIG. 1-*c*, FIG. 1-*c* is a schematic diagram of a method for managing an application on a terminal device according to another embodiment of the present invention. The method relates to monitoring a running status of an application program, performing thread protection on some application programs (setting the application programs to a protected or unprotected state), and disabling a single application or disabling a batch of applications. As shown in FIG. 1-*c*, current application programs on a desktop N are marked, a thread status is queried to initialize a current status of each application program on the desktop N, a user operation is monitored to refresh the status of the application program, and based on this, each application program on the desktop N may be drawn and displayed. For a single application in an unprotected state, whether to disable the application may be determined according to a flicking-away or clamping condition; and for a condition that applications are disabled in batches, the applications may be disabled in batches according to an icon sliding condition, disabled states of the applications are synchronized in the background, and based on this, icon drawing and displaying on the desktop N are performed. FIG. 1-c exemplarily shows application management in some specific manners, which may be adaptively adjusted according to difference of specific environments.

In some embodiments of the present invention, if the running-state icon corresponding to the first application has the crystal ball shrouding effect, and the disabled-state icon corresponding to the first application does not have the crystal ball shrouding effect (or has a crystal ball shrouding effect different from that of the running-state icon), disabling the first application if the detected user action meets the preset disabling condition corresponding to the first application may include:

disabling the first application if it is detected that the touch track performed by the user on the touch sensor indicates that the running-state icon of the first application is clamped so that a crystal ball in which the running-state icon of the first application is shrouded is broken.

For example, when two points touched by the user fall within a background range of an icon, the touch event is identified as an icon clamping event, and in this case, information such as a duration that the two points touched by the user and a relative distance between the two points in the touch event may be recorded. The duration is used for timeout threading, and a value of the relative distance is compared with a maximum/minimum clamping value set in a system, once a critical value is reached, it is considered that the icon is broken/crushed. In this case, if the application is unprotected, a thread corresponding to the application is disabled (that is, in this case, the application is disabled); and if the application is protected, only an interface animation effect may be generated but the thread corresponding to the application is not disabled (that is, in this case, the application is not disabled).

As shown in FIG. 2-c, FIG. 2-c shows a scenario in which a corresponding application is disabled by clamping an icon shrouded in a grid shadow. When it is detected that the distance between the two points touched by the user reaches a critical value, a grid shadow background of the icon shrouded in the grid shadow is out of shape and broken, and in this case, the corresponding application is disabled.

In some embodiments of the present invention, when a crystal ball is broken after being touched or clamped, a sound effect, a screen effect, and/or a vibration effect, and the like may be played in a set manner. Certainly, an effect manner may be defined by the user or may be operated by default.

In some embodiments of the present invention, the first application includes multiple sub-applications, and disabling the first application if the detected user action meets the preset disabling condition corresponding to the first application may include: disabling, in batches, the multiple sub-applications included in the first application if it is detected that the touch track performed by the user on the touch sensor passes through the multiple sub-applications included in the first application at a moving speed greater than or equal to a first speed threshold (where the first speed threshold may be, for example, 0.1 m/s, 0.2 m/s, 0.5 m/s, 1 m/s, 2 m/s, or another speed). It may be understood that a sub-application is described relative to a parent application (herein, the first application includes multiple sub-applications; therefore, the first application herein may be considered as a parent application). Certainly, a sub-application may still be a common application. For example, the first application is a player application, and the multiple sub-applications included in the first application may be specifically: Storm player, Thunder player, QQ player, and the like. Other cases can be deduced from this.

For example, if a system supports a drop-down list, the drop-down list may list, in a queue manner, background threads that are running. If it is detected that the user quickly slides and breaks icon backgrounds (for example, crystal balls), threads corresponding to the broken icons may be ended in batches; and if there are many enabled threads, the threads may be sorted in a queue manner. In this case, if an application is unprotected, a thread corresponding to the application is disabled (that is, in this case, the application is disabled), and thread information disappears from a queue; and if the application is protected, only an interface animation effect may be generated but the thread corresponding to the application is not disabled (that is, in this case, the application is not disabled, and the thread information is still stored in the queue). For another example, if it is detected that the user quickly slides and breaks multiple icon backgrounds, threads corresponding to the broken icons may also be ended in batches.

As shown in FIG. 2-d, FIG. 2-d shows a scenario in which applications are disabled in batches. When it is detected that a user touch path quickly passes through an icon background, and a grid shadow background of the passed-through icon shrouded in a grid shadow is out of shape and broken, in this case, a corresponding application is disabled.

Data information in an operating system is converted into a visualized object such as an animation or a picture. A graphical operating interface on a terminal device has been extremely close to a cognitive level of people. Selectively threading background information of the operating system and visually presenting the background information to a user in a graphical manner can help the user to better learn a running status of the system. Compared with a currently popular third-party task manager, in the solutions in the embodiments of the present invention, by using a simple graph for presentation, the user is shielded from complex professional data of the operating system, and the user can perform selection and operation in a transparent and visualized manner, so that the user can be provided with more personalized experience.

More examples of some possible user action monitoring mechanisms are provided in the following. Certainly, this embodiment of the present invention is not limited to the manners of the following examples.

In some embodiments of the present invention, that the detected user action meets the preset disabling condition corresponding to the first application may include: matching a touch end point of the detected touch track performed by the user on the touch sensor included in the terminal device with at least one standard touch point model of a first type, and if the matching succeeds, determining that the detected user action meets the preset disabling condition corresponding to the first application; or matching a touch start point and a touch end point of the detected touch track performed by the user on the touch sensor included in the terminal device with at least one standard touch point model of a second type, and if the matching succeeds, determining that the detected user action meets the preset disabling condition corresponding to the first application; or determining a touch direction corresponding to the detected touch track performed by the user on the touch sensor included in the terminal device, matching the determined touch direction with at least one standard touch track model of a first type, and if a deviation between the determined touch direction and a standard touch direction that is included in one standard touch track model of the at least one standard touch track model of the first type is less than a third threshold (where the third threshold is equal to, for example, 5 degrees, 3 degrees, 1 degree, or another degree, or another angle range), determining that the detected user action meets the preset disabling condition corresponding to the first application; or determining a touch graph corresponding to the detected touch track performed by the user on the touch sensor included in the terminal device, matching the determined touch graph with at least one standard touch track model of a second type, and if a similarity between the determined touch graph and a standard touch graph that is included in one standard touch track model of the second type of the at least one standard touch track model of the second type is greater than a fourth threshold (where the fourth threshold is equal to, for example, 85%, 90%, 95%, 100%, or another value, or a value within another range), determining that the detected user action meets the preset disabling condition corresponding to the first application; or determining a moving direction corresponding to the user's moving track detected by using a camera included in the terminal device, matching the determined moving direction with at least one standard moving track model of a first type, and if a deviation between the determined moving direction and a standard moving direction that corresponds to one standard moving track model of the at least one standard moving track model of the first type is less than or equal to a threshold m1 (where the threshold m1 is equal to, for example, 5 degrees, 3 degrees, 1 degree, or another degree), determining that the detected user action meets the preset disabling condition corresponding to the first application; or determining a graph corresponding to the user's moving track detected by using a camera included in the terminal device, matching the determined graph with at least one standard moving track model of a second type, and if a similarity between the determined graph and a standard graph that corresponds to one standard moving track model of the at least one standard moving track model of the second type is greater than or equal to a threshold m2 (where the threshold m2 is equal to, for example, 85%, 90%, 95%, 100%, or another value, or a value within another range), determining that the detected user action meets the preset disabling condition corresponding to the first application; or determining a motion rate corresponding to the user's moving track detected by using a camera included in the terminal device, matching the determined motion rate with at least one standard moving track model of a third type, and if a deviation between the determined motion rate and a standard motion rate that corresponds to one standard moving track model of the at least one standard moving track model of the third type is less than or equal to a threshold m3 (where the threshold m3 is equal to, for example, 15%, 10%, 5%, 0%, or another value, or a value within another range), determining that the detected user action meets the preset disabling condition corresponding to the first application; or determining a motion rate corresponding to the user's moving track detected by using a camera included in the terminal device, matching the determined motion rate with a preset standard moving track model of a third type, and if the determined motion rate is greater than, or equal to a standard motion rate corresponding to the preset standard moving track model of the third type, determining that the detected user action meets the preset disabling condition corresponding to the first application; or determining a motion rate corresponding to the user's moving track detected by using a camera included in the terminal device, matching the determined motion rate with at least one standard moving track model of a fourth type, and if a deviation between the determined motion rate and at least one standard motion rate within a standard motion rate range that corresponds to one standard moving track model of the at least one standard moving track model of the fourth type is less than or equal to a threshold m4 (where the threshold m4 is equal to, for example, 15%, 10%, 5%, 0%, or another value, or a value within another range), determining that the detected user action meets the preset disabling condition corresponding to the first application; or determining a motion rate corresponding to the user's moving track detected by using a camera included in the terminal device, matching the determined motion rate with a preset standard moving track model of a fourth type, and if the determined motion rate is greater than, or equal to at least one standard motion rate within a standard motion rate range that corresponds to the preset standard moving track model of the fourth type, determining that the detected user action meets the preset disabling condition corresponding to the first application; or determining a motion displacement corresponding to the user's moving track detected by using a camera included in the terminal device, matching the determined motion displacement with at least one standard moving track model of a fifth type, and if a deviation between the determined motion displacement and a standard motion displacement that corresponds to one standard moving track model of the at least one standard moving track model of the fifth type is less than or equal to a threshold m5 (where the threshold m5 is equal to, for example, 15%, 10%, 5%, 0%, or another value, or a value within another range), determining that the detected user action meets the preset disabling condition corresponding to the first application; or determining a motion displacement corresponding to the user's moving track detected by using a camera included in the terminal device, matching the determined motion displacement with a preset standard moving track model of a fifth type, and if the determined motion displacement is greater than, less than, or equal to a standard motion displacement corresponding to the preset standard moving track model of the fifth type, determining that the detected user action meets the preset disabling condition corresponding to the first application; or determining a motion displacement corresponding to the user's moving track detected by using a camera included in the terminal device, matching the determined motion displacement with at least one standard moving track model of a sixth type, and if a deviation between the determined motion displacement and at least one standard motion displacement within a standard motion displacement range that corresponds to one standard moving track model of the at least one standard moving track model of the sixth type is less than or equal to a threshold m6 (where the threshold m6 is equal to, for example, 15%, 10%, 5%, 0%, or another value, or a value within another range), determining that the detected user action meets the preset disabling condition corresponding to the first application; or determining a motion displacement corresponding to the user's moving track detected by using a camera included in the terminal device, matching the determined motion displacement with a preset standard moving track model of a sixth type, and if the determined motion displacement is greater than, less than, or equal to at least one standard motion displacement within a standard motion displacement range that corresponds to the preset standard moving track model of the sixth type, determining that the detected user action meets the preset disabling condition corresponding to the first application; or determining a motion duration corresponding to the user's moving track detected by using a camera included in the terminal device, matching the determined motion duration with at least one standard moving track model of a seventh type, and if a deviation between the determined motion duration and a standard motion duration that corresponds to one standard moving track model of the at least one standard moving track model of the seventh type is less than or equal to a threshold m7 (where the threshold m7 is equal to, for example, 15%, 10%, 5%, 0%, or another value, or a value within another range), determining that the detected user action meets the preset disabling condition corresponding to the first application; or determining a motion duration corresponding to the user's moving track detected by using a camera included in the terminal device, matching the determined motion duration with a preset standard moving track model of a seventh type, and if the determined motion duration is greater than, less than, or equal to a standard motion duration corresponding to the preset standard moving track model of the seventh type, determining that the detected user action meets the preset disabling condition corresponding to the first application; or determining a motion duration corresponding to the user's moving track detected by using a camera included in the terminal device, matching the determined motion duration with at least one standard moving track model of an eighth type, and if a deviation between the determined motion duration and at least one standard motion duration within a standard motion duration range that corresponds to one standard moving track model of the at least one standard moving track model of the eighth type is less than or equal to a threshold m8 (where the threshold m8 is equal to, for example, 15%, 10%, 5%, 0%, or another value, or a value within another range), determining that the detected user action meets the preset disabling condition corresponding to the first application; or determining a motion duration corresponding to the user's moving track detected by using a camera included in the terminal device, matching the determined motion duration with a preset standard moving track model of an eighth type, and if the determined motion duration is greater than, less than, or equal to at least one standard motion duration within a standard motion duration range that corresponds to the preset standard moving track model of the eighth type, determining that the detected user action meets the preset disabling condition corresponding to the first application; or acquiring a volume value corresponding to the user's voice detected by using an audio monitoring apparatus included in the terminal device, matching the acquired volume value with at least one standard voice model of a first type, and if a deviation between the acquired volume value and a standard volume value that corresponds to one standard voice model of the at least one standard voice model of the first type is less than or equal to a threshold n1 (where the threshold n1 is equal to, for example, 15%, 10%, 5%, 0%, or another value, or a value within another range), determining that the detected user action meets the preset disabling condition corresponding to the first application; or acquiring a volume value corresponding to the user's voice detected by using an audio monitoring apparatus included in the terminal device, matching the acquired volume value with a preset standard voice model of a first type, and if the acquired volume value is greater than, or equal to a standard volume value corresponding to the preset standard voice model of the first type, determining that the detected user action meets the preset disabling condition corresponding to the first application; or acquiring a volume value corresponding to the user's voice detected by using an audio monitoring apparatus included in the terminal device, matching the acquired volume value with at least one standard voice model of a second type, and if a deviation between the acquired volume value and at least one standard volume value within a standard volume value range that corresponds to one standard voice model of the at least one standard voice model of the second type is less than or equal to a threshold n2 (where the threshold n2 is equal to, for example, 15%, 10%, 5%, 0%, or another value, or a value within another range), determining that the detected user action meets the preset disabling condition corresponding to the first application; or acquiring a volume value corresponding to the user's voice detected by using an audio monitoring apparatus included in the terminal device, matching the acquired volume value with a preset standard voice model of a second type, and if the acquired volume value is greater than, or equal to at least one standard volume value within a standard volume value range that corresponds to the preset standard voice model of the second type, determining that the detected user action meets the preset disabling condition corresponding to the first application; or acquiring an audio value corresponding to the user's voice detected by using an audio monitoring apparatus included in the terminal device, matching the acquired audio value with at least one standard voice model of a third type, and if a deviation between the acquired audio value and a standard audio value that corresponds to one standard voice model of the at least one standard voice model of the third type is less than or equal to a threshold n3 (where the threshold n3 is equal to, for example, 15%, 10%, 5%, 0%, or another value, or a value within another range), determining that the detected user action meets the preset disabling condition corresponding to the first application; or acquiring an audio value corresponding to the user's voice detected by using an audio monitoring apparatus included in the terminal device, matching the acquired audio value with a preset standard voice model of a third type, and if the acquired audio value is greater than, or equal to a standard audio value corresponding to the preset standard voice model of the third type, determining that the detected user action meets the preset disabling condition corresponding to the first application; or acquiring an audio value corresponding to the user's voice detected by using an audio monitoring apparatus included in the terminal device, matching the acquired audio value with at least one standard voice model of a fourth type, and if a deviation between the acquired audio value and at least one standard audio value within a standard audio value range that corresponds to one standard voice model of the at least one standard voice model of the fourth type is less than or equal to a threshold n4 (where the threshold n4 is equal to, for example, 15%, 10%, 5%, 0%, or another value, or a value within another range), determining that the detected user action meets the preset disabling condition corresponding to the first application; or acquiring an audio value corresponding to the user's voice detected by using an audio monitoring apparatus included in the terminal device, matching the acquired audio value with a preset standard voice model of a fourth type, and if the acquired audio value is greater than, or equal to at least one standard audio value within a standard audio value range that corresponds to the preset standard voice model of the fourth type, determining that the detected user action meets the preset disabling condition corresponding to the first application; or acquiring an audio variation trend corresponding to the user's voice detected by using an audio monitoring apparatus included in the terminal device, matching the acquired audio variation trend with at least one standard voice model of a fifth type, and if the acquired audio variation trend is the same as a standard audio variation trend corresponding to one standard voice model of the at least one standard voice model of the fifth type, determining that the detected user action meets the preset disabling condition corresponding to the first application; or acquiring a volume variation trend corresponding to the user's voice detected by using an audio monitoring apparatus included in the terminal device, matching the acquired volume variation trend with at least one standard voice model of a sixth type, and if the acquired volume variation trend is the same as a standard volume variation trend corresponding to one standard voice model of the at least one standard voice model of the sixth type, determining that the detected user action meets the preset disabling condition corresponding to the first application; or acquiring an audio variation rate corresponding to the user's voice detected by using an audio monitoring apparatus included in the terminal device, matching the acquired audio variation rate with at least one standard voice model of a seventh type, and if a deviation between the acquired audio variation rate and a standard audio variation rate that corresponds to one standard voice model of the at least one standard voice model of the seventh type is less than or equal to a threshold n5 (where the threshold n5 is equal to, for example, 15%, 10%, 5%, 0%, or another value, or a value within another range), determining that the detected user action meets the preset disabling condition corresponding to the first application; or acquiring an audio variation rate corresponding to the user's voice detected by using an audio monitoring apparatus included in the terminal device, matching the acquired audio variation rate with a preset standard voice model of a seventh type, and if the acquired audio variation rate is greater than, or equal to a standard audio variation rate corresponding to the preset standard voice model of the seventh type, determining that the detected user action meets the preset disabling condition corresponding to the first application; or acquiring an audio variation rate corresponding to the user's voice detected by using an audio monitoring apparatus included in the terminal device, matching the acquired audio variation rate with at least one standard voice model of an eighth type, and if a deviation between the acquired audio variation rate and at least one standard audio variation rate within a standard audio variation rate range that corresponds to one standard voice model of the at least one standard voice model of the eighth type is less than or equal to a threshold n6 (where the threshold n6 is equal to, for example, 15%, 10%, 5%, 0%, or another value, or a value within another range), determining that the detected user action meets the preset disabling condition corresponding to the first application; or acquiring an audio variation rate corresponding to the user's voice detected by using an audio monitoring apparatus included in the terminal device, matching the acquired audio variation rate with a preset standard voice model of an eighth type, and if the acquired audio variation rate is greater than, or equal to at least one standard audio variation rate within a standard audio variation rate range that corresponds to the preset standard voice model of the eighth type, determining that the detected user action meets the preset disabling condition corresponding to the first application; or acquiring a volume variation rate corresponding to the user's voice detected by using an audio monitoring apparatus included in the terminal device, matching the acquired volume variation rate with at least one standard voice model of a ninth type, and if a deviation between the acquired volume variation rate and a standard volume variation rate that corresponds to one standard voice model of the at least one standard voice model of the ninth type is less than or equal to a threshold n7 (where the threshold n7 is equal to, for example, 15%, 10%, 5%, 0%, or another value, or a value within another range), determining that the detected user action meets the preset disabling condition corresponding to the first application; or acquiring a volume variation rate corresponding to the user's voice detected by using an audio monitoring apparatus included in the terminal device, matching the acquired volume variation rate with a preset standard voice model of a ninth type, and if the acquired volume variation rate is greater than, or equal to a standard volume variation rate corresponding to the preset standard voice model of the ninth type, determining that the detected user action meets the preset disabling condition corresponding to the first application; or acquiring a volume variation rate corresponding to the user's voice detected by using an audio monitoring apparatus included in the terminal device, matching the acquired volume variation rate with at least one standard voice model of a tenth type, and if a deviation between the acquired volume variation rate and at least one standard volume variation rate within a standard volume variation rate range that corresponds to one standard voice model of the at least one standard voice model of the tenth type is less than or equal to a threshold n8 (where the threshold n8 is equal to, for example, 15%, 10%, 5%, 0%, or another value, or a value within another range), determining that the detected user action meets the preset disabling condition corresponding to the first application; or acquiring a volume variation rate corresponding to the user's voice detected by using an audio monitoring apparatus included in the terminal device, matching the acquired volume variation rate with a preset standard voice model of a tenth type, and if the acquired volume variation rate is greater than, or equal to at least one standard volume variation rate within a standard volume variation rate range that corresponds to the preset standard voice model of the tenth type, determining that the detected user action meets the preset disabling condition corresponding to the first application; or acquiring a duration corresponding to the user's voice detected by using an audio monitoring apparatus included in the terminal device, matching the acquired duration with at least one standard voice model of an eleventh type, and if a deviation between the acquired duration and a standard duration that corresponds to one standard voice model of the at least one standard voice model of the eleventh type is less than or equal to a threshold n9 (where the threshold n9 is equal to, for example, 15%, 10%, 5%, 0%, or another value, or a value within another range), determining that the detected user action meets the preset disabling condition corresponding to the first application; or acquiring a duration corresponding to the user's voice detected by using an audio monitoring apparatus included in the terminal device, matching the acquired duration with a preset standard voice model of an eleventh type, and if the acquired duration is greater than, or equal to a standard duration corresponding to the preset standard voice model of the eleventh type, determining that the detected user action meets the preset disabling condition corresponding to the first application; or acquiring a duration corresponding to the user's voice detected by using an audio monitoring apparatus included in the terminal device, matching the acquired duration with at least one standard voice model of a twelfth type, and if a deviation between the acquired duration and at least one standard duration within a standard duration range that corresponds to one standard voice model of the at least one standard voice model of the twelfth type is less than or equal to a threshold n10 (where the threshold n10 is equal to, for example, 15%, 10%, 5%, 0%, or another value, or a value within another range), determining that the detected user action meets the preset disabling condition corresponding to the first application; or acquiring a duration corresponding to the user's voice detected by using an audio monitoring apparatus included in the terminal device, matching the acquired duration with a preset standard voice model of a twelfth type, and if the acquired duration is greater than, or equal to at least one standard duration within a standard duration range that corresponds to the preset standard voice model of the twelfth type, determining that the detected user action meets the preset disabling condition corresponding to the first application; or converting the user's voice detected by using an audio monitoring apparatus included in the terminal device into a corresponding digital voice signal, matching the digital voice signal obtained after conversion with at least one standard voice model of a thirteenth type, and if a deviation between the digital voice signal and a standard digital voice signal that corresponds to one standard voice model of the at least one standard voice model of the thirteenth type is less than or equal to a threshold n11 (where the threshold n11 is equal to, for example, 15%, 10%, 5%, 0%, or another value, or a value within another range), determining that the detected user action meets the preset disabling condition corresponding to the first application.

It may be understood that the manners in the foregoing examples are merely exemplary, and other manners are no longer listed one by one herein.

It may be understood that, for the standard touch point model of the first type, the standard touch point model of the second type, the standard touch track model of the first type, the standard touch track model of the second type . . . , the standard voice model of the first type, the standard voice model of the second type . . . , the standard moving track model of the first type, the standard moving track model of the second type . . . mentioned in the foregoing examples, using different names mainly aims to help distinguish between different standard models. Different models may have different matching manners and/or different standard parameters. For example, the standard touch point model of the first type may include position coordinates of at least one standard touch end point, and when a deviation between coordinates of the touch end point of the detected touch track performed by the user on the touch sensor and position coordinates of one standard touch end point included in the standard touch point model of the first type is less than a set threshold, it may be considered that matching between the touch end point of the detected touch track performed by the user on the touch sensor and the standard touch point model of the first type is successful. Similarly, a standard touch point model of a second type may include position coordinates of a standard touch start point and a standard touch end point, and when a deviation between coordinates of the touch start point and the touch end point of the detected touch track performed by the user on the touch sensor and the position coordinates of the standard touch start point and the standard touch end point that are included in the standard touch point model of the second type is less than a set threshold, it may be considered that matching between the touch start point and the touch end point of the detected touch track performed by the user on the touch sensor and the standard touch point model of the second type is successful. Matching for other models may be deduced from this, which is no longer described one by one herein.

The solution in this embodiment of the present invention may be applied in multiple terminal devices, for example, may be applied in terminal devices such as a mobile phone, a portable computer, and a personal digital assistant that have a touch sensor, a camera, and/or an audio monitoring apparatus. The touch sensor may be, for example, a component that can sense a touch, such as a touchscreen, a position sensor, or a touch-sensitive button. The audio monitoring apparatus included in the terminal device mentioned in each embodiment of the present invention is an apparatus that is in the terminal device and used to collect an outside voice signal, where the audio monitoring apparatus may be, for example, a microphone.

It may be learned from the foregoing that, in the solution of this embodiment, whether a first application on a terminal device is running is monitored, and a user's action of operating a desktop of the terminal device is monitored; a running-state icon corresponding to the first application is displayed on the desktop if it is detected that the first application is running, or a disabled-state icon corresponding to the first application is displayed on the desktop if it is detected that the first application is in a disabled state, where the running-state icon corresponding to the first application and the disabled-state icon corresponding to the first application have different appearances; and the first application is disabled if the first application is running and the detected user action meets a preset disabling condition corresponding to the first application. For a running-state icon and a disabled-state icon of a same application, different appearances are displayed on the desktop. In this way, the user is shielded from professional data in the background of an operating system, and meanwhile, it is convenient for the user to learn a running status of each application in the system in a more visualized and clearer manner. In addition, when the detected user action meets the preset disabling condition corresponding to the first application, the first application that is running is disabled, and this mechanism helps the user to easily and quickly disable some unnecessary applications, which helps improve convenience and flexibility in disabling an application and enhance user experience, and meanwhile helps save energy.

FIG. 1-*d* is used as an example to describe a logical structure of a terminal device in a method for managing a task on a terminal device according to an embodiment of the present invention. The terminal device may be specifically a smartphone. As shown in FIG. 1-*d*, a hardware layer of the terminal device includes a central threading unit (CPU, Center Threading Unit), and certainly, may further include a GPU, a memory, an input/output device, a network interface, storage device, and the like, where the input device may include a keyboard, a mouse, a touchscreen, and the like, and the output device may include a display device, such as an LCD, a CRT, holographic (Holographic), or a projector (Projector). An operating system (for example, Android) and some application programs may run at the hardware layer. A kernel library is a core part of the operating system, may include an input/output service and a kernel service, and certainly, may further include a graphics device interface, a graphics engine (Graphics Engine) that implements CPU and GPU graphics threading, and the like.

In addition, the terminal device may further include a driver layer, a framework layer, and an application layer. The driver layer may include a driver of each device. The framework layer may include a system service (System service), a customer service (Customer Service), and may further include a web service (Web Service), a graphic service (Graphic service), and the like. The application layer may include user applications such as a desktop (launcher), a media player (Media Player), and a browser (Browser).

FIG. 1-d is used as an example. The method for managing a task on a terminal device provided in this embodiment of the present invention may be applied in the terminal device shown in FIG. 1-d. The hardware layer of the terminal device may include hardware such as a threador (for example, a CPU), a memory, an input device, and a display device. The kernel library (Kernel Library) layer may include a kernel service (Kernel Service), an input/output service (I/O Service), and certainly, may further include a graphics engine (Graphic Engine) and the like. It should be understood that, for a logical structure of an executor of the foregoing method in this embodiment of the present invention, reference may be made to, for example, FIG. 1-d or a variation structure of FIG. 1-d.

FIG. 1-d is used as an example. The method for managing a task on a terminal device provided in this embodiment of the present invention may be applied at the framework layer, for example, may be applied in a system service (System Service) component or another component at the framework layer. At the framework layer, whether a first application on the terminal device is running is monitored, and a user's action of operating a desktop of the terminal device is monitored; a running-state icon corresponding to the first application is displayed on the desktop of the terminal device if it is detected that the first application is running, and the first application is disabled if it is detected that the first application is running and the detected user action meets a preset disabling condition corresponding to the first application; or a disabled-state icon corresponding to the first application is displayed on the desktop of the terminal device if it is detected that the first application is in a disabled state, where the running-state icon corresponding to the first application and the disabled-state icon corresponding to the first application have different appearances.

To better implement the foregoing solution in this embodiment of the present invention, a related apparatus configured to implement the foregoing solution is further provided in the following.

Referring to FIG. 3, FIG. 3 is a schematic diagram of a terminal device 300 according to an embodiment of the present invention. The terminal device 300 may include: a running monitoring unit 310, an icon displaying unit 320, an action monitoring unit 330, and a control unit 340.

The running monitoring unit 310 is configured to monitor whether a first application on the terminal device 300 is running.

In some embodiments of the present invention, the running monitoring unit 310 may be specifically configured to monitor, by using a thread status pool, whether the first application is running, where the thread status pool is a system thread.

In some embodiments of the present invention, a global thread status may be monitored in the thread status pool, and the thread status pool may store detected data by using a linked list or in another manner. A system thread pool may be used as an index of all threads in a system, and a thread may be maintained in a thread registration/deregistration manner. The thread status pool may be considered as a special daemon, where the daemon may have highest access permission and is used to refresh and synchronize a thread status in the system thread pool in real time.

The icon displaying unit 320 is configured to display, on a desktop of the terminal device 300, a running-state icon corresponding to the first application if it is detected that the first application is running, or display, on a desktop of the terminal device 300, a disabled-state icon corresponding to the first application if it is detected that the first application is in a disabled state, where the running-state icon corresponding to the first application and the disabled-state icon corresponding to the first application have different appearances.

In some embodiments of the present invention, the running-state icon corresponding to the first application and the disabled-state icon corresponding to the first application may vary in brightness, shape, color, size, or the like. For example, the running-state icon corresponding to the first application may have a crystal ball (or bubble) shrouding effect, and the disabled-state icon corresponding to the first application may not have the crystal ball (or bubble) shrouding effect. That the running-state icon corresponding to the first application and the disabled-state icon corresponding to the first application have different appearances aims to help a user to visually and conveniently distinguish, according to an appearance of an application icon, whether a corresponding application is in a running state. Therefore, any icon appearance difference that helps the user to visually distinguish whether an application is in a running state or in a disabled state is theoretically acceptable.

In some embodiments of the present invention, information such as current memory usage of the first application may further be displayed in the running-state icon corresponding to the first application.

In some embodiments of the present invention, the terminal device 300 may further include a setting unit, configured to set some applications to a protected state or an unprotected state. For an application in an unprotected state, the user may freely disable the application according to a requirement; and for an application in a protected state, the user is not allowed to randomly disable the application, so as to prevent a misoperation of the user. For example, as a security protection tool of a mobile phone, the 360 Mobile Security may be set as a protected application, and the user is not allowed to randomly disable such kind of application. For example, the setting unit may be configured to set a status of the first application to a protected state or an unprotected state according to a user instruction or a preset policy. Setting the first application to the protected state or the unprotected state according to the preset policy may include, for example, if the first application is a security application or a core system application, setting the first application to the protected state or the unprotected state, from which setting the first application according to another preset policy can be deduced.

The action monitoring unit 330 is configured to monitor a user's action of operating the desktop of the terminal device 300.

In some embodiments of the present invention, the action monitoring unit 330 may be specifically configured to: monitor the user's gesture, monitor the user's moving track, monitor the user's voice, and/or monitor a touch track performed by the user on a touch sensor included in the terminal device 300.

The control unit 340 is configured to disable the first application if the running monitoring unit 310 detects that the first application is running and the user action detected by the action monitoring unit 330 meets a preset disabling condition corresponding to the first application.

For example, if the first application is running, the first application is currently in the unprotected state, and the detected user action meets the preset disabling condition corresponding to the first application, the first application is disabled. In addition, the control unit 340 may also be specifically configured to, if the first application is running and the first application is currently in the protected state, skip disabling the first application even if the detected user action meets the preset disabling condition corresponding to the first application. For example, the first application may be disabled after being set to the unprotected state.

In some embodiments of the present invention, the terminal device 300 includes a touch sensor. The foregoing control unit 340 is configured to disable the first application if the foregoing running monitoring unit detects that the first application is running, and if the foregoing action monitoring unit detects that a touch track performed by the user on the touch sensor indicates that the running-state icon of the first application is flicked away so that the flicked-away running-state icon of the first application hits an edge of a screen. The running-state icon corresponding to the first application has a crystal ball shrouding effect, and the disabled-state icon corresponding to the first application does not have the crystal ball shrouding effect.

In some embodiments of the present invention, the terminal device 300 includes a touch sensor. If the running-state icon corresponding to the first application has a crystal ball shrouding effect, and the disabled-state icon corresponding to the first application does not have the crystal ball shrouding effect, the foregoing control unit 340 is configured to disable the first application if the foregoing running monitoring unit detects that the first application is running, and if the foregoing action monitoring unit detects that a touch track performed by the user on the touch sensor indicates that the running-state icon of the first application is clamped so that a crystal ball in which the running-state icon of the first application is shrouded is broken In some embodiments of the present invention, the terminal device 300 includes a touch sensor. The foregoing control unit 340 may be specifically configured to disable, in batches, multiple sub-applications included in the first application if the running monitoring unit 310 detects that the first application is running, and if the action monitoring unit 330 detects that a touch track performed by the user on the touch sensor passes through the multiple sub-applications included in the first application at a moving speed greater than or equal to a first speed threshold.

In some embodiments of the present invention, the control unit 340 may be specifically configured to: if the running monitoring unit 310 detects that the first application is running, match a touch end point of the touch track that is detected by the action monitoring unit 330 and is performed by the user on the touch sensor included in the terminal device 300 with at least one standard touch point model of a first type, and if the matching succeeds, determine that the user action detected by the action monitoring unit 330 meets the preset disabling condition corresponding to the first application, and disable the first application; or if the running monitoring unit 310 detects that the first application is running, match a touch start point and a touch end point of the touch track that is detected by the action monitoring unit 330 and is performed by the user on the touch sensor included in the terminal device 300 with at least one standard touch point model of a second type, and if the matching succeeds, determine that the user action detected by the action monitoring unit 330 meets the preset disabling condition corresponding to the first application, and disable the first application; or if the running monitoring unit 310 detects that the first application is running, determine a touch direction corresponding to the touch track that is detected by the action monitoring unit 330 and is performed by the user on the touch sensor included in the terminal device 300, match the determined touch direction with at least one standard touch track model of a first type, and if a deviation between the determined touch direction and a standard touch direction that is included in one standard touch track model of the at least one standard touch track model of the first type is less than a third threshold, determine that the user action detected by the action monitoring unit 330 meets the preset disabling condition corresponding to the first application, and disable the first application; or if the running monitoring unit 310 detects that the first application is running, determine a touch graph corresponding to the touch track that is detected by the action monitoring unit 330 and is performed by the user on the touch sensor included in the terminal device 300, match the determined touch graph with at least one standard touch track model of a second type, and if a similarity between the determined touch graph and a standard touch graph that is included in one standard touch track model of the second type of the at least one standard touch track model of the second type is greater than a fourth threshold, determine that the user action detected by the action monitoring unit 330 meets the preset disabling condition corresponding to the first application, and disable the first application; or if the running monitoring unit 310 detects that the first application is running, determine a moving direction corresponding to the user's moving track detected by the action monitoring unit 330 by using a camera included in the terminal device 300, match the determined moving direction with at least one standard moving track model of a first type, and if a deviation between the determined moving direction and a standard moving direction that corresponds to one standard moving track model of the at least one standard moving track model of the first type is less than or equal to a threshold m1, determine that the user action detected by the action monitoring unit 330 meets the preset disabling condition corresponding to the first application, and disable the first application; or if the running monitoring unit 310 detects that the first application is running, determine a graph corresponding to the user's moving track detected by the action monitoring unit 330 by using a camera included in the terminal device 300, match the determined graph with at least one standard moving track model of a second type, and if a similarity between the determined graph and a standard graph that corresponds to one standard moving track model of the at least one standard moving track model of the second type is greater than or equal to a threshold m2, determine that the user action detected by the action monitoring unit 330 meets the preset disabling condition corresponding to the first application, and disable the first application; or if the running monitoring unit 310 detects that the first application is running, determine a motion rate corresponding to the user's moving track detected by the action monitoring unit 330 by using a camera included in the terminal device 300, match the determined motion rate with at least one standard moving track model of a third type, and if a deviation between the determined motion rate and a standard motion rate that corresponds to one standard moving track model of the at least one standard moving track model of the third type is less than or equal to a threshold m3, determine that the user action detected by the action monitoring unit 330 meets the preset disabling condition corresponding to the first application, and disable the first application; or if the running monitoring unit 310 detects that the first application is running, determine a motion rate corresponding to the user's moving track detected by the action monitoring unit 330 by using a camera included in the terminal device 300, match the determined motion rate with a preset standard moving track model of a third type, and if the determined motion rate is greater than, or equal to a standard motion rate corresponding to the preset standard moving track model of the third type, determine that the user action detected by the action monitoring unit 330 meets the preset disabling condition corresponding to the first application, and disable the first application; or if the running monitoring unit 310 detects that the first application is running, determine a motion rate corresponding to the user's moving track detected by the action monitoring unit 330 by using a camera included in the terminal device 300, match the determined motion rate with at least one standard moving track model of a fourth type, and if a deviation between the determined motion rate and at least one standard motion rate within a standard motion rate range that corresponds to one standard moving track model of the at least one standard moving track model of the fourth type is less than or equal to a threshold m4, determine that the user action detected by the action monitoring unit 330 meets the preset disabling condition corresponding to the first application, and disable the first application; or if the running monitoring unit 310 detects that the first application is running, determine a motion rate corresponding to the user's moving track detected by the action monitoring unit 330 by using a camera included in the terminal device 300, match the determined motion rate with a preset standard moving track model of a fourth type, and if the determined motion rate is greater than, or equal to at least one standard motion rate within a standard motion rate range that corresponds to the preset standard moving track model of the fourth type, determine that the user action detected by the action monitoring unit 330 meets the preset disabling condition corresponding to the first application, and disable the first application; or if the running monitoring unit 310 detects that the first application is running, determine a motion displacement corresponding to the user's moving track detected by the action monitoring unit 330 by using a camera included in the terminal device 300, match the determined motion displacement with at least one standard moving track model of a fifth type, and if a deviation between the determined motion displacement and a standard motion displacement that corresponds to one standard moving track model of the at least one standard moving track model of the fifth type is less than or equal to a threshold m5, determine that the user action detected by the action monitoring unit 330 meets the preset disabling condition corresponding to the first application, and disable the first application; or if the running monitoring unit 310 detects that the first application is running, determine a motion displacement corresponding to the user's moving track detected by the action monitoring unit 330 by using a camera included in the terminal device 300, match the determined motion displacement with a preset standard moving track model of a fifth type, and if the determined motion displacement is greater than, less than, or equal to a standard motion displacement corresponding to the preset standard moving track model of the fifth type, determine that the user action detected by the action monitoring unit 330 meets the preset disabling condition corresponding to the first application, and disable the first application; or if the running monitoring unit 310 detects that the first application is running, determine a motion displacement corresponding to the user's moving track detected by the action monitoring unit 330 by using a camera included in the terminal device 300, match the determined motion displacement with at least one standard moving track model of a sixth type, and if a deviation between the determined motion displacement and at least one standard motion displacement within a standard motion displacement range that corresponds to one standard moving track model of the at least one standard moving track model of the sixth type is less than or equal to a threshold m6, determine that the user action detected by the action monitoring unit 330 meets the preset disabling condition corresponding to the first application, and disable the first application; or if the running monitoring unit 310 detects that the first application is running, determine a motion displacement corresponding to the user's moving track detected by the action monitoring unit 330 by using a camera included in the terminal device 300, match the determined motion displacement with a preset standard moving track model of a sixth type, and if the determined motion displacement is greater than, less than, or equal to at least one standard motion displacement within a standard motion displacement range that corresponds to the preset standard moving track model of the sixth type, determine that the user action detected by the action monitoring unit 330 meets the preset disabling condition corresponding to the first application, and disable the first application; or if the running monitoring unit 310 detects that the first application is running, determine a motion duration corresponding to the user's moving track detected by the action monitoring unit 330 by using a camera included in the terminal device 300, match the determined motion duration with at least one standard moving track model of a seventh type, and if a deviation between the determined motion duration and a standard motion duration that corresponds to one standard moving track model of the at least one standard moving track model of the seventh type is less than or equal to a threshold m7, determine that the detected user action meets the preset disabling condition corresponding to the first application, and disable the first application; or if the running monitoring unit 310 detects that the first application is running, determine a motion duration corresponding to the user's moving track detected by the action monitoring unit 330 by using a camera included in the terminal device 300, match the determined motion duration with a preset standard moving track model of a seventh type, and if the determined motion duration is greater than, less than, or equal to a standard motion duration corresponding to the preset standard moving track model of the seventh type, determine that the user action detected by the action monitoring unit 330 meets the preset disabling condition corresponding to the first application, and disable the first application; or if the running monitoring unit 310 detects that the first application is running, determine a motion duration corresponding to the user's moving track detected by the action monitoring unit 330 by using a camera included in the terminal device 300, match the determined motion duration with at least one standard moving track model of an eighth type, and if a deviation between the determined motion duration and at least one standard motion duration within a standard motion duration range that corresponds to one standard moving track model of the at least one standard moving track model of the eighth type is less than or equal to a threshold m8, determine that the user action detected by the action monitoring unit 330 meets the preset disabling condition corresponding to the first application, and disable the first application; or if the running monitoring unit 310 detects that the first application is running, determine a motion duration corresponding to the user's moving track detected by the action monitoring unit 330 by using a camera included in the terminal device 300, match the determined motion duration with a preset standard moving track model of an eighth type, and if the determined motion duration is greater than, less than, or equal to at least one standard motion duration within a standard motion duration range that corresponds to the preset standard moving track model of the eighth type, determine that the user action detected by the action monitoring unit 330 meets the preset disabling condition corresponding to the first application, and disable the first application; or if the running monitoring unit 310 detects that the first application is running, acquire a volume value corresponding to the user's voice detected by the action monitoring unit 330 by using an audio monitoring apparatus included in the terminal device 300, match the acquired volume value with at least one standard voice model of a first type, and if a deviation between the acquired volume value and a standard volume value that corresponds to one standard voice model of the at least one standard voice model of the first type is less than or equal to a threshold n1, determine that the user action detected by the action monitoring unit 330 meets the preset disabling condition corresponding to the first application, and disable the first application; or if the running monitoring unit 310 detects that the first application is running, acquire a volume value corresponding to the user's voice detected by the action monitoring unit 330 by using an audio monitoring apparatus included in the terminal device 300, match the acquired volume value with a preset standard voice model of a first type, and if the acquired volume value is greater than, or equal to a standard volume value corresponding to the preset standard voice model of the first type, determine that the user action detected by the action monitoring unit 330 meets the preset disabling condition corresponding to the first application, and disable the first application; or if the running monitoring unit 310 detects that the first application is running, acquire a volume value corresponding to the user's voice detected by the action monitoring unit 330 by using an audio monitoring apparatus included in the terminal device 300, match the acquired volume value with at least one standard voice model of a second type, and if a deviation between the acquired volume value and at least one standard volume value within a standard volume value range that corresponds to one standard voice model of the at least one standard voice model of the second type is less than or equal to a threshold n2, determine that the user action detected by the action monitoring unit 330 meets the preset disabling condition corresponding to the first application, and disable the first application; or if the running monitoring unit 310 detects that the first application is running, acquire a volume value corresponding to the user's voice detected by the action monitoring unit 330 by using an audio monitoring apparatus included in the terminal device 300, match the acquired volume value with a preset standard voice model of a second type, and if the acquired volume value is greater than, or equal to at least one standard volume value within a standard volume value range that corresponds to the preset standard voice model of the second type, determine that the user action detected by the action monitoring unit 330 meets the preset disabling condition corresponding to the first application, and disable the first application; or if the running monitoring unit 310 detects that the first application is running, acquire an audio value corresponding to the user's voice detected by the action monitoring unit 330 by using an audio monitoring apparatus included in the terminal device 300, match the acquired audio value with at least one standard voice model of a third type, and if a deviation between the acquired audio value and a standard audio value that corresponds to one standard voice model of the at least one standard voice model of the third type is less than or equal to a threshold n3, determine that the user action detected by the action monitoring unit 330 meets the preset disabling condition corresponding to the first application, and disable the first application; or if the running monitoring unit 310 detects that the first application is running, acquire an audio value corresponding to the user's voice detected by the action monitoring unit 330 by using an audio monitoring apparatus included in the terminal device 300, match the acquired audio value with a preset standard voice model of a third type, and if the acquired audio value is greater than, or equal to a standard audio value corresponding to the preset standard voice model of the third type, determine that the user action detected by the action monitoring unit 330 meets the preset disabling condition corresponding to the first application, and disable the first application; or if the running monitoring unit 310 detects that the first application is running, acquire an audio value corresponding to the user's voice detected by the action monitoring unit 330 by using an audio monitoring apparatus included in the terminal device 300, match the acquired audio value with at least one standard voice model of a fourth type, and if a deviation between the acquired audio value and at least one standard audio value within a standard audio value range that corresponds to one standard voice model of the at least one standard voice model of the fourth type is less than or equal to a threshold n4, determine that the user action detected by the action monitoring unit 330 meets the preset disabling condition corresponding to the first application, and disable the first application; or if the running monitoring unit 310 detects that the first application is running, acquire an audio value corresponding to the user's voice detected by the action monitoring unit 330 by using an audio monitoring apparatus included in the terminal device 300, match the acquired audio value with a preset standard voice model of a fourth type, and if the acquired audio value is greater than, or equal to at least one standard audio value within a standard audio value range that corresponds to the preset standard voice model of the fourth type, determine that the user action detected by the action monitoring unit 330 meets the preset disabling condition corresponding to the first application, and disable the first application; or if the running monitoring unit 310 detects that the first application is running, acquire an audio variation trend corresponding to the user's voice detected by the action monitoring unit 330 by using an audio monitoring apparatus included in the terminal device 300, match the acquired audio variation trend with at least one standard voice model of a fifth type, and if the acquired audio variation trend is the same as a standard audio variation trend corresponding to one standard voice model of the at least one standard voice model of the fifth type, determine that the user action detected by the action monitoring unit 330 meets the preset disabling condition corresponding to the first application, and disable the first application; or if the running monitoring unit 310 detects that the first application is running, acquire a volume variation trend corresponding to the user's voice detected by the action monitoring unit 330 by using an audio monitoring apparatus included in the terminal device 300, match the acquired volume variation trend with at least one standard voice model of a sixth type, and if the acquired volume variation trend is the same as a standard volume variation trend corresponding to one standard voice model of the at least one standard voice model of the sixth type, determine that the user action detected by the action monitoring unit 330 meets the preset disabling condition corresponding to the first application, and disable the first application; or if the running monitoring unit 310 detects that the first application is running, acquire an audio variation rate corresponding to the user's voice detected by the action monitoring unit 330 by using an audio monitoring apparatus included in the terminal device 300, match the acquired audio variation rate with at least one standard voice model of a seventh type, and if a deviation between the acquired audio variation rate and a standard audio variation rate that corresponds to one standard voice model of the at least one standard voice model of the seventh type is less than or equal to a threshold n5, determine that the user action detected by the action monitoring unit 330 meets the preset disabling condition corresponding to the first application, and disable the first application; or if the running monitoring unit 310 detects that the first application is running, acquire an audio variation rate corresponding to the user's voice detected by the action monitoring unit 330 by using an audio monitoring apparatus included in the terminal device 300, match the acquired audio variation rate with a preset standard voice model of a seventh type, and if the acquired audio variation rate is greater than, or equal to a standard audio variation rate corresponding to the preset standard voice model of the seventh type, determine that the user action detected by the action monitoring unit 330 meets the preset disabling condition corresponding to the first application, and disable the first application; or if the running monitoring unit 310 detects that the first application is running, acquire an audio variation rate corresponding to the user's voice detected by the action monitoring unit 330 by using an audio monitoring apparatus included in the terminal device 300, match the acquired audio variation rate with at least one standard voice model of an eighth type, and if a deviation between the acquired audio variation rate and at least one standard audio variation rate within a standard audio variation rate range that corresponds to one standard voice model of the at least one standard voice model of the eighth type is less than or equal to a threshold n6, determine that the user action detected by the action monitoring unit 330 meets the preset disabling condition corresponding to the first application, and disable the first application; or if the running monitoring unit 310 detects that the first application is running, acquire an audio variation rate corresponding to the user's voice detected by the action monitoring unit 330 by using an audio monitoring apparatus included in the terminal device 300, match the acquired audio variation rate with a preset standard voice model of an eighth type, and if the acquired audio variation rate is greater than, or equal to at least one standard audio variation rate within a standard audio variation rate range that corresponds to the preset standard voice model of the eighth type, determine that the user action detected by the action monitoring unit 330 meets the preset disabling condition corresponding to the first application, and disable the first application; or if the running monitoring unit 310 detects that the first application is running, acquire a volume variation rate corresponding to the user's voice detected by the action monitoring unit 330 by using an audio monitoring apparatus included in the terminal device 300, match the acquired volume variation rate with at least one standard voice model of a ninth type, and if a deviation between the acquired volume variation rate and a standard volume variation rate that corresponds to one standard voice model of the at least one standard voice model of the ninth type is less than or equal to a threshold n7, determine that the user action detected by the action monitoring unit 330 meets the preset disabling condition corresponding to the first application, and disable the first application; or if the running monitoring unit 310 detects that the first application is running, acquire a volume variation rate corresponding to the user's voice detected by the action monitoring unit 330 by using an audio monitoring apparatus included in the terminal device 300, match the acquired volume variation rate with a preset standard voice model of a ninth type, and if the acquired volume variation rate is greater than, or equal to a standard volume variation rate corresponding to the preset standard voice model of the ninth type, determine that the user action detected by the action monitoring unit 330 meets the preset disabling condition corresponding to the first application, and disable the first application; or if the running monitoring unit 310 detects that the first application is running, acquire a volume variation rate corresponding to the user's voice detected by the action monitoring unit 330 by using an audio monitoring apparatus included in the terminal device 300, match the acquired volume variation rate with at least one standard voice model of a tenth type, and if a deviation between the acquired volume variation rate and at least one standard volume variation rate within a standard volume variation rate range that corresponds to one standard voice model of the at least one standard voice model of the tenth type is less than or equal to a threshold n8, determine that the user action detected by the action monitoring unit 330 meets the preset disabling condition corresponding to the first application, and disable the first application; or if the running monitoring unit 310 detects that the first application is running, acquire a volume variation rate corresponding to the user's voice detected by the action monitoring unit 330 by using an audio monitoring apparatus included in the terminal device 300, match the acquired volume variation rate with a preset standard voice model of a tenth type, and if the acquired volume variation rate is greater than, or equal to at least one standard volume variation rate within a standard volume variation rate range that corresponds to the preset standard voice model of the tenth type, determine that the user action detected by the action monitoring unit 330 meets the preset disabling condition corresponding to the first application, and disable the first application; or if the running monitoring unit 310 detects that the first application is running, acquire a duration corresponding to the user's voice detected by the action monitoring unit 330 by using an audio monitoring apparatus included in the terminal device 300, match the acquired duration with at least one standard voice model of an eleventh type, and if a deviation between the acquired duration and a standard duration that corresponds to one standard voice model of the at least one standard voice model of the eleventh type is less than or equal to a threshold n9, determine that the user action detected by the action monitoring unit 330 meets the preset disabling condition corresponding to the first application, and disable the first application; or if the running monitoring unit 310 detects that the first application is running, acquire a duration corresponding to the user's voice detected by the action monitoring unit 330 by using an audio monitoring apparatus included in the terminal device 300, match the acquired duration with a preset standard voice model of an eleventh type, and if the acquired duration is greater than, or equal to a standard duration corresponding to the preset standard voice model of the eleventh type, determine that the user action detected by the action monitoring unit 330 meets the preset disabling condition corresponding to the first application, and disable the first application; or if the running monitoring unit 310 detects that the first application is running, acquire a duration corresponding to the user's voice detected by the action monitoring unit 330 by using an audio monitoring apparatus included in the terminal device 300, match the acquired duration with at least one standard voice model of a twelfth type, and if a deviation between the acquired duration and at least one standard duration within a standard duration range that corresponds to one standard voice model of the at least one standard voice model of the twelfth type is less than or equal to a threshold n10, determine that the user action detected by the action monitoring unit 330 meets the preset disabling condition corresponding to the first application, and disable the first application; or if the running monitoring unit 310 detects that the first application is running, acquire a duration corresponding to the user's voice detected by the action monitoring unit 330 by using an audio monitoring apparatus included in the terminal device 300, match the acquired duration with a preset standard voice model of a twelfth type, and if the acquired duration is greater than, or equal to at least one standard duration within a standard duration range that corresponds to the preset standard voice model of the twelfth type, determine that the user action detected by the action monitoring unit 330 meets the preset disabling condition corresponding to the first application, and disable the first application; or if the running monitoring unit 310 detects that the first application is running, convert the user's voice detected by the action monitoring unit 330 by using an audio monitoring apparatus included in the terminal device 300 into a corresponding digital voice signal, match the digital voice signal obtained after conversion with at least one standard voice model of a thirteenth type, and if a deviation between the digital voice signal and a standard digital voice signal that corresponds to one standard voice model of the at least one standard voice model of the thirteenth type is less than or equal to a threshold n11, determine that the user action detected by the action monitoring unit 330 meets the preset disabling condition corresponding to the first application, and disable the first application.

In some embodiments of the present invention, a terminal device that has the architecture shown in FIG. 1 is used as an example. The running monitoring unit 310, the icon displaying unit 320, the action monitoring unit 330, and the control unit 340 may be located at, for example, the framework layer of the architecture shown in FIG. 1-*d*, and for example, may be specifically located in the system service component or another component at the framework layer.

It may be understood that functions of each function module of the terminal device 300 in this embodiment may be specifically implemented according to the method in the foregoing method embodiment, for a specific implementation PROCESS, reference may be made to the related description in the foregoing method embodiment, and details are not described herein again.

It may be learned from the foregoing that, in the technical solution of this embodiment, a terminal device 300 monitors whether a first application on the terminal device is running, and monitors a user's action of operating a desktop of the terminal device; displays, on the desktop, a running-state icon corresponding to the first application if it is detected that the first application is running, or displays, on the desktop, a disabled-state icon corresponding to the first application if it is detected that the first application is in a disabled state, where the running-state icon corresponding to the first application and the disabled-state icon corresponding to the first application have different appearances; and disables the first application if the first application is running and the detected user action meets a preset disabling condition corresponding to the first application. When the first application is running, the running-state icon corresponding to the first application is displayed, and when the first application is in the disabled state, the disabled-state icon corresponding to the first application is displayed; for a running-state icon and a disabled-state icon of a same application, different appearances are displayed on the desktop. In this way, the user is shielded from professional data in the background of an operating system, and meanwhile, it is convenient for the user to learn a running status of each application in the system in a more visualized and clearer manner. In addition, when the detected user action meets the preset disabling condition corresponding to the first application, the first application that is running is disabled, and this mechanism helps the user to easily and quickly disable some unnecessary applications, which helps improve convenience and flexibility in disabling an application and enhance user experience, and meanwhile helps save energy.

Figure 4:
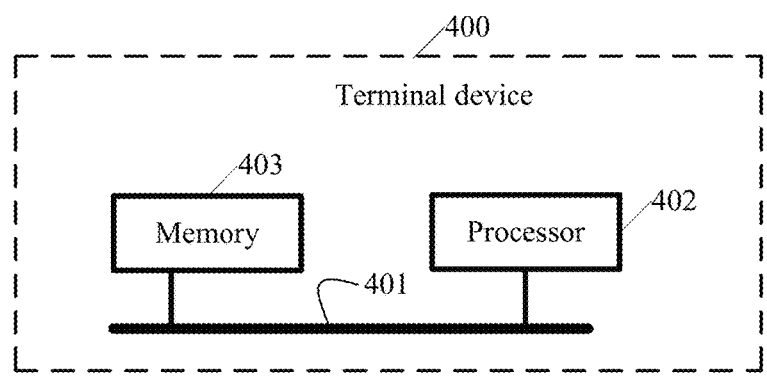
FIG. 4 is a schematic diagram of another terminal device according to an embodiment of the present invention.

Referring to FIG. 4, FIG. 4 is a schematic diagram of a terminal device 400 according to an embodiment of the present invention. The terminal device 400 may include at least one bus 401, at least one threador 402 that is connected to the bus 401, and at least one memory 403 that is connected to the bus 401.

The threador 402 invokes, through the bus 401, code stored in the memory 403, so as to: monitor whether a first application is running; display, on a desktop, a running-state icon corresponding to the first application if it is detected that the first application is running, or display, on a desktop, a disabled-state icon corresponding to the first application if it is detected that the first application is in a disabled state, where the running-state icon corresponding to the first application and the disabled-state icon corresponding to the first application have different appearances; monitor a user's action; and disable the first application if the first application is running and the detected user action meets a preset disabling condition corresponding to the first application.

In some embodiments of the present invention, the threador 402 may use a system thread or another manner to monitor whether the first application is running, for example, may use a thread status pool to monitor whether the first application is running, where the thread status pool is a system thread.

In some embodiments of the present invention, a global thread status may be monitored in the thread status pool, and the thread status pool may store detected data by using a linked list or in another manner. A system thread pool may be used as an index of all threads in a system, and a thread may be maintained in the system thread pool in a thread registration/deregistration manner. The thread status pool may be considered as a special daemon, where the daemon may have highest access permission and is used to refresh and synchronize a thread status in the system thread pool in real time.

In some embodiments of the present invention, each time a thread status changes (including changes of statuses such as a protection flag bit, a thread status, and a position at which a thread is located), a version number of thread status information may increase by 1. One version number may also be maintained in a thread form maintained in the system thread pool. When the thread status pool and the system thread pool are synchronizing with each other, values of version numbers of the thread status pool and the system thread pool may be compared in a traversal manner. If a version number of thread status information of a thread in the form maintained in the system thread pool is earlier than a version number of thread status information of a corresponding thread maintained in the thread status pool, the version numbers of the thread status information are synchronized with each other (that is, the version number of the thread status information of the corresponding thread in the form maintained in the system thread pool is modified), and a corresponding icon on the desktop may also be updated synchronously.

In some embodiments of the present invention, the threador 402 may further be configured to set some applications to a protected state or an unprotected state. For an application in an unprotected state, the user may freely disable the application according to a requirement; and for an application in a protected state, the user is not allowed to randomly disable the application, so as to prevent a misoperation of the user. For example, as a security protection tool of a mobile phone, the 360 Mobile Security may be set as a protected application, and the user is not allowed to randomly disable such kind of application. For example, the threador 402 may be configured to set a status of the first application to a protected state or an unprotected state according to a user instruction or a preset policy. Setting the first application to the protected state or the unprotected state according to the preset policy may include, for example, if the first application is a security application or a core system application, setting the first application to the protected state or the unprotected state, from which setting the first application according to another preset policy can be deduced.

For example, if the first application is running, the first application is currently in the unprotected state, and the detected user action meets the preset disabling condition corresponding to the first application, the first application is disabled. In addition, if the first application is running and the first application is currently in the protected state, the threador 402 does not disable the first application even if the detected user action meets the preset disabling condition corresponding to the first application. For example, the first application may be disabled after being set to the unprotected state.

In some embodiments of the present invention, disabling the first application if the user action detected by the threador 402 meets the preset disabling condition corresponding to the first application may include: disabling the first application if it is detected that a touch track performed by the user on a touch sensor indicates that the running-state icon of the first application is flicked away so that the flicked-away running-state icon of the first application hits an edge of a screen. For example, the running-state icon corresponding to the first application has a crystal ball shrouding effect, and the disabled-state icon corresponding to the first application does not have the crystal ball shrouding effect.

In some embodiments of the present invention, if the running-state icon corresponding to the first application has a crystal ball shrouding effect, and the disabled-state icon corresponding to the first application does not have the crystal ball shrouding effect (or has a crystal ball shrouding effect different from that of the running-state icon), disabling the first application if the user action detected by the threador 402 meets the preset disabling condition corresponding to the first application may include: disabling the first application if it is detected that a touch track performed by the user on a touch sensor indicates that the running-state icon of the first application is clamped so that a crystal ball in which the running-state icon of the first application is shrouded is broken.

In some embodiments of the present invention, the first application includes multiple sub-applications, and disabling the first application if the user action detected by the threador 402 meets the preset disabling condition corresponding to the first application includes: disabling, in batches, the multiple sub-applications included in the first application if it is detected that a touch track performed by the user on a touch sensor passes through the multiple sub-applications included in the first application at a moving speed greater than or equal to a first speed threshold.

Monitoring the user's action may include monitoring one or more user's actions.

In some embodiments of the present invention, that the threador 402 monitors the user's action may include: monitoring the user's gesture, monitoring the user's moving track, monitoring the user's voice, monitoring a variation of a distance between the user and the terminal device, and/or monitoring a touch track performed by the user on a touch sensor included in the terminal device 400, and the like.

In some embodiments of the present invention, that the user action detected by the threador 402 meets the preset disabling condition corresponding to the first application may include:

matching a touch end point of the detected touch track performed by the user on the touch sensor included in the terminal device 400 with at least one standard touch point model of a first type, and if the matching succeeds, determining that the detected user action meets the preset disabling condition corresponding to the first application; or matching a touch start point and a touch end point of the detected touch track performed by the user on the touch sensor included in the terminal device 400 with at least one standard touch point model of a second type, and if the matching succeeds, determining that the detected user action meets the preset disabling condition corresponding to the first application; or determining a touch direction corresponding to the detected touch track performed by the user on the touch sensor included in the terminal device 400, matching the determined touch direction with at least one standard touch track model of a first type, and if a deviation between the determined touch direction and a standard touch direction that is included in one standard touch track model of the at least one standard touch track model of the first type is less than a third threshold, determining that the detected user action meets the preset disabling condition corresponding to the first application; or determining a touch graph corresponding to the detected touch track performed by the user on the touch sensor included in the terminal device 400, matching the determined touch graph with at least one standard touch track model of a second type, and if a similarity between the determined touch graph and a standard touch graph that is included in one standard touch track model of the second type of the at least one standard touch track model of the second type is greater than a fourth threshold, determining that the detected user action meets the preset disabling condition corresponding to the first application; or determining a moving direction corresponding to the user's moving track detected by using a camera included in the terminal device 400, matching the determined moving direction with at least one standard moving track model of a first type, and if a deviation between the determined moving direction and a standard moving direction that corresponds to one standard moving track model of the at least one standard moving track model of the first type is less than or equal to a threshold m1, determining that the detected user action meets the preset disabling condition corresponding to the first application; or determining a graph corresponding to the user's moving track detected by using a camera included in the terminal device 400, matching the determined graph with at least one standard moving track model of a second type, and if a similarity between the determined graph and a standard graph that corresponds to one standard moving track model of the at least one standard moving track model of the second type is greater than or equal to a threshold m2, determining that the detected user action meets the preset disabling condition corresponding to the first application; or determining a motion rate corresponding to the user's moving track detected by using a camera included in the terminal device 400, matching the determined motion rate with at least one standard moving track model of a third type, and if a deviation between the determined motion rate and a standard motion rate that corresponds to one standard moving track model of the at least one standard moving track model of the third type is less than or equal to a threshold m3, determining that the detected user action meets the preset disabling condition corresponding to the first application; or determining a motion rate corresponding to the user's moving track detected by using a camera included in the terminal device 400, matching the determined motion rate with a preset standard moving track model of a third type, and if the determined motion rate is greater than, or equal to a standard motion rate corresponding to the preset standard moving track model of the third type, determining that the detected user action meets the preset disabling condition corresponding to the first application; or determining a motion rate corresponding to the user's moving track detected by using a camera included in the terminal device 400, matching the determined motion rate with at least one standard moving track model of a fourth type, and if a deviation between the determined motion rate and at least one standard motion rate within a standard motion rate range that corresponds to one standard moving track model of the at least one standard moving track model of the fourth type is less than or equal to a threshold m4, determining that the detected user action meets the preset disabling condition corresponding to the first application; or determining a motion rate corresponding to the user's moving track detected by using a camera included in the terminal device 400, matching the determined motion rate with a preset standard moving track model of a fourth type, and if the determined motion rate is greater than, or equal to at least one standard motion rate within a standard motion rate range that corresponds to the preset standard moving track model of the fourth type, determining that the detected user action meets the preset disabling condition corresponding to the first application; or determining a motion displacement corresponding to the user's moving track detected by using a camera included in the terminal device 400, matching the determined motion displacement with at least one standard moving track model of a fifth type, and if a deviation between the determined motion displacement and a standard motion displacement that corresponds to one standard moving track model of the at least one standard moving track model of the fifth type is less than or equal to a threshold m5, determining that the detected user action meets the preset disabling condition corresponding to the first application; or determining a motion displacement corresponding to the user's moving track detected by using a camera included in the terminal device 400, matching the determined motion displacement with a preset standard moving track model of a fifth type, and if the determined motion displacement is greater than, less than, or equal to a standard motion displacement corresponding to the preset standard moving track model of the fifth type, determining that the detected user action meets the preset disabling condition corresponding to the first application; or determining a motion displacement corresponding to the user's moving track detected by using a camera included in the terminal device 400, matching the determined motion displacement with at least one standard moving track model of a sixth type, and if a deviation between the determined motion displacement and at least one standard motion displacement within a standard motion displacement range that corresponds to one standard moving track model of the at least one standard moving track model of the sixth type is less than or equal to a threshold m6, determining that the detected user action meets the preset disabling condition corresponding to the first application; or determining a motion displacement corresponding to the user's moving track detected by using a camera included in the terminal device 400, matching the determined motion displacement with a preset standard moving track model of a sixth type, and if the determined motion displacement is greater than, less than, or equal to at least one standard motion displacement within a standard motion displacement range that corresponds to the preset standard moving track model of the sixth type, determining that the detected user action meets the preset disabling condition corresponding to the first application; or determining a motion duration corresponding to the user's moving track detected by using a camera included in the terminal device 400, matching the determined motion duration with at least one standard moving track model of a seventh type, and if a deviation between the determined motion duration and a standard motion duration that corresponds to one standard moving track model of the at least one standard moving track model of the seventh type is less than or equal to a threshold m7, determining that the detected user action meets the preset disabling condition corresponding to the first application; or determining a motion duration corresponding to the user's moving track detected by using a camera included in the terminal device 400, matching the determined motion duration with a preset standard moving track model of a seventh type, and if the determined motion duration is greater than, less than, or equal to a standard motion duration corresponding to the preset standard moving track model of the seventh type, determining that the detected user action meets the preset disabling condition corresponding to the first application; or determining a motion duration corresponding to the user's moving track detected by using a camera included in the terminal device 400, matching the determined motion duration with at least one standard moving track model of an eighth type, and if a deviation between the determined motion duration and at least one standard motion duration within a standard motion duration range that corresponds to one standard moving track model of the at least one standard moving track model of the eighth type is less than or equal to a threshold m8, determining that the detected user action meets the preset disabling condition corresponding to the first application; or determining a motion duration corresponding to the user's moving track detected by using a camera included in the terminal device 400, matching the determined motion duration with a preset standard moving track model of an eighth type, and if the determined motion duration is greater than, less than, or equal to at least one standard motion duration within a standard motion duration range that corresponds to the preset standard moving track model of the eighth type, determining that the detected user action meets the preset disabling condition corresponding to the first application; or acquiring a volume value corresponding to the user's voice detected by using an audio monitoring apparatus included in the terminal device 400, matching the acquired volume value with at least one standard voice model of a first type, and if a deviation between the acquired volume value and a standard volume value that corresponds to one standard voice model of the at least one standard voice model of the first type is less than or equal to a threshold n1, determining that the detected user action meets the preset disabling condition corresponding to the first application; or acquiring a volume value corresponding to the user's voice detected by using an audio monitoring apparatus included in the terminal device 400, matching the acquired volume value with a preset standard voice model of a first type, and if the acquired volume value is greater than, or equal to a standard volume value corresponding to the preset standard voice model of the first type, determining that the detected user action meets the preset disabling condition corresponding to the first application;

acquiring a volume value corresponding to the user's voice detected by using an audio monitoring apparatus included in the terminal device 400, matching the acquired volume value with at least one standard voice model of a second type, and if a deviation between the acquired volume value and at least one standard volume value within a standard volume value range that corresponds to one standard voice model of the at least one standard voice model of the second type is less than or equal to a threshold n2, determining that the detected user action meets the preset disabling condition corresponding to the first application; or acquiring a volume value corresponding to the user's voice detected by using an audio monitoring apparatus included in the terminal device 400, matching the acquired volume value with a preset standard voice model of a second type, and if the acquired volume value is greater than, or equal to at least one standard volume value within a standard volume value range that corresponds to the preset standard voice model of the second type, determining that the detected user action meets the preset disabling condition corresponding to the first application; or acquiring an audio value corresponding to the user's voice detected by using an audio monitoring apparatus included in the terminal device 400, matching the acquired audio value with at least one standard voice model of a third type, and if a deviation between the acquired audio value and a standard audio value that corresponds to one standard voice model of the at least one standard voice model of the third type is less than or equal to a threshold n3, determining that the detected user action meets the preset disabling condition corresponding to the first application; or acquiring an audio value corresponding to the user's voice detected by using an audio monitoring apparatus included in the terminal device 400, matching the acquired audio value with a preset standard voice model of a third type, and if the acquired audio value is greater than, or equal to a standard audio value corresponding to the preset standard voice model of the third type, determining that the detected user action meets the preset disabling condition corresponding to the first application; or acquiring an audio value corresponding to the user's voice detected by using an audio monitoring apparatus included in the terminal device 400, matching the acquired audio value with at least one standard voice model of a fourth type, and if a deviation between the acquired audio value and at least one standard audio value within a standard audio value range that corresponds to one standard voice model of the at least one standard voice model of the fourth type is less than or equal to a threshold n4, determining that the detected user action meets the preset disabling condition corresponding to the first application; or acquiring an audio value corresponding to the user's voice detected by using an audio monitoring apparatus included in the terminal device 400, matching the acquired audio value with a preset standard voice model of a fourth type, and if the acquired audio value is greater than, or equal to at least one standard audio value within a standard audio value range that corresponds to the preset standard voice model of the fourth type, determining that the detected user action meets the preset disabling condition corresponding to the first application; or acquiring an audio variation trend corresponding to the user's voice detected by using an audio monitoring apparatus included in the terminal device 400, matching the acquired audio variation trend with at least one standard voice model of a fifth type, and if the acquired audio variation trend is the same as a standard audio variation trend corresponding to one standard voice model of the at least one standard voice model of the fifth type, determining that the detected user action meets the preset disabling condition corresponding to the first application; or acquiring a volume variation trend corresponding to the user's voice detected by using an audio monitoring apparatus included in the terminal device 400, matching the acquired volume variation trend with at least one standard voice model of a sixth type, and if the acquired volume variation trend is the same as a standard volume variation trend corresponding to one standard voice model of the at least one standard voice model of the sixth type, determining that the detected user action meets the preset disabling condition corresponding to the first application; or acquiring an audio variation rate corresponding to the user's voice detected by using an audio monitoring apparatus included in the terminal device 400, matching the acquired audio variation rate with at least one standard voice model of a seventh type, and if a deviation between the acquired audio variation rate and a standard audio variation rate that corresponds to one standard voice model of the at least one standard voice model of the seventh type is less than or equal to a threshold n5, determining that the detected user action meets the preset disabling condition corresponding to the first application; or acquiring an audio variation rate corresponding to the user's voice detected by using an audio monitoring apparatus included in the terminal device 400, matching the acquired audio variation rate with a preset standard voice model of a seventh type, and if the acquired audio variation rate is greater than, or equal to a standard audio variation rate corresponding to the preset standard voice model of the seventh type, determining that the detected user action meets the preset disabling condition corresponding to the first application; or acquiring an audio variation rate corresponding to the user's voice detected by using an audio monitoring apparatus included in the terminal device 400, matching the acquired audio variation rate with at least one standard voice model of an eighth type, and if a deviation between the acquired audio variation rate and at least one standard audio variation rate within a standard audio variation rate range that corresponds to one standard voice model of the at least one standard voice model of the eighth type is less than or equal to a threshold n6, determining that the detected user action meets the preset disabling condition corresponding to the first application; or acquiring an audio variation rate corresponding to the user's voice detected by using an audio monitoring apparatus included in the terminal device 400, matching the acquired audio variation rate with a preset standard voice model of an eighth type, and if the acquired audio variation rate is greater than, or equal to at least one standard audio variation rate within a standard audio variation rate range that corresponds to the preset standard voice model of the eighth type, determining that the detected user action meets the preset disabling condition corresponding to the first application; or acquiring a volume variation rate corresponding to the user's voice detected by using an audio monitoring apparatus included in the terminal device 400, matching the acquired volume variation rate with at least one standard voice model of a ninth type, and if a deviation between the acquired volume variation rate and a standard volume variation rate that corresponds to one standard voice model of the at least one standard voice model of the ninth type is less than or equal to a threshold n7, determining that the detected user action meets the preset disabling condition corresponding to the first application; or acquiring a volume variation rate corresponding to the user's voice detected by using an audio monitoring apparatus included in the terminal device 400, matching the acquired volume variation rate with a preset standard voice model of a ninth type, and if the acquired volume variation rate is greater than, or equal to a standard volume variation rate corresponding to the preset standard voice model of the ninth type, determining that the detected user action meets the preset disabling condition corresponding to the first application; or acquiring a volume variation rate corresponding to the user's voice detected by using an audio monitoring apparatus included in the terminal device 400, matching the acquired volume variation rate with at least one standard voice model of a tenth type, and if a deviation between the acquired volume variation rate and at least one standard volume variation rate within a standard volume variation rate range that corresponds to one standard voice model of the at least one standard voice model of the tenth type is less than or equal to a threshold n8, determining that the detected user action meets the preset disabling condition corresponding to the first application; or acquiring a volume variation rate corresponding to the user's voice detected by using an audio monitoring apparatus included in the terminal device 400, matching the acquired volume variation rate with a preset standard voice model of a tenth type, and if the acquired volume variation rate is greater than, or equal to at least one standard volume variation rate within a standard volume variation rate range that corresponds to the preset standard voice model of the tenth type, determining that the detected user action meets the preset disabling condition corresponding to the first application; or acquiring a duration corresponding to the user's voice detected by using an audio monitoring apparatus included in the terminal device 400, matching the acquired duration with at least one standard voice model of an eleventh type, and if a deviation between the acquired duration and a standard duration that corresponds to one standard voice model of the at least one standard voice model of the eleventh type is less than or equal to a threshold n9, determining that the detected user action meets the preset disabling condition corresponding to the first application; or acquiring a duration corresponding to the user's voice detected by using an audio monitoring apparatus included in the terminal device 400, matching the acquired duration with a preset standard voice model of an eleventh type, and if the acquired duration is greater than, or equal to a standard duration corresponding to the preset standard voice model of the eleventh type, determining that the detected user action meets the preset disabling condition corresponding to the first application; or acquiring a duration corresponding to the user's voice detected by using an audio monitoring apparatus included in the terminal device 400, matching the acquired duration with at least one standard voice model of a twelfth type, and if a deviation between the acquired duration and at least one standard duration within a standard duration range that corresponds to one standard voice model of the at least one standard voice model of the twelfth type is less than or equal to a threshold n10, determining that the detected user action meets the preset disabling condition corresponding to the first application; or acquiring a duration corresponding to the user's voice detected by using an audio monitoring apparatus included in the terminal device 400, matching the acquired duration with a preset standard voice model of a twelfth type, and if the acquired duration is greater than, or equal to at least one standard duration within a standard duration range that corresponds to the preset standard voice model of the twelfth type, determining that the detected user action meets the preset disabling condition corresponding to the first application; or converting the user's voice detected by using an audio monitoring apparatus included in the terminal device 400 into a corresponding digital voice signal, matching the digital voice signal obtained after conversion with at least one standard voice model of a thirteenth type, and if a deviation between the digital voice signal and a standard digital voice signal that corresponds to one standard voice model of the at least one standard voice model of the thirteenth type is less than or equal to a threshold n11, determining that the detected user action meets the preset disabling condition corresponding to the first application.

It may be understood that the manners in the foregoing examples are merely exemplary, and other manners are no longer listed one by one herein.

The solution in this embodiment of the present invention may be applied in multiple terminal devices 400, for example, may be applied in terminal devices such as a mobile phone, a portable computer, and personal digital threading that have a touch sensor, a camera, and/or an audio monitoring apparatus. The touch sensor may include, for example, a component that can sense a touch, such as a touchscreen, a position sensor, or a touch-sensitive button.

It may be understood that functions of some components of the terminal device 400 in this embodiment may be specifically implemented according to the method in the foregoing method embodiment, for a specific implementation PROCESS, reference may be made to the related description in the foregoing method embodiment, and details are not described herein again.

It may be learned from the foregoing that, in the solution of this embodiment, a terminal device 400 monitors whether a first application on the terminal device is running, and monitors a user's action of operating a desktop of the terminal device; displays, on the desktop, a running-state icon corresponding to the first application if it is detected that the first application is running, or displays, on the desktop, a disabled-state icon corresponding to the first application if it is detected that the first application is in a disabled state, where the running-state icon corresponding to the first application and the disabled-state icon corresponding to the first application have different appearances; and disables the first application if the first application is running and the detected user action meets a preset disabling condition corresponding to the first application. For a running-state icon and a disabled-state icon of a same application, different appearances are displayed on the desktop. In this way, the user is shielded from professional data in the background of an operating system, and meanwhile, it is convenient for the user to learn a running status of each application in the system in a more visualized and clearer manner. In addition, when the detected user action meets the preset disabling condition corresponding to the first application, the first application that is running is disabled, and this mechanism helps the user to easily and quickly disable some unnecessary applications, which helps improve convenience and flexibility in disabling an application and enhance user experience, and meanwhile helps save energy.

Figure 5:
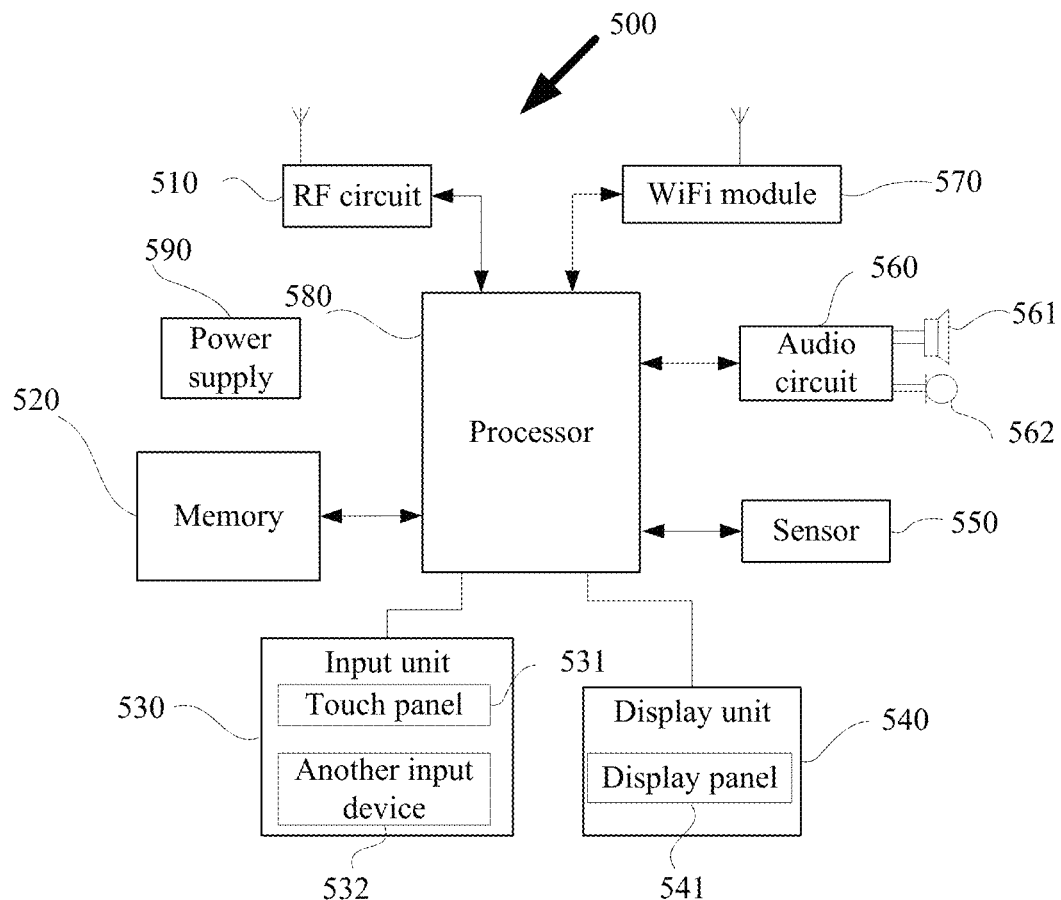
FIG. 5 is a schematic diagram of another terminal device according to an embodiment of the present invention.

Referring to FIG. 5, an embodiment of the present invention further provides a terminal device 500.

As shown in FIG. 5, for ease of description, only parts related to this embodiment of the present invention are illustrated. For technical details that are not disclosed, refer to the method part in the embodiments of the present invention. A terminal device 500 shown in FIG. 5 may be any terminal device such as a mobile phone, a tablet computer, a personal digital assistant (PDA, Personal Digital Assistant), a point of sales (POS, Point of Sales), or a vehicle-mounted computer. An example in which the terminal device 500 is a mobile phone is mainly used in the following.

FIG. 5 is a block diagram of a part of a structure of a mobile phone related to a terminal according to an embodiment of the present invention. Referring to FIG. 5, the mobile phone includes components such as a radio frequency (Radio Frequency, RF) circuit 510, a memory 520, an input unit 530, a Wireless Fidelity (wireless fidelity, WiFi) module 570, a displaying unit 540, a sensor 550, an audio circuit 560, a threador 580, and a power supply 590.

Persons skilled in the art may understand that the structure of the mobile phone shown in FIG. 5 does not constitute a limitation on the mobile phone, components more or less than those shown in FIG. 5 may be included, some components may be combined, or the components may be arranged in a different manner.

The following describes constituent components of the mobile phone in detail with reference to FIG. 5.

The RF circuit 510 may be configured to receive and send a signal in an information receiving and sending PROCESS or a call PROCESS, and particularly, after receiving downlink information of a base station, send the downlink information to the threador 580 for threading; and in addition, send uplink-related data to the base station. Generally, the RF circuit includes but is not limited to an antenna, at least one amplifier, a transceiver, a coupler, a low noise amplifier (Low Noise Amplifier, LNA), a duplexer, and the like. In addition, the RF circuit 510 may further communicate with a network and another device by means of wireless communication. The wireless communication may use any communications standard or protocol, including but not limited to Global System for Mobile Communications (Global System of Mobile communication, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an E-mail, a short message service (Short Messaging Service, SMS), and the like.

The memory 520 may be configured to store a software program and a software module, and the threador 580 executes, by running the software program and the software module that are stored in the memory 520, various functional applications of the mobile phone and data threading. The memory 520 may mainly include a program storage area and a data storage area. The program storage area may store an operating system, an application program that is required by at least one function (such as a sound playing function or an image playing function), and the like. The data storage area may store data (such as audio data or a phonebook) that is created according to use of the mobile phone, and the like. In addition, the memory 520 may include a high-speed random access memory, or may include a non-volatile memory, for example, at least one magnetic disk memory, a flash memory, or another volatile solid-state memory.

The input unit 530 may be configured to receive input numeral or character information, and generate a key signal input related to user setting and function control of the mobile phone 500. Specifically, the input unit 530 may include a touch panel 531 and another input device 532. The touch panel 531, also referred to as a touchscreen, may collect a user's touch operation (such as an operation that the user performs on the touch panel 531 or near the touch panel 531 by using a finger, a stylus, or any other suitable object or accessory) on or near the touch panel 531, and drives a corresponding connection apparatus according to a preset program. Optionally, the touch panel 531 may include two parts: a touch detecting apparatus and a touch controller. The touch detecting apparatus detects a touch orientation of a user, detects a signal generated by a touch operation, and transmits the signal to the touch controller. The touch controller receives touch information from the touch detecting apparatus, converts the touch information into touch coordinates, and sends the touch coordinates to the threador 580; and can receive and execute a command sent by the threador 580. In addition, the touch panel 531 may be implemented in multiple types, such as a resistive type, a capacitive type, an infrared type, and a surface acoustic wave type. In addition to the touch panel 531, the input unit 530 may further include the another input device 532. Specifically, the another input device 532 may include but is not limited to one or more of: a physical keyboard, a function key (such as a volume control key or a power on/off key), a trackball, a mouse, a joystick, and the like.

The displaying unit 540 may be configured to display information input by a user or information provided for a user and various menus of the mobile phone. The displaying unit 540 may include a display panel 541. Optionally, the display panel 541 may be configured in a form of a liquid crystal display (Liquid Crystal Display, LCD), an organic light-emitting diode (Organic Light-Emitting Diode, OLED), and the like. Further, the touch panel 531 may cover the display panel 541. When the touch panel 531 detects a touch operation on or near the touch panel 531, the touch panel 531 transmits a detected touch signal to the threador 580 to determine a type of a touch event, and then the threador 580 provides a corresponding visual output on the display panel 541 according to the type of the touch event. Although, in FIG. 5, the touch panel 531 and the display panel 541 are two independent parts for implementing an input function of the mobile phone, in some embodiments, the touch panel 531 and the display panel 541 may be integrated to implement input and output functions of the mobile phone.

The mobile phone 500 may further include at least one sensor 550, such as an optical sensor, a motion sensor, or another sensor. Specifically, the optical sensor may include an ambient light sensor and a proximity sensor. The ambient light sensor may adjust brightness of the display panel 541 according to brightness of ambient light, and the proximity sensor may turn off the display panel 541 and/or backlight when the mobile phone moves to an ear. As a motion sensor, an accelerometer sensor may detect a value of acceleration in each direction (generally, three axes), may detect a value and a direction of the gravity in static mode, and may be used for an application that identifies a mobile phone posture (such as screen switching between landscape and portrait, a related game, and magnetometer posture calibration), a function related to vibration identification (such as a pedometer or a tap), and the like. For a gyroscope, a barometer, a hygrometer, a thermometer, an infrared sensor, and other sensors that may further be disposed on the mobile phone, details are not described herein again.

The audio circuit 560, a loudspeaker 561, and a microphone 562 may provide an audio interface between a user and the mobile phone. The audio circuit 560 may transmit, to the loudspeaker 561, an electrical signal obtained by converting received audio data, and the loudspeaker 561 converts the electrical signal into a voice signal for outputting. In another aspect, the microphone 562 converts a collected voice signal into an electrical signal, the audio circuit 560 converts the electrical signal into audio data after receiving the electrical signal and outputs the audio data to the threador 580 for threading, and then the audio data is sent to, for example, another mobile phone, after passing through the RF circuit 510, or the audio data is output to the memory 520 for further threading.

WiFi belongs to a short-distance wireless transmission technology. The mobile phone may help, by using the WiFi module 570, a user receive and send an E-mail, browse a web page, access stream media, and the like. The WiFi transmission technology provides wireless broadband Internet access for a user. Although FIG. 5 shows the WiFi module 570, it may be understood that, the WiFi module 570 is not a mandatory component of the mobile phone 500, and may be omitted according to a requirement without changing the essence of the present invention.

The threador 580 is a control center of the mobile phone, uses various interfaces and buses to connect all parts of the entire mobile phone, and executes various functions of the mobile phone and threads data by running or executing a software program and/or software module stored in the memory 520 and by invoking data stored in the memory 520, so as to perform overall monitoring on the mobile phone. Optionally, the threador 580 may include one or more threading units. Preferably, the threador 580 may integrate an application threador and a modem threador. The application threador mainly threads an operating system, a user interface, an application program, and the like; and the modem threador mainly threads wireless communication. It may be understood that the threador 580 may also not integrate the foregoing modem threador.

The mobile phone 500 further includes the power supply 590 (for example, a battery) that supplies power to each component. Preferably, the power supply may be logically connected to the threador 580 by using a power supply management system, so that functions such as charging, discharging, and power consumption management are implemented by using the power supply management system. Although not shown in the figure, the mobile phone 500 may further include a camera, a Bluetooth module, and the like, which are no longer described herein.

In this embodiment of the present invention, the threador 580 included in the mobile phone further has the following functions: monitoring whether a first application on the mobile phone is running, and monitoring a user's action of operating a desktop of the mobile phone; displaying, on the desktop, a running-state icon corresponding to the first application if it is detected that the first application is running, or displaying, on the desktop, a disabled-state icon corresponding to the first application if it is detected that the first application is in a disabled state, where the running-state icon corresponding to the first application and the disabled-state icon corresponding to the first application have different appearances; and disabling the first application if the first application is running and the detected user action meets a preset disabling condition corresponding to the first application.

It may be understood that functions of some components of the mobile phone 500 in this embodiment may be specifically implemented according to the method in the foregoing method embodiment, for a specific implementation PROCESS, reference may be made to the related description in the foregoing method embodiment, and details are not described herein again.

Figure 6:
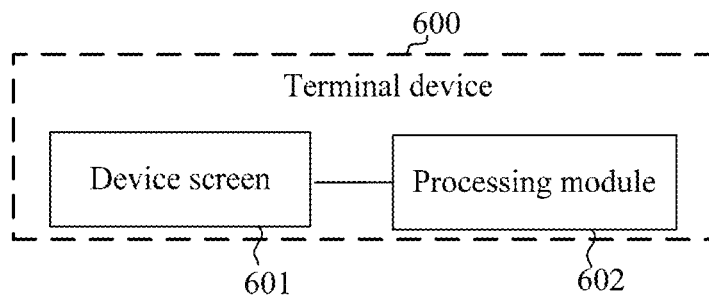
FIG. 6 is a schematic diagram of another terminal device according to an embodiment of the present invention.

Referring to FIG. 6, FIG. 6 is a structural block diagram of a terminal device 600 according to another embodiment of the present invention.

The terminal device 600 includes a device screen 601 and a threading module 602. The device screen 601 is connected to the threading module 602.

The threading module 602 is configured to: monitor whether a first application on the terminal device 600 is running, and monitor a user's action of operating a desktop of the terminal device; and if it is detected that the first application is running, control the device screen 601 to display a running-state icon corresponding to the first application, and disable the first application if it is detected that the first application is running and the detected user action meets a preset disabling condition corresponding to the first application; or if it is detected that the first application is in a disabled state, control the device screen 601 to display a disabled-state icon corresponding to the first application.

The device screen 601 is configured to display, under the control of the threading module 602, the running-state icon corresponding to the first application or the disabled-state icon corresponding to the first application, where the running-state icon corresponding to the first application and the disabled-state icon corresponding to the first application have different appearances.

In some embodiments of the present invention, the device screen 601 may be, for example, a touch sensor (that is, the device screen 601 is a touchscreen). Alternatively, the terminal device 600 further includes a touch sensor (not shown in the figure).

In some embodiments of the present invention, the threading module 602 may further be configured to set some applications to a protected state or an unprotected state. For an application in an unprotected state, the user may freely disable the application according to a requirement; and for an application in a protected state, the user is not allowed to randomly disable the application, so as to prevent a misoperation of the user. For example, as a security protection tool of a mobile phone, the 360 Mobile Security may be set as a protected application, and the user is not allowed to randomly disable such kind of application. For example, the threading module 602 may further be configured to set a status of the first application to a protected state or an unprotected state according to a user instruction or a preset policy. Setting the first application to the protected state or the unprotected state according to the preset policy may include, for example, if the first application is a security application or a core system application, setting the first application to the protected state or the unprotected state, from which setting the first application according to another preset policy can be deduced.

For example, if the first application is running, the first application is currently in the unprotected state, and the detected user action meets the preset disabling condition corresponding to the first application, the first application is disabled. In addition, if the first application is running, and the first application is currently in the protected state, the threading module 602 does not disable the first application even if the detected user action meets the preset disabling condition corresponding to the first application. For example, the first application may be disabled after being set to the unprotected state.

In some embodiments of the present invention, in the aspect of disabling the first application if the detected user action meets the preset disabling condition corresponding to the first application, the threading module 602 is specifically configured to: disable the first application if it is detected that a touch track performed by the user on the touch sensor indicates that the running-state icon of the first application is flicked away so that the flicked-away running-state icon of the first application hits an edge of a screen. For example, the running-state icon corresponding to the first application has a crystal ball shrouding effect, and the disabled-state icon corresponding to the first application does not have the crystal ball shrouding effect.

In some embodiments of the present invention, if the running-state icon corresponding to the first application has a crystal ball shrouding effect, and the disabled-state icon corresponding to the first application does not have the crystal ball shrouding effect (or has a crystal ball shrouding effect different from that of the running-state icon), in the aspect of disabling the first application if the detected user action meets the preset disabling condition corresponding to the first application, the threading module 602 is specifically configured to: disable the first application if it is detected that a touch track performed by the user on the touch sensor indicates that the running-state icon of the first application is clamped so that a crystal ball in which the running-state icon of the first application is shrouded is broken.

In some embodiments of the present invention, the first application includes multiple sub-applications. In the aspect of disabling the first application if the detected user action meets the preset disabling condition corresponding to the first application, the threading module 602 is specifically configured to: disable, in batches, the multiple sub-applications included in the first application if it is detected that a touch track performed by the user on the touch sensor passes through the multiple sub-applications included in the first application at a moving speed greater than or equal to a first speed threshold.

In some embodiments of the present invention, in the aspect of monitoring the user's action of operating the desktop of the terminal device 600, the threading module 602 may be specifically configured to monitor the user's gesture, monitor the user's moving track, monitor the user's voice, and/or monitor a touch track performed by the user on the touch sensor.

In some embodiments of the present invention, the threading module 602 may determine, according to any one of the following manners, that the detected user action meets the preset disabling condition corresponding to the first application:

matching a touch end point of the detected touch track performed by the user on the touch sensor with at least one standard touch point model of a first type, and if the matching succeeds, determining that the detected user action meets the preset disabling condition corresponding to the first application; or matching a touch start point and a touch end point of the detected touch track performed by the user on the touch sensor with at least one standard touch point model of a second type, and if the matching succeeds, determining that the detected user action meets the preset disabling condition corresponding to the first application; or determining a touch direction corresponding to the detected touch track performed by the user on the touch sensor, matching the determined touch direction with at least one standard touch track model of a first type, and if a deviation between the determined touch direction and a standard touch direction that is included in one standard touch track model of the at least one standard touch track model of the first type is less than a third threshold, determining that the detected user action meets the preset disabling condition corresponding to the first application; or determining a touch graph corresponding to the detected touch track performed by the user on the touch sensor, matching the determined touch graph with at least one standard touch track model of a second type, and if a similarity between the determined touch graph and a standard touch graph that is included in one standard touch track model of the second type of the at least one standard touch track model of the second type is greater than a fourth threshold, determining that the detected user action meets the preset disabling condition corresponding to the first application, where the terminal device 600 includes the touch sensor; or determining a moving direction corresponding to the user's moving track detected by using a camera included in the terminal device 600, matching the determined moving direction with at least one standard moving track model of a first type, and if a deviation between the determined moving direction and a standard moving direction that corresponds to one standard moving track model of the at least one standard moving track model of the first type is less than or equal to a threshold m1, determining that the detected user action meets the preset disabling condition corresponding to the first application; or determining a graph corresponding to the user's moving track detected by using a camera included in the terminal device 600, matching the determined graph with at least one standard moving track model of a second type, and if a similarity between the determined graph and a standard graph that corresponds to one standard moving track model of the at least one standard moving track model of the second type is greater than or equal to a threshold m2, determining that the detected user action meets the preset disabling condition corresponding to the first application; or determining a motion rate corresponding to the user's moving track detected by using a camera included in the terminal device 600, matching the determined motion rate with at least one standard moving track model of a third type, and if a deviation between the determined motion rate and a standard motion rate that corresponds to one standard moving track model of the at least one standard moving track model of the third type is less than or equal to a threshold m3, determining that the detected user action meets the preset disabling condition corresponding to the first application; or determining a motion rate corresponding to the user's moving track detected by using a camera included in the terminal device 600, matching the determined motion rate with a preset standard moving track model of a third type, and if the determined motion rate is greater than, or equal to a standard motion rate corresponding to the preset standard moving track model of the third type, determining that the detected user action meets the preset disabling condition corresponding to the first application; or determining a motion rate corresponding to the user's moving track detected by using a camera included in the terminal device 600, matching the determined motion rate with at least one standard moving track model of a fourth type, and if a deviation between the determined motion rate and at least one standard motion rate within a standard motion rate range that corresponds to one standard moving track model of the at least one standard moving track model of the fourth type is less than or equal to a threshold m4, determining that the detected user action meets the preset disabling condition corresponding to the first application; or determining a motion rate corresponding to the user's moving track detected by using a camera included in the terminal device 600, matching the determined motion rate with a preset standard moving track model of a fourth type, and if the determined motion rate is greater than, or equal to at least one standard motion rate within a standard motion rate range that corresponds to the preset standard moving track model of the fourth type, determining that the detected user action meets the preset disabling condition corresponding to the first application; or determining a motion displacement corresponding to the user's moving track detected by using a camera included in the terminal device 600, matching the determined motion displacement with at least one standard moving track model of a fifth type, and if a deviation between the determined motion displacement and a standard motion displacement that corresponds to one standard moving track model of the at least one standard moving track model of the fifth type is less than or equal to a threshold m5, determining that the detected user action meets the preset disabling condition corresponding to the first application; or determining a motion displacement corresponding to the user's moving track detected by using a camera included in the terminal device 600, matching the determined motion displacement with a preset standard moving track model of a fifth type, and if the determined motion displacement is greater than, less than, or equal to a standard motion displacement corresponding to the preset standard moving track model of the fifth type, determining that the detected user action meets the preset disabling condition corresponding to the first application; or determining a motion displacement corresponding to the user's moving track detected by using a camera included in the terminal device 600, matching the determined motion displacement with at least one standard moving track model of a sixth type, and if a deviation between the determined motion displacement and at least one standard motion displacement within a standard motion displacement range that corresponds to one standard moving track model of the at least one standard moving track model of the sixth type is less than or equal to a threshold m6, determining that the detected user action meets the preset disabling condition corresponding to the first application; or determining a motion displacement corresponding to the user's moving track detected by using a camera included in the terminal device 600, matching the determined motion displacement with a preset standard moving track model of a sixth type, and if the determined motion displacement is greater than, less than, or equal to at least one standard motion displacement within a standard motion displacement range that corresponds to the preset standard moving track model of the sixth type, determining that the detected user action meets the preset disabling condition corresponding to the first application; or determining a motion duration corresponding to the user's moving track detected by using a camera included in the terminal device 600, matching the determined motion duration with at least one standard moving track model of a seventh type, and if a deviation between the determined motion duration and a standard motion duration that corresponds to one standard moving track model of the at least one standard moving track model of the seventh type is less than or equal to a threshold m7, determining that the detected user action meets the preset disabling condition corresponding to the first application; or determining a motion duration corresponding to the user's moving track detected by using a camera included in the terminal device 600, matching the determined motion duration with a preset standard moving track model of a seventh type, and if the determined motion duration is greater than, less than, or equal to a standard motion duration corresponding to the preset standard moving track model of the seventh type, determining that the detected user action meets the preset disabling condition corresponding to the first application; or determining a motion duration corresponding to the user's moving track detected by using a camera included in the terminal device 600, matching the determined motion duration with at least one standard moving track model of an eighth type, and if a deviation between the determined motion duration and at least one standard motion duration within a standard motion duration range that corresponds to one standard moving track model of the at least one standard moving track model of the eighth type is less than or equal to a threshold m8, determining that the detected user action meets the preset disabling condition corresponding to the first application; or determining a motion duration corresponding to the user's moving track detected by using a camera included in the terminal device 600, matching the determined motion duration with a preset standard moving track model of an eighth type, and if the determined motion duration is greater than, less than, or equal to at least one standard motion duration within a standard motion duration range that corresponds to the preset standard moving track model of the eighth type, determining that the detected user action meets the preset disabling condition corresponding to the first application; or acquiring a volume value corresponding to the user's voice detected by using an audio monitoring apparatus included in the terminal device 600, matching the acquired volume value with at least one standard voice model of a first type, and if a deviation between the acquired volume value and a standard volume value that corresponds to one standard voice model of the at least one standard voice model of the first type is less than or equal to a threshold n1, determining that the detected user action meets the preset disabling condition corresponding to the first application; or acquiring a volume value corresponding to the user's voice detected by using an audio monitoring apparatus included in the terminal device 600, matching the acquired volume value with a preset standard voice model of a first type, and if the acquired volume value is greater than, or equal to a standard volume value corresponding to the preset standard voice model of the first type, determining that the detected user action meets the preset disabling condition corresponding to the first application; or acquiring a volume value corresponding to the user's voice detected by using an audio monitoring apparatus included in the terminal device 600, matching the acquired volume value with at least one standard voice model of a second type, and if a deviation between the acquired volume value and at least one standard volume value within a standard volume value range that corresponds to one standard voice model of the at least one standard voice model of the second type is less than or equal to a threshold n2, determining that the detected user action meets the preset disabling condition corresponding to the first application; or acquiring a volume value corresponding to the user's voice detected by using an audio monitoring apparatus included in the terminal device 600, matching the acquired volume value with a preset standard voice model of a second type, and if the acquired volume value is greater than, or equal to at least one standard volume value within a standard volume value range that corresponds to the preset standard voice model of the second type, determining that the detected user action meets the preset disabling condition corresponding to the first application; or acquiring an audio value corresponding to the user's voice detected by using an audio monitoring apparatus included in the terminal device 600, matching the acquired audio value with at least one standard voice model of a third type, and if a deviation between the acquired audio value and a standard audio value that corresponds to one standard voice model of the at least one standard voice model of the third type is less than or equal to a threshold n3, determining that the detected user action meets the preset disabling condition corresponding to the first application; or acquiring an audio value corresponding to the user's voice detected by using an audio monitoring apparatus included in the terminal device 600, matching the acquired audio value with a preset standard voice model of a third type, and if the acquired audio value is greater than, or equal to a standard audio value corresponding to the preset standard voice model of the third type, determining that the detected user action meets the preset disabling condition corresponding to the first application; or acquiring an audio value corresponding to the user's voice detected by using an audio monitoring apparatus included in the terminal device 600, matching the acquired audio value with at least one standard voice model of a fourth type, and if a deviation between the acquired audio value and at least one standard audio value within a standard audio value range that corresponds to one standard voice model of the at least one standard voice model of the fourth type is less than or equal to a threshold n4, determining that the detected user action meets the preset disabling condition corresponding to the first application; or acquiring an audio value corresponding to the user's voice detected by using an audio monitoring apparatus included in the terminal device 600, matching the acquired audio value with a preset standard voice model of a fourth type, and if the acquired audio value is greater than, or equal to at least one standard audio value within a standard audio value range that corresponds to the preset standard voice model of the fourth type, determining that the detected user action meets the preset disabling condition corresponding to the first application; or acquiring an audio variation trend corresponding to the user's voice detected by using an audio monitoring apparatus included in the terminal device 600, matching the acquired audio variation trend with at least one standard voice model of a fifth type, and if the acquired audio variation trend is the same as a standard audio variation trend corresponding to one standard voice model of the at least one standard voice model of the fifth type, determining that the detected user action meets the preset disabling condition corresponding to the first application; or acquiring a volume variation trend corresponding to the user's voice detected by using an audio monitoring apparatus included in the terminal device 600, matching the acquired volume variation trend with at least one standard voice model of a sixth type, and if the acquired volume variation trend is the same as a standard volume variation trend corresponding to one standard voice model of the at least one standard voice model of the sixth type, determining that the detected user action meets the preset disabling condition corresponding to the first application; or acquiring an audio variation rate corresponding to the user's voice detected by using an audio monitoring apparatus included in the terminal device 600, matching the acquired audio variation rate with at least one standard voice model of a seventh type, and if a deviation between the acquired audio variation rate and a standard audio variation rate that corresponds to one standard voice model of the at least one standard voice model of the seventh type is less than or equal to a threshold n5, determining that the detected user action meets the preset disabling condition corresponding to the first application; or acquiring an audio variation rate corresponding to the user's voice detected by using an audio monitoring apparatus included in the terminal device 600, matching the acquired audio variation rate with a preset standard voice model of a seventh type, and if the acquired audio variation rate is greater than, or equal to a standard audio variation rate corresponding to the preset standard voice model of the seventh type, determining that the detected user action meets the preset disabling condition corresponding to the first application; or acquiring an audio variation rate corresponding to the user's voice detected by using an audio monitoring apparatus included in the terminal device 600, matching the acquired audio variation rate with at least one standard voice model of an eighth type, and if a deviation between the acquired audio variation rate and at least one standard audio variation rate within a standard audio variation rate range that corresponds to one standard voice model of the at least one standard voice model of the eighth type is less than or equal to a threshold n6, determining that the detected user action meets the preset disabling condition corresponding to the first application; or acquiring an audio variation rate corresponding to the user's voice detected by using an audio monitoring apparatus included in the terminal device 600, matching the acquired audio variation rate with a preset standard voice model of an eighth type, and if the acquired audio variation rate is greater than, or equal to at least one standard audio variation rate within a standard audio variation rate range that corresponds to the preset standard voice model of the eighth type, determining that the detected user action meets the preset disabling condition corresponding to the first application; or acquiring a volume variation rate corresponding to the user's voice detected by using an audio monitoring apparatus included in the terminal device 600, matching the acquired volume variation rate with at least one standard voice model of a ninth type, and if a deviation between the acquired volume variation rate and a standard volume variation rate that corresponds to one standard voice model of the at least one standard voice model of the ninth type is less than or equal to a threshold n7, determining that the detected user action meets the preset disabling condition corresponding to the first application; or acquiring a volume variation rate corresponding to the user's voice detected by using an audio monitoring apparatus included in the terminal device 600, matching the acquired volume variation rate with a preset standard voice model of a ninth type, and if the acquired volume variation rate is greater than, or equal to a standard volume variation rate corresponding to the preset standard voice model of the ninth type, determining that the detected user action meets the preset disabling condition corresponding to the first application; or acquiring a volume variation rate corresponding to the user's voice detected by using an audio monitoring apparatus included in the terminal device 600, matching the acquired volume variation rate with at least one standard voice model of a tenth type, and if a deviation between the acquired volume variation rate and at least one standard volume variation rate within a standard volume variation rate range that corresponds to one standard voice model of the at least one standard voice model of the tenth type is less than or equal to a threshold n8, determining that the detected user action meets the preset disabling condition corresponding to the first application; or acquiring a volume variation rate corresponding to the user's voice detected by using an audio monitoring apparatus included in the terminal device 600, matching the acquired volume variation rate with a preset standard voice model of a tenth type, and if the acquired volume variation rate is greater than, or equal to at least one standard volume variation rate within a standard volume variation rate range that corresponds to the preset standard voice model of the tenth type, determining that the detected user action meets the preset disabling condition corresponding to the first application; or acquiring a duration corresponding to the user's voice detected by using an audio monitoring apparatus included in the terminal device 600, matching the acquired duration with at least one standard voice model of an eleventh type, and if a deviation between the acquired duration and a standard duration that corresponds to one standard voice model of the at least one standard voice model of the eleventh type is less than or equal to a threshold n9, determining that the detected user action meets the preset disabling condition corresponding to the first application; or acquiring a duration corresponding to the user's voice detected by using an audio monitoring apparatus included in the terminal device 600, matching the acquired duration with a preset standard voice model of an eleventh type, and if the acquired duration is greater than, or equal to a standard duration corresponding to the preset standard voice model of the eleventh type, determining that the detected user action meets the preset disabling condition corresponding to the first application; or acquiring a duration corresponding to the user's voice detected by using an audio monitoring apparatus included in the terminal device 600, matching the acquired duration with at least one standard voice model of a twelfth type, and if a deviation between the acquired duration and at least one standard duration within a standard duration range that corresponds to one standard voice model of the at least one standard voice model of the twelfth type is less than or equal to a threshold n10, determining that the detected user action meets the preset disabling condition corresponding to the first application; or acquiring a duration corresponding to the user's voice detected by using an audio monitoring apparatus included in the terminal device 600, matching the acquired duration with a preset standard voice model of a twelfth type, and if the acquired duration is greater than, or equal to at least one standard duration within a standard duration range that corresponds to the preset standard voice model of the twelfth type, determining that the detected user action meets the preset disabling condition corresponding to the first application; or converting the user's voice detected by using an audio monitoring apparatus included in the terminal device 600 into a corresponding digital voice signal, matching the digital voice signal obtained after conversion with at least one standard voice model of a thirteenth type, and if a deviation between the digital voice signal and a standard digital voice signal that corresponds to one standard voice model of the at least one standard voice model of the thirteenth type is less than or equal to a threshold n11, determining that the detected user action meets the preset disabling condition corresponding to the first application.

It may be learned from the foregoing that, in the solution of this embodiment, a terminal device 600 monitors whether a first application on the terminal device is running, and monitors a user's action of operating a desktop of the terminal device; displays, on the desktop, a running-state icon corresponding to the first application if it is detected that the first application is running, or displays, on the desktop, a disabled-state icon corresponding to the first application if it is detected that the first application is in a disabled state, where the running-state icon corresponding to the first application and the disabled-state icon corresponding to the first application have different appearances; and disables the first application if the first application is running and the detected user action meets a preset disabling condition corresponding to the first application. When the first application is running, the running-state icon corresponding to the first application is displayed, and when the first application is in the disabled state, the disabled-state icon corresponding to the first application is displayed; for a running-state icon and a disabled-state icon of a same application, different appearances are displayed on the desktop. In this way, the user is shielded from professional data in the background of an operating system, and meanwhile, it is convenient for the user to learn a running status of each application in the system in a more visualized and clearer manner. In addition, when the detected user action meets the preset disabling condition corresponding to the first application, the first application that is running is disabled, and this mechanism helps the user to easily and quickly disable some unnecessary applications, which helps improve convenience and flexibility in disabling an application and enhance user experience, and meanwhile helps save energy.

Figure 7:
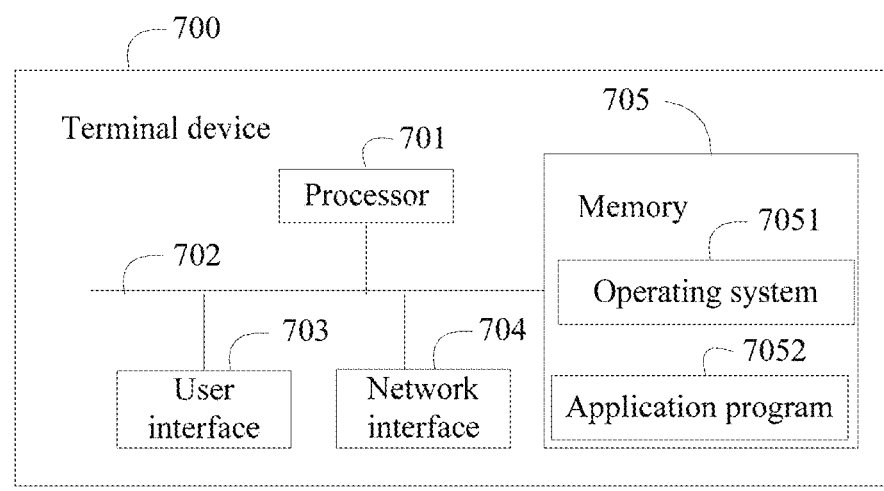
FIG. 7 is a schematic diagram of another terminal device according to an embodiment of the present invention.

Referring to FIG. 7, FIG. 7 is a structural block diagram of a terminal device 700 according to another embodiment of the present invention.

The terminal device 700 may include at least one threador 701, at least one network interface 704 or another user interface 703, a memory 705, and at least one communications bus 702. The communications bus 702 is configured to implement connections and communication between these components. The terminal device 700 optionally includes a user interface 703, and includes a display (for example, a touchscreen, an LCD, a CRT, holographic (Holographic), or a projector (Projector)), a click device (for example, a mouse, a trackball (trackball), a touchpad, or a touchscreen), a camera, and/or an audio monitoring apparatus, and the like.

The memory 705 may include a read-only memory and a random access memory, and provides instructions and data for the threador 701. A part of the memory 705 may further include a nonvolatile random access memory (NVRAM).

In some implementation manners, the memory 705 stores the following element: an executable module or a data structure, or a subset thereof, or an extended set thereof:

an operating system 7051, which includes various system programs such as the framework layer, the kernel library layer, and the driver layer that are shown in FIG. 1-*d*, and is configured to implement various basic services and thread a hardware-based task; and the running monitoring unit 310, the icon displaying unit 320, the action monitoring unit 330, and the control unit 340 that are shown in FIG. 3 may be located at, for example, the framework layer of the architecture shown in FIG. 1-*d*, and for example, may be specifically located in the system service component or another component at the framework layer; and an application program module 7052, which includes various application programs, for example, may include the desktop (launcher), the media player (Media Player), the browser (Browser) that are shown in FIG. 1-*d*, and is configured to implement various application services.

In this embodiment of the present invention, by invoking a program or an instruction stored in the memory 705, the threador 701 is configured to: monitor whether a first application on the terminal device 700 is running, and monitor a user's action of operating and monitoring a desktop of the terminal device 700; and display, on the desktop of the terminal device 700, a running-state icon corresponding to the first application if it is detected that the first application is running, and disable the first application if it is detected that the first application is running and the detected user action meets a preset disabling condition corresponding to the first application; or display, on the desktop of the terminal device 700, a disabled-state icon corresponding to the first application if it is detected that the first application is in a disabled state, where the running-state icon corresponding to the first application and the disabled-state icon corresponding to the first application have different appearances.

Optionally, as an embodiment, the threador 701 is further configured to set a status of the first application to a protected state or an unprotected state according to a user instruction or a preset policy.

Further, in the aspect of monitoring the user's action of operating the desktop of the terminal device, the threador 701 may be specifically configured to monitor the user's gesture, monitor the user's moving track, monitor the user's voice, and/or monitor a touch track performed by the user on a touch sensor included in the terminal device.

In some embodiments of the present invention, the threador 701 may use a system thread or another manner to monitor whether the first application is running, for example, may use a thread status pool to monitor whether the first application is running, where the thread status pool is a system thread.

In some embodiments of the present invention, a global thread status may be monitored in the thread status pool, and the thread status pool may store detected data by using a linked list or in another manner. A system thread pool may be used as an index of all threads in a system, and a thread may be maintained in the system thread pool in a thread registration/deregistration manner. The thread status pool may be considered as a special daemon, where the daemon may have highest access permission and is used to refresh and synchronize a thread status in the system thread pool in real time.

In some embodiments of the present invention, each time a thread status changes (including changes of statuses such as a protection flag bit, a thread status, and a position at which a thread is located), a version number of thread status information may increase by 1. One version number may also be maintained in a thread form maintained in the system thread pool. When the thread status pool and the system thread pool are synchronizing with each other, values of version numbers of the thread status pool and the system thread pool may be compared in a traversal manner. If a version number of thread status information of a thread in the form maintained in the system thread pool is earlier than a version number of thread status information of a corresponding thread maintained in the thread status pool, the version numbers of the thread status information are synchronized with each other (that is, the version number of the thread status information of the corresponding thread in the form maintained in the system thread pool is modified), and a corresponding icon on the desktop may also be updated synchronously.

In some embodiments of the present invention, disabling the first application if the user action detected by the threador 701 meets the preset disabling condition corresponding to the first application may include: disabling the first application if it is detected that the touch track performed by the user on the touch sensor indicates that the running-state icon of the first application is flicked away so that the flicked-away running-state icon of the first application hits an edge of a screen. For example, the running-state icon corresponding to the first application has a crystal ball shrouding effect, and the disabled-state icon corresponding to the first application does not have the crystal ball shrouding effect.

In some embodiments of the present invention, if the running-state icon corresponding to the first application has a crystal ball shrouding effect, and the disabled-state icon corresponding to the first application does not have the crystal ball shrouding effect (or has a crystal ball shrouding effect different from that of the running-state icon), disabling the first application if the user action detected by the threador 701 meets the preset disabling condition corresponding to the first application may include: disabling the first application if it is detected that the touch track performed by the user on the touch sensor indicates that the running-state icon of the first application is clamped so that a crystal ball in which the running-state icon of the first application is shrouded is broken.

In some embodiments of the present invention, the first application includes multiple sub-applications, and disabling the first application if the user action detected by the threador 701 meets the preset disabling condition corresponding to the first application includes: disabling, in batches, the multiple sub-applications included in the first application if it is detected that the touch track performed by the user on the touch sensor passes through the multiple sub-applications included in the first application at a moving speed greater than or equal to a first speed threshold.

Monitoring the user's action may include monitoring one or more user's actions.

In some embodiments of the present invention, that the threador 701 monitors the user's action may include: monitoring the user's gesture, monitoring the user's moving track, monitoring the user's voice, monitoring variation of a distance between the user and the terminal device, and/or monitoring the touch track performed by the user on the touch sensor included in the terminal device 700, and the like.

In some embodiments of the present invention, that the user action detected by the threador 701 meets the preset disabling condition corresponding to the first application may include:

matching a touch end point of the detected touch track performed by the user on the touch sensor included in the terminal device 700 with at least one standard touch point model of a first type, and if the matching succeeds, determining that the detected user action meets the preset disabling condition corresponding to the first application; or matching a touch start point and a touch end point of the detected touch track performed by the user on the touch sensor included in the terminal device 700 with at least one standard touch point model of a second type, and if the matching succeeds, determining that the detected user action meets the preset disabling condition corresponding to the first application; or determining a touch direction corresponding to the detected touch track performed by the user on the touch sensor included in the terminal device 700, matching the determined touch direction with at least one standard touch track model of a first type, and if a deviation between the determined touch direction and a standard touch direction that is included in one standard touch track model of the at least one standard touch track model of the first type is less than a third threshold, determining that the detected user action meets the preset disabling condition corresponding to the first application; or determining a touch graph corresponding to the detected touch track performed by the user on the touch sensor included in the terminal device 700, matching the determined touch graph with at least one standard touch track model of a second type, and if a similarity between the determined touch graph and a standard touch graph that is included in one standard touch track model of the second type of the at least one standard touch track model of the second type is greater than a fourth threshold, determining that the detected user action meets the preset disabling condition corresponding to the first application; or determining a moving direction corresponding to the user's moving track detected by using a camera included in the terminal device 700, matching the determined moving direction with at least one standard moving track model of a first type, and if a deviation between the determined moving direction and a standard moving direction that corresponds to one standard moving track model of the at least one standard moving track model of the first type is less than or equal to a threshold m1, determining that the detected user action meets the preset disabling condition corresponding to the first application; or determining a graph corresponding to the user's moving track detected by using a camera included in the terminal device 700, matching the determined graph with at least one standard moving track model of a second type, and if a similarity between the determined graph and a standard graph that corresponds to one standard moving track model of the at least one standard moving track model of the second type is greater than or equal to a threshold m2, determining that the detected user action meets the preset disabling condition corresponding to the first application; or determining a motion rate corresponding to the user's moving track detected by using a camera included in the terminal device 700, matching the determined motion rate with at least one standard moving track model of a third type, and if a deviation between the determined motion rate and a standard motion rate that corresponds to one standard moving track model of the at least one standard moving track model of the third type is less than or equal to a threshold m3, determining that the detected user action meets the preset disabling condition corresponding to the first application; or determining a motion rate corresponding to the user's moving track detected by using a camera included in the terminal device 700, matching the determined motion rate with a preset standard moving track model of a third type, and if the determined motion rate is greater than, or equal to a standard motion rate corresponding to the preset standard moving track model of the third type, determining that the detected user action meets the preset disabling condition corresponding to the first application; or determining a motion rate corresponding to the user's moving track detected by using a camera included in the terminal device 700, matching the determined motion rate with at least one standard moving track model of a fourth type, and if a deviation between the determined motion rate and at least one standard motion rate within a standard motion rate range that corresponds to one standard moving track model of the at least one standard moving track model of the fourth type is less than or equal to a threshold m4, determining that the detected user action meets the preset disabling condition corresponding to the first application; or determining a motion rate corresponding to the user's moving track detected by using a camera included in the terminal device 700, matching the determined motion rate with a preset standard moving track model of a fourth type, and if the determined motion rate is greater than, or equal to at least one standard motion rate within a standard motion rate range that corresponds to the preset standard moving track model of the fourth type, determining that the detected user action meets the preset disabling condition corresponding to the first application; or determining a motion displacement corresponding to the user's moving track detected by using a camera included in the terminal device 700, matching the determined motion displacement with at least one standard moving track model of a fifth type, and if a deviation between the determined motion displacement and a standard motion displacement that corresponds to one standard moving track model of the at least one standard moving track model of the fifth type is less than or equal to a threshold m5, determining that the detected user action meets the preset disabling condition corresponding to the first application; or determining a motion displacement corresponding to the user's moving track detected by using a camera included in the terminal device 700, matching the determined motion displacement with a preset standard moving track model of a fifth type, and if the determined motion displacement is greater than, less than, or equal to a standard motion displacement corresponding to the preset standard moving track model of the fifth type, determining that the detected user action meets the preset disabling condition corresponding to the first application; or determining a motion displacement corresponding to the user's moving track detected by using a camera included in the terminal device 700, matching the determined motion displacement with at least one standard moving track model of a sixth type, and if a deviation between the determined motion displacement and at least one standard motion displacement within a standard motion displacement range that corresponds to one standard moving track model of the at least one standard moving track model of the sixth type is less than or equal to a threshold m6, determining that the detected user action meets the preset disabling condition corresponding to the first application; or determining a motion displacement corresponding to the user's moving track detected by using a camera included in the terminal device 700, matching the determined motion displacement with a preset standard moving track model of a sixth type, and if the determined motion displacement is greater than, less than, or equal to at least one standard motion displacement within a standard motion displacement range that corresponds to the preset standard moving track model of the sixth type, determining that the detected user action meets the preset disabling condition corresponding to the first application; or determining a motion duration corresponding to the user's moving track detected by using a camera included in the terminal device 700, matching the determined motion duration with at least one standard moving track model of a seventh type, and if a deviation between the determined motion duration and a standard motion duration that corresponds to one standard moving track model of the at least one standard moving track model of the seventh type is less than or equal to a threshold m7, determining that the detected user action meets the preset disabling condition corresponding to the first application; or determining a motion duration corresponding to the user's moving track detected by using a camera included in the terminal device 700, matching the determined motion duration with a preset standard moving track model of a seventh type, and if the determined motion duration is greater than, less than, or equal to a standard motion duration corresponding to the preset standard moving track model of the seventh type, determining that the detected user action meets the preset disabling condition corresponding to the first application; or determining a motion duration corresponding to the user's moving track detected by using a camera included in the terminal device 700, matching the determined motion duration with at least one standard moving track model of an eighth type, and if a deviation between the determined motion duration and at least one standard motion duration within a standard motion duration range that corresponds to one standard moving track model of the at least one standard moving track model of the eighth type is less than or equal to a threshold m8, determining that the detected user action meets the preset disabling condition corresponding to the first application; or determining a motion duration corresponding to the user's moving track detected by using a camera included in the terminal device 700, matching the determined motion duration with a preset standard moving track model of an eighth type, and if the determined motion duration is greater than, less than, or equal to at least one standard motion duration within a standard motion duration range that corresponds to the preset standard moving track model of the eighth type, determining that the detected user action meets the preset disabling condition corresponding to the first application; or acquiring a volume value corresponding to the user's voice detected by using an audio monitoring apparatus included in the terminal device 700, matching the acquired volume value with at least one standard voice model of a first type, and if a deviation between the acquired volume value and a standard volume value that corresponds to one standard voice model of the at least one standard voice model of the first type is less than or equal to a threshold n1, determining that the detected user action meets the preset disabling condition corresponding to the first application; or acquiring a volume value corresponding to the user's voice detected by using an audio monitoring apparatus included in the terminal device 700, matching the acquired volume value with a preset standard voice model of a first type, and if the acquired volume value is greater than, or equal to a standard volume value corresponding to the preset standard voice model of the first type, determining that the detected user action meets the preset disabling condition corresponding to the first application;

acquiring a volume value corresponding to the user's voice detected by using an audio monitoring apparatus included in the terminal device 700, matching the acquired volume value with at least one standard voice model of a second type, and if a deviation between the acquired volume value and at least one standard volume value within a standard volume value range that corresponds to one standard voice model of the at least one standard voice model of the second type is less than or equal to a threshold n2, determining that the detected user action meets the preset disabling condition corresponding to the first application; or acquiring a volume value corresponding to the user's voice detected by using an audio monitoring apparatus included in the terminal device 700, matching the acquired volume value with a preset standard voice model of a second type, and if the acquired volume value is greater than, or equal to at least one standard volume value within a standard volume value range that corresponds to the preset standard voice model of the second type, determining that the detected user action meets the preset disabling condition corresponding to the first application; or acquiring an audio value corresponding to the user's voice detected by using an audio monitoring apparatus included in the terminal device 700, matching the acquired audio value with at least one standard voice model of a third type, and if a deviation between the acquired audio value and a standard audio value that corresponds to one standard voice model of the at least one standard voice model of the third type is less than or equal to a threshold n3, determining that the detected user action meets the preset disabling condition corresponding to the first application; or acquiring an audio value corresponding to the user's voice detected by using an audio monitoring apparatus included in the terminal device 700, matching the acquired audio value with a preset standard voice model of a third type, and if the acquired audio value is greater than, or equal to a standard audio value corresponding to the preset standard voice model of the third type, determining that the detected user action meets the preset disabling condition corresponding to the first application; or acquiring an audio value corresponding to the user's voice detected by using an audio monitoring apparatus included in the terminal device 700, matching the acquired audio value with at least one standard voice model of a fourth type, and if a deviation between the acquired audio value and at least one standard audio value within a standard audio value range that corresponds to one standard voice model of the at least one standard voice model of the fourth type is less than or equal to a threshold n4, determining that the detected user action meets the preset disabling condition corresponding to the first application; or acquiring an audio value corresponding to the user's voice detected by using an audio monitoring apparatus included in the terminal device 700, matching the acquired audio value with a preset standard voice model of a fourth type, and if the acquired audio value is greater than, or equal to at least one standard audio value within a standard audio value range that corresponds to the preset standard voice model of the fourth type, determining that the detected user action meets the preset disabling condition corresponding to the first application; or acquiring an audio variation trend corresponding to the user's voice detected by using an audio monitoring apparatus included in the terminal device 700, matching the acquired audio variation trend with at least one standard voice model of a fifth type, and if the acquired audio variation trend is the same as a standard audio variation trend corresponding to one standard voice model of the at least one standard voice model of the fifth type, determining that the detected user action meets the preset disabling condition corresponding to the first application; or acquiring a volume variation trend corresponding to the user's voice detected by using an audio monitoring apparatus included in the terminal device 700, matching the acquired volume variation trend with at least one standard voice model of a sixth type, and if the acquired volume variation trend is the same as a standard volume variation trend corresponding to one standard voice model of the at least one standard voice model of the sixth type, determining that the detected user action meets the preset disabling condition corresponding to the first application; or acquiring an audio variation rate corresponding to the user's voice detected by using an audio monitoring apparatus included in the terminal device 700, matching the acquired audio variation rate with at least one standard voice model of a seventh type, and if a deviation between the acquired audio variation rate and a standard audio variation rate that corresponds to one standard voice model of the at least one standard voice model of the seventh type is less than or equal to a threshold n5, determining that the detected user action meets the preset disabling condition corresponding to the first application; or acquiring an audio variation rate corresponding to the user's voice detected by using an audio monitoring apparatus included in the terminal device 700, matching the acquired audio variation rate with a preset standard voice model of a seventh type, and if the acquired audio variation rate is greater than, or equal to a standard audio variation rate corresponding to the preset standard voice model of the seventh type, determining that the detected user action meets the preset disabling condition corresponding to the first application; or acquiring an audio variation rate corresponding to the user's voice detected by using an audio monitoring apparatus included in the terminal device 700, matching the acquired audio variation rate with at least one standard voice model of an eighth type, and if a deviation between the acquired audio variation rate and at least one standard audio variation rate within a standard audio variation rate range that corresponds to one standard voice model of the at least one standard voice model of the eighth type is less than or equal to a threshold n6, determining that the detected user action meets the preset disabling condition corresponding to the first application; or acquiring an audio variation rate corresponding to the user's voice detected by using an audio monitoring apparatus included in the terminal device 700, matching the acquired audio variation rate with a preset standard voice model of an eighth type, and if the acquired audio variation rate is greater than, or equal to at least one standard audio variation rate within a standard audio variation rate range that corresponds to the preset standard voice model of the eighth type, determining that the detected user action meets the preset disabling condition corresponding to the first application; or acquiring a volume variation rate corresponding to the user's voice detected by using an audio monitoring apparatus included in the terminal device 700, matching the acquired volume variation rate with at least one standard voice model of a ninth type, and if a deviation between the acquired volume variation rate and a standard volume variation rate that corresponds to one standard voice model of the at least one standard voice model of the ninth type is less than or equal to a threshold n7, determining that the detected user action meets the preset disabling condition corresponding to the first application; or acquiring a volume variation rate corresponding to the user's voice detected by using an audio monitoring apparatus included in the terminal device 700, matching the acquired volume variation rate with a preset standard voice model of a ninth type, and if the acquired volume variation rate is greater than, or equal to a standard volume variation rate corresponding to the preset standard voice model of the ninth type, determining that the detected user action meets the preset disabling condition corresponding to the first application; or acquiring a volume variation rate corresponding to the user's voice detected by using an audio monitoring apparatus included in the terminal device 700, matching the acquired volume variation rate with at least one standard voice model of a tenth type, and if a deviation between the acquired volume variation rate and at least one standard volume variation rate within a standard volume variation rate range that corresponds to one standard voice model of the at least one standard voice model of the tenth type is less than or equal to a threshold n8, determining that the detected user action meets the preset disabling condition corresponding to the first application; or acquiring a volume variation rate corresponding to the user's voice detected by using an audio monitoring apparatus included in the terminal device 700, matching the acquired volume variation rate with a preset standard voice model of a tenth type, and if the acquired volume variation rate is greater than, or equal to at least one standard volume variation rate within a standard volume variation rate range that corresponds to the preset standard voice model of the tenth type, determining that the detected user action meets the preset disabling condition corresponding to the first application; or acquiring a duration corresponding to the user's voice detected by using an audio monitoring apparatus included in the terminal device 700, matching the acquired duration with at least one standard voice model of an eleventh type, and if a deviation between the acquired duration and a standard duration that corresponds to one standard voice model of the at least one standard voice model of the eleventh type is less than or equal to a threshold n9, determining that the detected user action meets the preset disabling condition corresponding to the first application; or acquiring a duration corresponding to the user's voice detected by using an audio monitoring apparatus included in the terminal device 700, matching the acquired duration with a preset standard voice model of an eleventh type, and if the acquired duration is greater than, or equal to a standard duration corresponding to the preset standard voice model of the eleventh type, determining that the detected user action meets the preset disabling condition corresponding to the first application; or acquiring a duration corresponding to the user's voice detected by using an audio monitoring apparatus included in the terminal device 700, matching the acquired duration with at least one standard voice model of a twelfth type, and if a deviation between the acquired duration and at least one standard duration within a standard duration range that corresponds to one standard voice model of the at least one standard voice model of the twelfth type is less than or equal to a threshold n10, determining that the detected user action meets the preset disabling condition corresponding to the first application; or acquiring a duration corresponding to the user's voice detected by using an audio monitoring apparatus included in the terminal device 700, matching the acquired duration with a preset standard voice model of a twelfth type, and if the acquired duration is greater than, or equal to at least one standard duration within a standard duration range that corresponds to the preset standard voice model of the twelfth type, determining that the detected user action meets the preset disabling condition corresponding to the first application; or converting the user's voice detected by using an audio monitoring apparatus included in the terminal device 700 into a corresponding digital voice signal, matching the digital voice signal obtained after conversion with at least one standard voice model of a thirteenth type, and if a deviation between the digital voice signal and a standard digital voice signal that corresponds to one standard voice model of the at least one standard voice model of the thirteenth type is less than or equal to a threshold n11, determining that the detected user action meets the preset disabling condition corresponding to the first application.

In addition, the terminal device 700 may further execute the methods and embodiments shown in FIG. 1-*a*, FIG. 1-*b*, and FIG. 1-*c*; and details are not described herein again in this embodiment of the present invention.

It may be learned that, after the foregoing solutions are used, for a running-state icon and a disabled-state icon of a same application, different appearances are displayed on a desktop. In this way, a user is shielded from professional data in the background of an operating system, and meanwhile, it is convenient for the user to learn a running status of each application in the system in a more visualized and clearer manner. In addition, when a detected user action meets a preset disabling condition corresponding to a first application, the first application that is running is disabled, and this mechanism helps the user to easily and quickly disable some unnecessary applications, which helps improve convenience and flexibility in disabling an application and enhance user experience, and meanwhile helps save energy.

An embodiment of the present invention further provides a computer storage medium, where the computer storage medium may store a program, and the program is used for executing a part or all of steps of the methods for managing a task on a terminal device according to the foregoing method embodiments.

It should be noted that, for brief description, the foregoing method embodiments are represented as a series of actions. However, persons skilled in the art should appreciate that the present invention is not limited to the described order of the actions, because according to the present invention, some steps may be performed in other orders or simultaneously. In addition, persons skilled in the art should also understand that all the embodiments described in this specification are exemplary embodiments, and the involved actions and modules are not necessarily mandatory for the present invention.

In the foregoing embodiments, the descriptions of the embodiments have respective focuses. For a part that is not described in detail in an embodiment, reference may be made to related descriptions in other embodiments.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one threading unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The software product is stored in a storage medium and includes several instructions for instructing a computer device (which may be a personal computer, a server, a network device, or a threador connected to memory) to perform all or some of the steps of the methods described in the embodiments of the present invention. The foregoing storage medium includes: any medium that can store program code, such as a read-only memory (ROM, Read-Only Memory), a removable hard disk, a random access memory (RAM, Random Access Memory), a USB flash drive, a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof; however these modifications or replacements do not make the essence of corresponding technical solutions depart from the spirit and scope of the technical solutions in the embodiments of the present invention.

What is claimed is:

1. A method for managing a task on a terminal device, the method comprising:
    monitoring whether a first application on the terminal device is running, and monitoring a user's action of operating a desktop of the terminal device, wherein the user's action is not directly associated with the first application;
    displaying, on the desktop of the terminal device, an icon associated with the first application in a running-state image on the desktop, if it is detected that the first application is running;
    automatically disabling the first application, if it is detected that the first application is running and it is detected that the user's action of operating the desktop meets a preset disabling condition of the first application; and
    displaying, the same icon associated with the first application in a disabled-state image, which is different from the running-state image of the icon if it is detected that the first application is in a disabled state,
        wherein (1) the running-state image includes a shadow effect that is absent in the disabled-state image, or (2) the first application comprises sub-applications, and disabling of the first application displays as occurring in batches of the sub-applications.

2. The method according to claim 1, wherein:
    monitoring whether a first application on the terminal device is running comprises: monitoring, by using a thread status pool, whether the first application on the terminal device is running, wherein the thread status pool is a system thread.

3. The method according to claim 1, wherein current memory usage of the first application is displayed in the running-state image of the icon corresponding to the first application.

4. The method according to claim 1, further comprising: setting a status of the first application to a protected state or an unprotected state according to a user instruction or a preset policy.

5. The method according to claim 4, wherein disabling the first application if it is detected that the first application is running and the detected user action meets the preset disabling condition corresponding to the first application comprises:
    disabling the first application if it is detected that the first application is running, the first application is currently in the unprotected state, and the detected user action meets the preset disabling condition corresponding to the first application.

6. The method according to claim 1, wherein monitoring the user's action of operating a desktop of the terminal device comprises:
    monitoring the user's gesture, monitoring the user's moving track, monitoring the user's voice, and/or monitoring a touch track performed by the user on a touch sensor comprised in the terminal device.

7. The method according to claim 6, including:
    disabling the first application if it is detected that the touch track performed by the user on the touch sensor comprised in the terminal device indicates that the running-state image of the icon of the first application is flicked away so that the flicked-away running-state image of the icon of the first application hits an edge of a screen; or
    disabling, in batches, the multiple sub-applications comprised in the first application if it is detected that the touch track performed by the user on the touch sensor comprised in the terminal device passes through the multiple sub-applications comprised in the first application at a moving speed greater than or equal to a first speed threshold.

8. The method according to claim 6, wherein that the detected user action meets the preset disabling condition of the first application is determined by using any one of the following methods:
    matching a touch end point of the detected touch track performed by the user on the touch sensor comprised in the terminal device with at least one standard touch point model of a first type, and if the matching succeeds, determining that the detected user action meets the preset disabling condition of the first application; or
    matching a touch start point and a touch end point of the detected touch track performed by the user on the touch sensor comprised in the terminal device with at least one standard touch point model of a second type, and if the matching succeeds, determining that the detected user action meets the preset disabling condition of the first application; or
    determining a touch direction corresponding to the detected touch track performed by the user on the touch sensor comprised in the terminal device, matching the determined touch direction with at least one standard touch track model of a first type, and if a deviation between the determined touch direction and a standard touch direction that is comprised in one standard touch track model of the at least one standard touch track model of the first type is less than a third threshold, determining that the detected user action meets the preset disabling condition of the first application; or determining a touch graph corresponding to the detected touch track performed by the user on the touch sensor comprised in the terminal device, matching the determined touch graph with at least one standard touch track model of a second type, and if a similarity between the determined touch graph and a standard touch graph that is comprised in one standard touch track model of the second type of the at least one standard touch track model of the second type is greater than a fourth threshold, determining that the detected user action meets the preset disabling condition of the first application; or determining a moving direction corresponding to the user's moving track detected by using a camera comprised in the terminal device, matching the determined moving direction with at least one standard moving track model of a first type, and if a deviation between the determined moving direction and a standard moving direction that corresponds to one standard moving track model of the at least one standard moving track model of the first type is less than or equal to a threshold m1, determining that the detected user action meets the preset disabling condition of the first application; or determining a graph corresponding to the user's moving track detected by using a camera comprised in the terminal device, matching the determined graph with at least one standard moving track model of a second type, and if a similarity between the determined graph and a standard graph that corresponds to one standard moving track model of the at least one standard moving track model of the second type is greater than or equal to a threshold m2, determining that the detected user action meets the preset disabling condition of the first application; or determining a motion rate corresponding to the user's moving track detected by using a camera comprised in the terminal device, matching the determined motion rate with at least one standard moving track model of a third type, and if a deviation between the determined motion rate and a standard motion rate that corresponds to one standard moving track model of the at least one standard moving track model of the third type is less than or equal to a threshold m3, determining that the detected user action meets the preset disabling condition of the first application; or determining a motion rate corresponding to the user's moving track detected by using a camera comprised in the terminal device, matching the determined motion rate with a preset standard moving track model of a third type, and if the determined motion rate is greater than, or equal to a standard motion rate corresponding to the preset standard moving track model of the third type, determining that the detected user action meets the preset disabling condition of the first application; or determining a motion rate corresponding to the user's moving track detected by using a camera comprised in the terminal device, matching the determined motion rate with at least one standard moving track model of a fourth type, and if a deviation between the determined motion rate and at least one standard motion rate within a standard motion rate range that corresponds to one standard moving track model of the at least one standard moving track model of the fourth type is less than or equal to a threshold m4, determining that the detected user action meets the preset disabling condition of the first application; or determining a motion rate corresponding to the user's moving track detected by using a camera comprised in the terminal device, matching the determined motion rate with a preset standard moving track model of a fourth type, and if the determined motion rate is greater than, or equal to at least one standard motion rate within a standard motion rate range that corresponds to the preset standard moving track model of the fourth type, determining that the detected user action meets the preset disabling condition of the first application; or determining a motion displacement corresponding to the user's moving track detected by using a camera comprised in the terminal device, matching the determined motion displacement with at least one standard moving track model of a fifth type, and if a deviation between the determined motion displacement and a standard motion displacement that corresponds to one standard moving track model of the at least one standard moving track model of the fifth type is less than or equal to a threshold m5, determining that the detected user action meets the preset disabling condition of the first application; or determining a motion displacement corresponding to the user's moving track detected by using a camera comprised in the terminal device, matching the determined motion displacement with a preset standard moving track model of a fifth type, and if the determined motion displacement is greater than, less than, or equal to a standard motion displacement corresponding to the preset standard moving track model of the fifth type, determining that the detected user action meets the preset disabling condition of the first application; or determining a motion displacement corresponding to the user's moving track detected by using a camera comprised in the terminal device, matching the determined motion displacement with at least one standard moving track model of a sixth type, and if a deviation between the determined motion displacement and at least one standard motion displacement within a standard motion displacement range that corresponds to one standard moving track model of the at least one standard moving track model of the sixth type is less than or equal to a threshold m6, determining that the detected user action meets the preset disabling condition of the first application; or determining a motion displacement corresponding to the user's moving track detected by using a camera comprised in the terminal device, matching the determined motion displacement with a preset standard moving track model of a sixth type, and if the determined motion displacement is greater than, less than, or equal to at least one standard motion displacement within a standard motion displacement range that corresponds to the preset standard moving track model of the sixth type, determining that the detected user action meets the preset disabling condition of the first application; or determining a motion duration corresponding to the user's moving track detected by using a camera comprised in the terminal device, matching the determined motion duration with at least one standard moving track model of a seventh type, and if a deviation between the determined motion duration and a standard motion duration that corresponds to one standard moving track model of the at least one standard moving track model of the seventh type is less than or equal to a threshold m7, determining that the detected user action meets the preset disabling condition of the first application; or determining a motion duration corresponding to the user's moving track detected by using a camera comprised in the terminal device, matching the determined motion duration with a preset standard moving track model of a seventh type, and if the determined motion duration is greater than, less than, or equal to a standard motion duration corresponding to the preset standard moving track model of the seventh type, determining that the detected user action meets the preset disabling condition of the first application; or determining a motion duration corresponding to the user's moving track detected by using a camera comprised in the terminal device, matching the determined motion duration with at least one standard moving track model of an eighth type, and if a deviation between the determined motion duration and at least one standard motion duration within a standard motion duration range that corresponds to one standard moving track model of the at least one standard moving track model of the eighth type is less than or equal to a threshold m8, determining that the detected user action meets the preset disabling condition of the first application; or determining a motion duration corresponding to the user's moving track detected by using a camera comprised in the terminal device, matching the determined motion duration with a preset standard moving track model of an eighth type, and if the determined motion duration is greater than, less than, or equal to at least one standard motion duration within a standard motion duration range that corresponds to the preset standard moving track model of the eighth type, determining that the detected user action meets the preset disabling condition of the first application; or acquiring a volume value corresponding to the user's voice detected by using an audio monitoring apparatus comprised in the terminal device, matching the acquired volume value with at least one standard voice model of a first type, and if a deviation between the acquired volume value and a standard volume value that corresponds to one standard voice model of the at least one standard voice model of the first type is less than or equal to a threshold n1, determining that the detected user action meets the preset disabling condition of the first application; or acquiring a volume value corresponding to the user's voice detected by using an audio monitoring apparatus comprised in the terminal device, matching the acquired volume value with a preset standard voice model of a first type, and if the acquired volume value is greater than, or equal to a standard volume value corresponding to the preset standard voice model of the first type, determining that the detected user action meets the preset disabling condition of the first application; or acquiring a volume value corresponding to the user's voice detected by using an audio monitoring apparatus comprised in the terminal device, matching the acquired volume value with at least one standard voice model of a second type, and if a deviation between the acquired volume value and at least one standard volume value within a standard volume value range that corresponds to one standard voice model of the at least one standard voice model of the second type is less than or equal to a threshold n2, determining that the detected user action meets the preset disabling condition of the first application; or acquiring a volume value corresponding to the user's voice detected by using an audio monitoring apparatus comprised in the terminal device, matching the acquired volume value with a preset standard voice model of a second type, and if the acquired volume value is greater than, or equal to at least one standard volume value within a standard volume value range that corresponds to the preset standard voice model of the second type, determining that the detected user action meets the preset disabling condition of the first application; or acquiring an audio value corresponding to the user's voice detected by using an audio monitoring apparatus comprised in the terminal device, matching the acquired audio value with at least one standard voice model of a third type, and if a deviation between the acquired audio value and a standard audio value that corresponds to one standard voice model of the at least one standard voice model of the third type is less than or equal to a threshold n3, determining that the detected user action meets the preset disabling condition of the first application; or acquiring an audio value corresponding to the user's voice detected by using an audio monitoring apparatus comprised in the terminal device, matching the acquired audio value with a preset standard voice model of a third type, and if the acquired audio value is greater than, or equal to a standard audio value corresponding to the preset standard voice model of the third type, determining that the detected user action meets the preset disabling condition of the first application; or acquiring an audio value corresponding to the user's voice detected by using an audio monitoring apparatus comprised in the terminal device, matching the acquired audio value with at least one standard voice model of a fourth type, and if a deviation between the acquired audio value and at least one standard audio value within a standard audio value range that corresponds to one standard voice model of the at least one standard voice model of the fourth type is less than or equal to a threshold n4, determining that the detected user action meets the preset disabling condition of the first application; or acquiring an audio value corresponding to the user's voice detected by using an audio monitoring apparatus comprised in the terminal device, matching the acquired audio value with a preset standard voice model of a fourth type, and if the acquired audio value is greater than, or equal to at least one standard audio value within a standard audio value range that corresponds to the preset standard voice model of the fourth type, determining that the detected user action meets the preset disabling condition of the first application; or acquiring an audio variation trend corresponding to the user's voice detected by using an audio monitoring apparatus comprised in the terminal device, matching the acquired audio variation trend with at least one standard voice model of a fifth type, and if the acquired audio variation trend is the same as a standard audio variation trend corresponding to one standard voice model of the at least one standard voice model of the fifth type, determining that the detected user action meets the preset disabling condition of the first application; or acquiring a volume variation trend corresponding to the user's voice detected by using an audio monitoring apparatus comprised in the terminal device, matching the acquired volume variation trend with at least one standard voice model of a sixth type, and if the acquired volume variation trend is the same as a standard volume variation trend corresponding to one standard voice model of the at least one standard voice model of the sixth type, determining that the detected user action meets the preset disabling condition of the first application; or acquiring an audio variation rate corresponding to the user's voice detected by using an audio monitoring apparatus comprised in the terminal device, matching the acquired audio variation rate with at least one standard voice model of a seventh type, and if a deviation between the acquired audio variation rate and a standard audio variation rate that corresponds to one standard voice model of the at least one standard voice model of the seventh type is less than or equal to a threshold n5, determining that the detected user action meets the preset disabling condition of the first application; or acquiring an audio variation rate corresponding to the user's voice detected by using an audio monitoring apparatus comprised in the terminal device, matching the acquired audio variation rate with a preset standard voice model of a seventh type, and if the acquired audio variation rate is greater than, or equal to a standard audio variation rate corresponding to the preset standard voice model of the seventh type, determining that the detected user action meets the preset disabling condition of the first application; or acquiring an audio variation rate corresponding to the user's voice detected by using an audio monitoring apparatus comprised in the terminal device, matching the acquired audio variation rate with at least one standard voice model of an eighth type, and if a deviation between the acquired audio variation rate and at least one standard audio variation rate within a standard audio variation rate range that corresponds to one standard voice model of the at least one standard voice model of the eighth type is less than or equal to a threshold n6, determining that the detected user action meets the preset disabling condition of the first application; or acquiring an audio variation rate corresponding to the user's voice detected by using an audio monitoring apparatus comprised in the terminal device, matching the acquired audio variation rate with a preset standard voice model of an eighth type, and if the acquired audio variation rate is greater than, or equal to at least one standard audio variation rate within a standard audio variation rate range that corresponds to the preset standard voice model of the eighth type, determining that the detected user action meets the preset disabling condition of the first application; or acquiring a volume variation rate corresponding to the users voice detected by using an audio monitoring apparatus comprised in the terminal device, matching the acquired volume variation rate with at least one standard voice model of a ninth type, and if a deviation between the acquired volume variation rate and a standard volume variation rate that corresponds to one standard voice model of the at least one standard voice model of the ninth type is less than or equal to a threshold n7, determining that the detected user action meets the preset disabling condition of the first application; or acquiring a volume variation rate corresponding to the user's voice detected by using an audio monitoring apparatus comprised in the terminal device, matching the acquired volume variation rate with a preset standard voice model of a ninth type, and if the acquired volume variation rate is greater than, or equal to a standard volume variation rate corresponding to the preset standard voice model of the ninth type, determining that the detected user action meets the preset disabling condition of the first application; or acquiring a volume variation rate corresponding to the user's voice detected by using an audio monitoring apparatus comprised in the terminal device, matching the acquired volume variation rate with at least one standard voice model of a tenth type, and if a deviation between the acquired volume variation rate and at least one standard volume variation rate within a standard volume variation rate range that corresponds to one standard voice model of the at least one standard voice model of the tenth type is less than or equal to a threshold n8, determining that the detected user action meets the preset disabling condition of the first application; or acquiring a volume variation rate corresponding to the user's voice detected by using an audio monitoring apparatus comprised in the terminal device, matching the acquired volume variation rate with a preset standard voice model of a tenth type, and if the acquired volume variation rate is greater than, or equal to at least one standard volume variation rate within a standard volume variation rate range that corresponds to the preset standard voice model of the tenth type, determining that the detected user action meets the preset disabling condition of the first application; or acquiring a duration corresponding to the user's voice detected by using an audio monitoring apparatus comprised in the terminal device, matching the acquired duration with at least one standard voice model of an eleventh type, and if a deviation between the acquired duration and a standard duration that corresponds to one standard voice model of the at least one standard voice model of the eleventh type is less than or equal to a threshold n9, determining that the detected user action meets the preset disabling condition of the first application; or acquiring a duration corresponding to the user's voice detected by using an audio monitoring apparatus comprised in the terminal device, matching the acquired duration with a preset standard voice model of an eleventh type, and if the acquired duration is greater than, or equal to a standard duration corresponding to the preset standard voice model of the eleventh type, determining that the detected user action meets the preset disabling condition of the first application; or acquiring a duration corresponding to the user's voice detected by using an audio monitoring apparatus comprised in the terminal device, matching the acquired duration with at least one standard voice model of a twelfth type, and if a deviation between the acquired duration and at least one standard duration within a standard duration range that corresponds to one standard voice model of the at least one standard voice model of the twelfth type is less than or equal to a threshold n10, determining that the detected user action meets the preset disabling condition of the first application; or acquiring a duration corresponding to the user's voice detected by using an audio monitoring apparatus comprised in the terminal device, matching the acquired duration with a preset standard voice model of a twelfth type, and if the acquired duration is greater than, or equal to at least one standard duration within a standard duration range that corresponds to the preset standard voice model of the twelfth type, determining that the detected user action meets the preset disabling condition of the first application; or converting the user's voice detected by using an audio monitoring apparatus comprised in the terminal device into a corresponding digital voice signal, matching the digital voice signal obtained after conversion with at least one standard voice model of a thirteenth type, and if a deviation between the digital voice signal and a standard digital voice signal that corresponds to one standard voice model of the at least one standard voice model of the thirteenth type is less than or equal to a threshold n11, determining that the detected user action meets the preset disabling condition of the first application.

9. A terminal device comprising:
electronic processor hardware; and
a non-transitory computer-readable medium comprising computer-executable instructions that, when executed by the electronic processor hardware, facilitate configuring the electronic processor hardware to:
monitor whether a first application on the terminal device is running;
monitor a user's action of operating a desktop of the terminal device, wherein the user's action is not directly associated with the first application;
display, on the desktop of the terminal device, an icon associated with the first application in a running-state image on the desktop, if it is detected that the first application is running;
automatically disable the first application if the first application is running and the user's action of operating the desktop meets a preset disabling condition of the first application; and
display the same icon associated with the first application in a disabled-state image, which is different from the running-state image of the icon, if it is detected that the first application is in a disabled state,
wherein (1) the running-state image includes a shadow effect that is absent in the disabled-state image, or (2) the first application comprises sub-applications, and disabling of the first application displays as occurring in batches of the sub-applications.

10. The terminal device according to claim 9, wherein the electronic hardware processor is configured to monitor, by using a thread status pool, whether the first application on the terminal device is running, wherein the thread status pool is a system thread.

11. The terminal device according to claim 9, wherein the electronic hardware processor is configured to monitor the user's gesture, monitor the user's moving track, monitor the user's voice, and/or monitor a touch track performed by the user on a touch sensor comprised in the terminal device.

12. The terminal device according to claim 11, wherein: the electronic hardware processor is configured to disable the first application when the first application is running, and when the touch track performed by the user on the touch sensor indicates that the running-state icon of the first application is flicked away so that the flicked-away running-state image of the icon of the first application hits an edge of a screen.

13. The terminal device according to claim 11, wherein:
the electronic hardware processor is configured when the first application is running to:
match a touch end point of the touch track that is detected and is performed by the user on the touch sensor with at least one standard touch point model of a first type, and when the matching succeeds, determine that the detected user action meets the preset disabling condition of the first application, and disable the first application; or
match a touch start point and a touch end point of the touch track that is detected and is performed by the user on the touch sensor with at least one standard touch point model of a second type, and if the matching succeeds, determine that the detected user action meets the preset disabling condition of the first application, and disable the first application; or
determine a touch direction corresponding to the touch track that is detected and is performed by the user on the touch sensor, match the determined touch direction with at least one standard touch track model of a first type, and if a deviation between the determined touch direction and a standard touch direction that is comprised in one standard touch track model of the at least one standard touch track model of the first type is less than a third threshold, determine that the detected user action meets the preset disabling condition of the first application, and disable the first application; or
determine a touch graph corresponding to the touch track that is detected and is performed by the user on the touch sensor, match the determined touch graph with at least one standard touch track model of a second type, and if a similarity between the determined touch graph and a standard touch graph that is comprised in one standard touch track model of the second type of the at least one standard touch track model of the second type is greater than a fourth threshold, determine that the detected user action meets the preset disabling condition of the first application, and disable the first application; or
determine a moving direction corresponding to the user's moving track detected by using a camera, match the determined moving direction with at least one standard moving track model of a first type, and if a deviation between the determined moving direction and a standard moving direction that corresponds to one standard moving track model of the at least one standard moving track model of the first type is less than or equal to a threshold m1, determine that the detected user action meets the preset disabling condition of the first application, and disable the first application, wherein the terminal device further comprises the camera; or
determine a graph corresponding to the user's moving track detected by using a camera, match the determined graph with at least one standard moving track model of a second type, and if a similarity between the determined graph and a standard graph that corresponds to one standard moving track model of the at least one standard moving track model of the second type is greater than or equal to a threshold m2, determine that the detected user action meets the preset disabling condition of the first application, and disable the first application; or determine a motion rate corresponding to the user's moving track detected by using a camera, match the determined motion rate with at least one standard moving track model of a third type, and if a deviation between the determined motion rate and a standard motion rate that corresponds to one standard moving track model of the at least one standard moving track model of the third type is less than or equal to a threshold m3, determine that the detected user action meets the preset disabling condition of the first application, and disable the first application; or determine a motion rate corresponding to the user's moving track detected by using a camera, match the determined motion rate with a preset standard moving track model of a third type, and if the determined motion rate is greater than, or equal to a standard motion rate corresponding to the preset standard moving track model of the third type, determine that the detected user action meets the preset disabling condition of the first application, and disable the first application; or determine a motion rate corresponding to the user's moving track detected by using a camera, match the determined motion rate with at least one standard moving track model of a fourth type, and if a deviation between the determined motion rate and at least one standard motion rate within a standard motion rate range that corresponds to one standard moving track model of the at least one standard moving track model of the fourth type is less than or equal to a threshold m4, determine that the detected user action meets the preset disabling condition of the first application, and disable the first application; or determine a motion rate corresponding to the user's moving track detected by using a camera, match the determined motion rate with a preset standard moving track model of a fourth type, and if the determined motion rate is greater than, or equal to at least one standard motion rate within a standard motion rate range that corresponds to the preset standard moving track model of the fourth type, determine that the detected user action meets the preset disabling condition of the first application, and disable the first application; or determine a motion displacement corresponding to the user's moving track detected by using a camera, match the determined motion displacement with at least one standard moving track model of a fifth type, and if a deviation between the determined motion displacement and a standard motion displacement that corresponds to one standard moving track model of the at least one standard moving track model of the fifth type is less than or equal to a threshold m5, determine that the detected user action meets the preset disabling condition of the first application, and disable the first application; or determine a motion displacement corresponding to the user's moving track detected by using a camera, match the determined motion displacement with a preset standard moving track model of a fifth type, and if the determined motion displacement is greater than, less than, or equal to a standard motion displacement corresponding to the preset standard moving track model of the fifth type, determine that the detected user action meets the preset disabling condition of the first application, and disable the first application; or determine a motion displacement corresponding to the user's moving track detected by using a camera, match the determined motion displacement with at least one standard moving track model of a sixth type, and if a deviation between the determined motion displacement and at least one standard motion displacement within a standard motion displacement range that corresponds to one standard moving track model of the at least one standard moving track model of the sixth type is less than or equal to a threshold m6, determine that the detected user action meets the preset disabling condition of the first application, and disable the first application; or determine a motion displacement corresponding to the user's moving track detected by using a camera, match the determined motion displacement with a preset standard moving track model of a sixth type, and if the determined motion displacement is greater than, less than, or equal to at least one standard motion displacement within a standard motion displacement range that corresponds to the preset standard moving track model of the sixth type, determine that the detected user action meets the preset disabling condition of the first application, and disable the first application; or determine a motion duration corresponding to the user's moving track detected by using a camera, match the determined motion duration with at least one standard moving track model of a seventh type, and if a deviation between the determined motion duration and a standard motion duration that corresponds to one standard moving track model of the at least one standard moving track model of the seventh type is less than or equal to a threshold m7, determine that the detected user action meets the preset disabling condition of the first application, and disable the first application; or determine a motion duration corresponding to the user's moving track detected by using a camera, match the determined motion duration with a preset standard moving track model of a seventh type, and if the determined motion duration is greater than, less than, or equal to a standard motion duration corresponding to the preset standard moving track model of the seventh type, determine that the detected user action meets the preset disabling condition of the first application, and disable the first application; or determine a motion duration corresponding to the user's moving track detected by using a camera, match the determined motion duration with at least one standard moving track model of an eighth type, and if a deviation between the determined motion duration and at least one standard motion duration within a standard motion duration range that corresponds to one standard moving track model of the at least one standard moving track model of the eighth type is less than or equal to a threshold m8, determine that the detected user action meets the preset disabling condition of the first application, and disable the first application; or determine a motion duration corresponding to the user's moving track detected by using a camera, match the determined motion duration with a preset standard moving track model of an eighth type, and if the determined motion duration is greater than, less than, or equal to at least one standard motion duration within a standard motion duration range that corresponds to the preset standard moving track model of the eighth type, determine that the detected user action meets the preset disabling condition of the first application, and disable the first application; or acquire a volume value corresponding to the user's voice detected by using an audio monitoring apparatus, match the acquired volume value with at least one standard voice model of a first type, and if a deviation between the acquired volume value and a standard volume value that corresponds to one standard voice model of the at least one standard voice model of the first type is less than or equal to a threshold iii, determine that the detected user action meets the preset disabling condition of the first application, and disable the first application, wherein the terminal device further comprises the audio monitoring apparatus; or acquire a volume value corresponding to the user's voice detected by using the audio monitoring apparatus, match the acquired volume value with a preset standard voice model of a first type, and if the acquired volume value is greater than, or equal to a standard volume value corresponding to the preset standard voice model of the first type, determine that the detected user action meets the preset disabling condition of the first application, and disable the first application; or acquire a volume value corresponding to the user's voice detected by using an audio monitoring apparatus, match the acquired volume value with at least one standard voice model of a second type, and if a deviation between the acquired volume value and at least one standard volume value within a standard volume value range that corresponds to one standard voice model of the at least one standard voice model of the second type is less than or equal to a threshold n2, determine that the detected user action meets the preset disabling condition of the first application, and disable the first application; or acquire a volume value corresponding to the user's voice detected by using an audio monitoring apparatus, match the acquired volume value with a preset standard voice model of a second type, and if the acquired volume value is greater than, or equal to at least one standard volume value within a standard volume value range that corresponds to the preset standard voice model of the second type, determine that the detected user action meets the preset disabling condition of the first application, and disable the first application; or acquire an audio value corresponding to the user's voice detected by using an audio monitoring apparatus, match the acquired audio value with at least one standard voice model of a third type, and if a deviation between the acquired audio value and a standard audio value that corresponds to one standard voice model of the at least one standard voice model of the third type is less than or equal to a threshold n3, determine that the detected user action meets the preset disabling condition of the first application, and disable the first application; or acquire an audio value corresponding to the user's voice detected by using an audio monitoring apparatus, match the acquired audio value with a preset standard voice model of a third type, and if the acquired audio value is greater than, or equal to a standard audio value corresponding to the preset standard voice model of the third type, determine that the detected user action meets the preset disabling condition of the first application, and disable the first application; or acquire an audio value corresponding to the user's voice detected by using an audio monitoring apparatus, match the acquired audio value with at least one standard voice model of a fourth type, and if a deviation between the acquired audio value and at least one standard audio value within a standard audio value range that corresponds to one standard voice model of the at least one standard voice model of the fourth type is less than or equal to a threshold n4, determine that the detected user action meets the preset disabling condition of the first application, and disable the first application; or acquire an audio value corresponding to the user's voice detected by using an audio monitoring apparatus, match the acquired audio value with a preset standard voice model of a fourth type, and if the acquired audio value is greater than, or equal to at least one standard audio value within a standard audio value range that corresponds to the preset standard voice model of the fourth type, determine that the detected user action meets the preset disabling condition of the first application, and disable the first application; or acquire an audio variation trend corresponding to the user's voice detected by using an audio monitoring apparatus, match the acquired audio variation trend with at least one standard voice model of a fifth type, and if the acquired audio variation trend is the same as a standard audio variation trend corresponding to one standard voice model of the at least one standard voice model of the fifth type, determine that the detected user action meets the preset disabling condition of the first application, and disable the first application; or acquire a volume variation trend corresponding to the user's voice detected by using an audio monitoring apparatus, match the acquired volume variation trend with at least one standard voice model of a sixth type, and if the acquired volume variation trend is the same as a standard volume variation trend corresponding to one standard voice model of the at least one standard voice model of the sixth type, determine that the detected user action meets the preset disabling condition of the first application, and disable the first application; or acquire an audio variation rate corresponding to the user's voice detected by using an audio monitoring apparatus, match the acquired audio variation rate with at least one standard voice model of a seventh type, and if a deviation between the acquired audio variation rate and a standard audio variation rate that corresponds to one standard voice model of the at least one standard voice model of the seventh type is less than or equal to a threshold n5, determine that the detected user action meets the preset disabling condition of the first application, and disable the first application; or acquire an audio variation rate corresponding to the user's voice detected by using an audio monitoring apparatus, match the acquired audio variation rate with a preset standard voice model of a seventh type, and if the acquired audio variation rate is greater than, or equal to a standard audio variation rate corresponding to the preset standard voice model of the seventh type, determine that the detected user action meets the preset disabling condition of the first application, and disable the first application; or acquire an audio variation rate corresponding to the user's voice detected by using an audio monitoring apparatus, match the acquired audio variation rate with at least one standard voice model of an eighth type, and if a deviation between the acquired audio variation rate and at least one standard audio variation rate within a standard audio variation rate range that corresponds to one standard voice model of the at least one standard voice model of the eighth type is less than or equal to a threshold n6, determine that the detected user action meets the preset disabling condition of the first application, and disable the first application; or acquire an audio variation rate corresponding to the user's voice detected by using an audio monitoring apparatus, match the acquired audio variation rate with a preset standard voice model of an eighth type, and if the acquired audio variation rate is greater than, or equal to at least one standard audio variation rate within a standard audio variation rate range that corresponds to the preset standard voice model of the eighth type, determine that the detected user action meets the preset disabling condition of the first application, and disable the first application; or acquire a volume variation rate corresponding to the user's voice detected by using an audio monitoring apparatus, match the acquired volume variation rate with at least one standard voice model of a ninth type, and if a deviation between the acquired volume variation rate and a standard volume variation rate that corresponds to one standard voice model of the at least one standard voice model of the ninth type is less than or equal to a threshold n7, determine that the detected user action meets the preset disabling condition corresponding to the first application, and disable the first application; or acquire a volume variation rate corresponding to the user's voice detected by using an audio monitoring apparatus, match the acquired volume variation rate with a preset standard voice model of a ninth type, and if the acquired volume variation rate is greater than, or equal to a standard volume variation rate corresponding to the preset standard voice model of the ninth type, determine that the detected user action meets the preset disabling condition of the first application, and disable the first application; or acquire a volume variation rate corresponding to the user's voice detected by using an audio monitoring apparatus, match the acquired volume variation rate with at least one standard voice model of a tenth type, and if a deviation between the acquired volume variation rate and at least one standard volume variation rate within a standard volume variation rate range that corresponds to one standard voice model of the at least one standard voice model of the tenth type is less than or equal to a threshold n8, determine that the detected user action meets the preset disabling condition of the first application, and disable the first application; or acquire a volume variation rate corresponding to the user's voice detected by using an audio monitoring apparatus, match the acquired volume variation rate with a preset standard voice model of a tenth type, and if the acquired volume variation rate is greater than, or equal to at least one standard volume variation rate within a standard volume variation rate range that corresponds to the preset standard voice model of the tenth type, determine that the detected user action meets the preset disabling condition of the first application, and disable the first application; or acquire a duration corresponding to the user's voice detected by using an audio monitoring apparatus, match the acquired duration with at least one standard voice model of an eleventh type, and if a deviation between the acquired duration and a standard duration that corresponds to one standard voice model of the at least one standard voice model of the eleventh type is less than or equal to a threshold n9, determine that the detected user action meets the preset disabling condition of the first application, and disable the first application; or acquire a duration corresponding to the user's voice detected by using an audio monitoring apparatus, match the acquired duration with a preset standard voice model of an eleventh type, and if the acquired duration is greater than, or equal to a standard duration corresponding to the preset standard voice model of the eleventh type, determine that the detected user action meets the preset disabling condition of the first application, and disable the first application; or acquire a duration corresponding to the user's voice detected by using an audio monitoring apparatus, match the acquired duration with at least one standard voice model of a twelfth type, and if a deviation between the acquired duration and at least one standard duration within a standard duration range that corresponds to one standard voice model of the at least one standard voice model of the twelfth type is less than or equal to a threshold n10, determine that the detected user action meets the preset disabling condition of the first application, and disable the first application; or acquire a duration corresponding to the user's voice detected by using an audio monitoring apparatus, match the acquired duration with a preset standard voice model of a twelfth type, and if the acquired duration is greater than, or equal to at least one standard duration within a standard duration range that corresponds to the preset standard voice model of the twelfth type, determine that the detected user action meets the preset disabling condition of the first application, and disable the first application; or convert the user's voice detected by using an audio monitoring apparatus into a corresponding digital voice signal, match the digital voice signal obtained after conversion with at least one standard voice model of a thirteenth type, and if a deviation between the digital voice signal and a standard digital voice signal that corresponds to one standard voice model of the at least one standard voice model of the thirteenth type is less than or equal to a threshold n11, determine that the detected user action meets the preset disabling condition of the first application, and disable the first application.

14. A terminal device comprising a device screen and a threador, wherein the threador is connected to the device screen, wherein:

the threador is configured to (a) monitor whether a first application on the terminal device is running, and monitor a user's action of operating a desktop of the terminal device, wherein the user's action is not directly associated with the first application, and (b) if it is detected that the first application is running, control the device screen to display an icon associated with the first application in a running-state image on the desktop, and automatically disable the first application if it is detected that the first application is running and it is detected that the user's action of operating the desktop meets a preset disabling condition of the first application; and the device screen is configured to display, under the control of the threador, the running-state icon image on the desktop corresponding to the first application, wherein the threador is further configured to control the device screen to display the same icon associated with the first application in a disabled-state image on the desktop, which is different from the running-state image of the icon if it is detected that the first application is in a disabled state, wherein (1) the running-state image includes a shadow effect that is absent in the disabled-state image, or (2) the first application comprises sub-applications, and disabling of the first application displays as occurring in batches of the sub-applications.

15. The terminal device according to claim 14, wherein the device screen is a touch sensor, or the terminal device further comprises a touch sensor, wherein:

in the aspect of monitoring the user's action of operating the desktop of the terminal device, the threador is configured to monitor the user's gesture, monitor the user's moving track, monitor the user's voice, and/or monitor a touch track performed by the user on the touch sensor.

16. The terminal device according to claim 15, wherein in the aspect of disabling the first application if it is detected that the first application is running and the detected user action meets the preset disabling condition corresponding to the first application, the threador is configured to disable the first application if it is detected that the first application is running, and if it is detected that the touch track performed by the user on the touch sensor indicates that the running-state image of the icon of the first application is flicked away so that the flicked-away running-state image of the icon of the first application hits an edge of a screen.

17. The terminal device according to claim 15, wherein:

the threador determines, according to any one of the following manners, that the detected user action meets the preset disabling condition of the first application;

matching a touch end point of the detected touch track performed by the user on the touch sensor with at least one standard touch point model of a first type, and if the matching succeeds, determining that the detected user action meets the preset disabling condition of the first application; or matching a touch start point and a touch end point of the detected touch track performed by the user on the touch sensor with at least one standard touch point model of a second type, and if the matching succeeds, determining that the detected user action meets the preset disabling condition of the first application; or determining a touch direction corresponding to the detected touch track performed by the user on the touch sensor, matching the determined touch direction with at least one standard touch track model of a first type, and if a deviation between the determined touch direction and a standard touch direction that is comprised in one standard touch track model of the at least one standard touch track model of the first type is less than a third threshold, determining that the detected user action meets the preset disabling condition of the first application; or determining a touch graph corresponding to the detected touch track performed by the user on the touch sensor, matching the determined touch graph with at least one standard touch track model of a second type, and if a similarity between the determined touch graph and a standard touch graph that is comprised in one standard touch track model of the second type of the at least one standard touch track model of the second type is greater than a fourth threshold, determining that the detected user action meets the preset disabling condition of the first application; or determining a moving direction corresponding to the user's moving track detected by using a camera, matching the determined moving direction with at least one standard moving track model of a first type, and if a deviation between the determined moving direction and a standard moving direction that corresponds to one standard moving track model of the at least one standard moving track model of the first type is less than or equal to a threshold m1, determining that the detected user action meets the preset disabling condition of the first application, wherein the terminal device further comprises a camera; or determining a graph corresponding to the user's moving track detected by using a camera, matching the determined graph with at least one standard moving track model of a second type, and if a similarity between the determined graph and a standard graph that corresponds to one standard moving track model of the at least one standard moving track model of the second type is greater than or equal to a threshold m2, determining that the detected user action meets the preset disabling condition of the first application; or determining a motion rate corresponding to the user's moving track detected by using a camera, matching the determined motion rate with at least one standard moving track model of a third type, and if a deviation between the determined motion rate and a standard motion rate that corresponds to one standard moving track model of the at least one standard moving track model of the third type is less than or equal to a threshold m3, determining that the detected user action meets the preset disabling condition of the first application; or determining a motion rate corresponding to the user's moving track detected by using a camera, matching the determined motion rate with a preset standard moving track model of a third type, and if the determined motion rate is greater than, or equal to a standard motion rate corresponding to the preset standard moving track model of the third type, determining that the detected user action meets the preset disabling condition corresponding to the first application; or determining a motion rate corresponding to the user's moving track detected by using a camera, matching the determined motion rate with at least one standard moving track model of a fourth type, and if a deviation between the determined motion rate and at least one standard motion rate within a standard motion rate range that corresponds to one standard moving track model of the at least one standard moving track model of the fourth type is less than or equal to a threshold m4, determining that the detected user action meets the preset disabling condition of the first application; or determining a motion rate corresponding to the user's moving track detected by using a camera, matching the determined motion rate with a preset standard moving track model of a fourth type, and if the determined motion rate is greater than, or equal to at least one standard motion rate within a standard motion rate range that corresponds to the preset standard moving track model of the fourth type, determining that the detected user action meets the preset disabling condition of the first application; or determining a motion displacement corresponding to the user's moving track detected by using a camera, matching the determined motion displacement with at least one standard moving track model of a fifth type, and if a deviation between the determined motion displacement and a standard motion displacement that corresponds to one standard moving track model of the at least one standard moving track model of the fifth type is less than or equal to a threshold m5, determining that the detected user action meets the preset disabling condition of the first application; or determining a motion displacement corresponding to the user's moving track detected by using a camera, matching the determined motion displacement with a preset standard moving track model of a fifth type, and if the determined motion displacement is greater than, less than, or equal to a standard motion displacement corresponding to the preset standard moving track model of the fifth type, determining that the detected user action meets the preset disabling condition of the first application; or determining a motion displacement corresponding to the user's moving track detected by using a camera, matching the determined motion displacement with at least one standard moving track model of a sixth type, and if a deviation between the determined motion displacement and at least one standard motion displacement within a standard motion displacement range that corresponds to one standard moving track model of the at least one standard moving track model of the sixth type is less than or equal to a threshold m6, determining that the detected user action meets the preset disabling condition of the first application; or determining a motion displacement corresponding to the user's moving track detected by using a camera, matching the determined motion displacement with a preset standard moving track model of a sixth type, and if the determined motion displacement is greater than, less than, or equal to at least one standard motion displacement within a standard motion displacement range that corresponds to the preset standard moving track model of the sixth type, determining that the detected user action meets the preset disabling condition of the first application; or determining a motion duration corresponding to the user's moving track detected by using a camera, matching the determined motion duration with at least one standard moving track model of a seventh type, and if a deviation between the determined motion duration and a standard motion duration that corresponds to one standard moving track model of the at least one standard moving track model of the seventh type is less than or equal to a threshold m7, determining that the detected user action meets the preset disabling condition of the first application; or determining a motion duration corresponding to the user's moving track detected by using a camera, matching the determined motion duration with a preset standard moving track model of a seventh type, and if the determined motion duration is greater than, less than, or equal to a standard motion duration corresponding to the preset standard moving track model of the seventh type, determining that the detected user action meets the preset disabling condition of the first application; or determining a motion duration corresponding to the user's moving track detected by using a camera, matching the determined motion duration with at least one standard moving track model of an eighth type, and if a deviation between the determined motion duration and at least one standard motion duration within a standard motion duration range that corresponds to one standard moving track model of the at least one standard moving track model of the eighth type is less than or equal to a threshold m8, determining that the detected user action meets the preset disabling condition of the first application; or determining a motion duration corresponding to the user's moving track detected by using a camera, matching the determined motion duration with a preset standard moving track model of an eighth type, and if the determined motion duration is greater than, less than, or equal to at least one standard motion duration within a standard motion duration range that corresponds to the preset standard moving track model of the eighth type, determining that the detected user action meets the preset disabling condition of the first application; or acquiring a volume value, corresponding to the user's voice detected by using an audio monitoring apparatus, matching the acquired volume value with at least one standard voice model of a first type, and if a deviation between the acquired volume value and a standard volume value that corresponds to one standard voice model of the at least one standard voice model of the first type is less than or equal to a threshold n1, determining that the detected user action meets the preset disabling condition of the first application, wherein the terminal device further comprises the audio monitoring apparatus; or acquiring a volume value corresponding to the user's voice detected by using an audio monitoring apparatus, matching the acquired volume value with a preset standard voice model of a first type, and if the acquired volume value is greater than, or equal to a standard volume value corresponding to the preset standard voice model of the first type, determining that the detected user action meets the preset disabling condition of the first application; or acquiring a volume value corresponding to the user's voice detected by using an audio monitoring apparatus, matching the acquired volume value with at least one standard voice model of a second type, and if a deviation between the acquired volume value and at least one standard volume value within a standard volume value range that corresponds to one standard voice model of the at least one standard voice model of the second type is less than or equal to a threshold n2, determining that the detected user action meets the preset disabling condition of the first application; or acquiring a volume value corresponding to the user's voice detected by using an audio monitoring apparatus, matching the acquired volume value with a preset standard voice model of a second type, and if the acquired volume value is greater than, or equal to at least one standard volume value within a standard volume value range that corresponds to the preset standard voice model of the second type, determining that the detected user action meets the preset disabling condition of the first application; or acquiring an audio value corresponding to the user's voice detected by using an audio monitoring apparatus, matching the acquired audio value with at least one standard voice model of a third type, and if a deviation between the acquired audio value and a standard audio value that corresponds to one standard voice model of the at least one standard voice model of the third type is less than or equal to a threshold n3, determining that the detected user action meets the preset disabling condition of the first application; or acquiring an audio value corresponding to the user's voice detected by using an audio monitoring apparatus, matching the acquired audio value with a preset standard voice model of a third type, and if the acquired audio value is greater than, or equal to a standard audio value corresponding to the preset standard voice model of the third type, determining that the detected user action meets the preset disabling condition of the first application; or acquiring an audio value corresponding to the user's voice detected by using an audio monitoring apparatus, matching the acquired audio value with at least one standard voice model of a fourth type, and if a deviation between the acquired audio value and at least one standard audio value within a standard audio value range that corresponds to one standard voice model of the at least one standard voice model of the fourth type is less than or equal to a threshold n4, determining that the detected user action meets the preset disabling condition of the first application; or acquiring an audio value corresponding to the user's voice detected by using an audio monitoring apparatus, matching the acquired audio value with a preset standard voice model of a fourth type, and if the acquired audio value is greater than, or equal to at least one standard audio value within a standard audio value range that corresponds to the preset standard voice model of the fourth type, determining that the detected user action meets the preset disabling condition of the first application; or acquiring an audio variation trend corresponding to the user's voice detected by using an audio monitoring apparatus, matching the acquired audio variation trend with at least one standard voice model of a fifth type, and if the acquired audio variation trend is the same as a standard audio variation trend corresponding to one standard voice model of the at least one standard voice model of the fifth type, determining that the detected user action meets the preset disabling condition of the first application; or acquiring a volume variation trend corresponding to the user's voice detected by using an audio monitoring apparatus, matching the acquired volume variation trend with at least one standard voice model of a sixth type, and if the acquired volume variation trend is the same as a standard volume variation trend corresponding to one standard voice model of the at least one standard voice model of the sixth type, determining that the detected user action meets the preset disabling condition of the first application; or acquiring an audio variation rate corresponding to the user's voice detected by using an audio monitoring apparatus, matching the acquired audio variation rate with at least one standard voice model of a seventh type, and if a deviation between the acquired audio variation rate and a standard audio variation rate that corresponds to one standard voice model of the at least one standard voice model of the seventh type is less than or equal to a threshold n5, determining that the detected user action meets the preset disabling condition of the first application; or acquiring an audio variation rate corresponding to the user's voice detected by using an audio monitoring apparatus, matching the acquired audio variation rate with a preset standard voice model of a seventh type, and if the acquired audio variation rate is greater than, or equal to a standard audio variation rate corresponding to the preset standard voice model of the seventh type, determining that the detected user action meets the preset disabling condition of the first application; or acquiring an audio variation rate corresponding to the user's voice detected by using an audio monitoring apparatus, matching the acquired audio variation rate with at least one standard voice model of an eighth type, and if a deviation between the acquired audio variation rate and at least one standard audio variation rate within a standard audio variation rate range that corresponds to one standard voice model of the at least one standard voice model of the eighth type is less than or equal to a threshold n6, determining that the detected user action meets the preset disabling condition of the first application; or acquiring an audio variation rate corresponding to the user's voice detected by using an audio monitoring apparatus, matching the acquired audio variation rate with a preset standard voice model of an eighth type, and if the acquired audio variation rate is greater than, or equal to at least one standard audio variation rate within a standard audio variation rate range that corresponds to the preset standard voice model of the eighth type, determining that the detected user action meets the preset disabling condition of the first application; or acquiring a volume variation rate corresponding to the user's voice detected by using an audio monitoring apparatus, matching the acquired volume variation rate with at least one standard voice model of a ninth type, and if a deviation between the acquired volume variation rate and a standard volume variation rate that corresponds to one standard voice model of the at least one standard voice model of the ninth type is less than or equal to a threshold n7, determining that the detected user action meets the preset disabling condition of the first application; or acquiring a volume variation rate corresponding to the user's voice detected by using an audio monitoring apparatus, matching the acquired volume variation rate with a preset standard voice model of a ninth type, and if the acquired volume variation rate is greater than, or equal to a standard volume variation rate corresponding to the preset standard voice model of the ninth type, determining that the detected user action meets the preset disabling condition of the first application; or acquiring a volume variation rate corresponding to the user's voice detected by using an audio monitoring apparatus, matching the acquired volume variation rate with at least one standard voice model of a tenth type, and if a deviation between the acquired volume variation rate and at least one standard volume variation rate within a standard volume variation rate range that corresponds to one standard voice model of the at least one standard voice model of the tenth type is less than or equal to a threshold n8, determining that the detected user action meets the preset disabling condition of first application; or acquiring a volume variation rate corresponding to the user's voice detected by using an audio monitoring apparatus, matching the acquired volume variation rate with a preset standard voice model of a tenth type, and if the acquired volume variation rate is greater than, or equal to at least one standard volume variation rate within a standard volume variation rate range that corresponds to the preset standard voice model of the tenth type, determining that the detected user action meets the preset disabling condition of the first application; or acquiring a duration corresponding to the user's voice detected by using an audio monitoring apparatus, matching the acquired duration with at least one standard voice model of an eleventh type, and if a deviation between the acquired duration and a standard duration that corresponds to one standard voice model of the at least one standard voice model of the eleventh type is less than or equal to a threshold n9, determining that the detected user action meets the preset disabling condition of the first application; or acquiring a duration corresponding to the user's voice detected by using an audio monitoring apparatus, matching the acquired duration with a preset standard voice model of an eleventh type, and if the acquired duration is greater than, or equal to a standard duration corresponding to the preset standard voice model of the eleventh type, determining that the detected user action meets the preset disabling condition of the first application; or acquiring a duration corresponding to the user's voice detected by using an audio monitoring apparatus, matching the acquired duration with at least one standard voice model of a twelfth type, and if a deviation between the acquired duration and at least one standard duration within a standard duration range that corresponds to one standard voice model of the at least one standard voice model of the twelfth type is less than or equal to a threshold n10, determining that the detected user action meets the preset disabling condition of the first application; or acquiring a duration corresponding to the user's voice detected by using an audio monitoring apparatus, matching the acquired duration with a preset standard voice model of a twelfth type, and if the acquired duration is greater than, or equal to at least one standard duration within a standard duration range that corresponds to the preset standard voice model of the twelfth type, determining that the detected user action meets the preset disabling condition of the first application; or converting the user's voice detected by using the audio monitoring apparatus into a corresponding digital voice signal, matching the digital voice signal obtained after conversion with at least one standard voice model of a thirteenth type, and if a deviation between the digital voice signal and a standard digital voice signal that corresponds to one standard voice model of the at least one standard voice model of the thirteenth type is less than or equal to a threshold n11, determining that the detected user action meets the preset disabling condition of the first application.

18. A terminal device comprising a threador and a memory, wherein:

the threador invokes code stored in the memory, so as to (a) monitor whether a first application on the terminal device is running, (b) monitor a user's action of operating a desktop of the terminal device, wherein the user's action is not directly associated with the first application, (c) display, on the desktop of the terminal device, an icon associated with the first application in a running-state image on the desktop if the first application is running, and (d) automatically disable the first application if the first application is running and the user's action of operating the desktop meets a preset disabling condition of the first application, wherein through invoking the codes in the memory, the same icon associated with the first application in a disabled-state image, which is different from the running-state image of the icon is displayed on the desktop of the terminal device, if it is detected that the first application is in a disabled state, and wherein (1) the running-state image includes a shadow effect that is absent in the disabled-state image, or (2) the first application comprises sub-applications, and disabling of the first application displays as occurring in batches of the sub-applications.

19. The terminal device according to claim 18, wherein in the aspect of monitoring whether the first application on the terminal device is running, the threador is configured to monitor, by using a thread status pool, whether the first application on the terminal device is running, wherein the thread status pool is a system thread.

20. The terminal device according to claim 18, wherein current memory usage of the first application is displayed in the running-state image of the icon corresponding to the first application.

21. The terminal device according to claim 18, wherein: the threador is further configured to set a status of the first application to a protected state or an unprotected state according to a user instruction or a preset policy.

22. The terminal device according to claim 21, wherein: in the aspect of disabling the first application if it is detected that the first application is running and the detected user action meets the preset disabling condition of the first application, the threador is configured to disable the first application if it is detected that the first application is running, the first application is currently in the unprotected state, and the detected user action meets the preset disabling condition of the first application.

23. The terminal device according to claim 18, wherein in the aspect of monitoring the user's action of operating the desktop of the terminal device, the threador is configured to monitor the user's gesture, monitor the user's moving track, monitor the user's voice, and/or monitor a touch track performed by the user on a touch sensor comprised in the terminal device.

24. The terminal device according to claim 23, wherein in the aspect of disabling the first application if the detected user action meets the preset disabling condition of the first application, the threador is configured to disable the first application if it is detected that the touch track performed by the user on the touch sensor comprised in the terminal device indicates that the running-state image of the icon of the first application is flicked away so that the flicked-away running-state image of the icon of the first application hits an edge of a screen.

25. The terminal device according to claim 23, wherein that the user action detected by the threador meets the preset disabling condition of the first application is determined by using any one of the following methods:

matching a touch end point of the detected touch track performed by the user on the touch sensor comprised in the terminal device with at least one standard touch point model of a first type, and if the matching succeeds, determining that the detected user action meets the preset disabling condition of the first application; or matching a touch start point and a touch end point of the detected touch track performed by the user on the touch sensor comprised in the terminal device with at least one standard touch point model of a second type, and if the matching succeeds, determining that the detected user action meets the preset disabling condition of the first application; or determining a touch direction corresponding to the detected touch track performed by the user on the touch sensor comprised in the terminal device, matching the determined touch direction with at least one standard touch track model of a first type, and if a deviation between the determined touch direction and a standard touch direction that is comprised in one standard touch track model of the at least one standard touch track model of the first type is less than a third threshold, determining that the detected user action meets the preset disabling condition of the first application; or determining a touch graph corresponding to the detected touch track performed by the user on the touch sensor comprised in the terminal device, matching the determined touch graph with at least one standard touch track model of a second type, and if a similarity between the determined touch graph and a standard touch graph that is comprised in one standard touch track model of the second type of the at least one standard touch track model of the second type is greater than a fourth threshold, determining that the detected user action meets the preset disabling condition of the first application; or determining a moving direction corresponding to the user's moving track detected by using a camera comprised in the terminal device, matching the determined moving direction with at least one standard moving track model of a first type, and if a deviation between the determined moving direction and a standard moving direction that corresponds to one standard moving track model of the at least one standard moving track model of the first type is less than or equal to a threshold m1, determining that the detected user action meets the preset disabling condition of the first application; or determining a graph corresponding to the user's moving track detected by using a camera comprised in the terminal device, matching the determined graph with at least one standard moving track model of a second type, and if a similarity between the determined graph and a standard graph that corresponds to one standard moving track model of the at least one standard moving track model of the second type is greater than or equal to a threshold m2, determining that the detected user action meets the preset disabling condition of the first application; or determining a motion rate corresponding to the user's moving track detected by using a camera comprised in the terminal device, matching the determined motion rate with at least one standard moving track model of a third type, and if a deviation between the determined motion rate and a standard motion rate that corresponds to one standard moving track model of the at least one standard moving track model of the third type is less than or equal to a threshold m3, determining that the detected user action meets the preset disabling condition of the first application; or determining a motion rate corresponding to the user's moving track detected by using a camera comprised in the terminal device, matching the determined motion rate with a preset standard moving track model of a third type, and if the determined motion rate is greater than, or equal to a standard motion rate corresponding to the preset standard moving track model of the third type, determining that the detected user action meets the preset disabling condition of the first application; or determining a motion rate corresponding to the user's moving track detected by using a camera comprised in the terminal device, matching the determined motion rate with at least one standard moving track model of a fourth type, and if a deviation between the determined motion rate and at least one standard motion rate within a standard motion rate range that corresponds to one standard moving track model of the at least one standard moving track model of the fourth type is less than or equal to a threshold m4, determining that the detected user action meets the preset disabling condition of the first application; or determining a motion rate corresponding to the user's moving track detected by using a camera comprised in the terminal device, matching the determined motion rate with a preset standard moving track model of a fourth type, and if the determined motion rate is greater than, or equal to at least one standard motion rate within a standard motion rate range that corresponds to the preset standard moving track model of the fourth type, determining that the detected user action meets the preset disabling condition of the first application; or determining a motion displacement corresponding to the user's moving track detected by using a camera comprised in the terminal device, matching the determined motion displacement with at least one standard moving track model of a fifth type, and if a deviation between the determined motion displacement and a standard motion displacement that corresponds to one standard moving track model of the at least one standard moving track model of the fifth type is less than or equal to a threshold m5, determining that the detected user action meets the preset disabling condition of the first application; or determining a motion displacement corresponding to the user's moving track detected by using a camera comprised in the terminal device, matching the determined motion displacement with a preset standard moving track model of a fifth type, and if the determined motion displacement is greater than, less than, or equal to a standard motion displacement corresponding to the preset standard moving track model of the fifth type, determining that the detected user action meets the preset disabling condition of the first application; or determining a motion displacement corresponding to the user's moving track detected by using a camera comprised in the terminal device, matching the determined motion displacement with at least one standard moving track model of a sixth type, and if a deviation between the determined motion displacement and at least one standard motion displacement within a standard motion displacement range that corresponds to one standard moving track model of the at least one standard moving track model of the sixth type is less than or equal to a threshold m6, determining that the detected user action meets the preset disabling condition of the first application; or determining a motion displacement corresponding to the user's moving track detected by using a camera comprised in the terminal device, matching the determined motion displacement with a preset standard moving track model of a sixth type, and if the determined motion displacement is greater than, less than, or equal to at least one standard motion displacement within a standard motion displacement range that corresponds to the preset standard moving track model of the sixth type, determining that the detected user action meets the preset disabling condition of the first application; or determining a motion duration corresponding to the user's moving track detected by using a camera comprised in the terminal device, matching the determined motion duration with at least one standard moving track model of a seventh type, and if a deviation between the determined motion duration and a standard motion duration that corresponds to one standard moving track model of the at least one standard moving track model of the seventh type is less than or equal to a threshold m7, determining that the detected user action meets the preset disabling condition of the first application; or determining a motion duration corresponding to the user's moving track detected by using a camera comprised in the terminal device, matching the determined motion duration with a preset standard moving track model of a seventh type, and if the determined motion duration is greater than, less than, or equal to a standard motion duration corresponding to the preset standard moving track model of the seventh type, determining that the detected user action meets the preset disabling condition of the first application; or determining a motion duration corresponding to the user's moving track detected by using a camera comprised in the terminal device, matching the determined motion duration with at least one standard moving track model of an eighth type, and if a deviation between the determined motion duration and at least one standard motion duration within a standard motion duration range that corresponds to one standard moving track model of the at least one standard moving track model of the eighth type is less than or equal to a threshold m8, determining that the detected user action meets the preset disabling condition of the first application; or determining a motion duration corresponding to the user's moving track detected by using a camera comprised in the terminal device, matching the determined motion duration with a preset standard moving track model of an eighth type, and if the determined motion duration is greater than, less than, or equal to at least one standard motion duration within a standard motion duration range that corresponds to the preset standard moving track model of the eighth type, determining that the detected user action meets the preset disabling condition of the first application; or acquiring a volume value corresponding to the user's voice detected by using an audio monitoring apparatus comprised in the terminal device, matching the acquired volume value with at least one standard voice model of a first type, and if a deviation between the acquired volume value and a standard volume value that corresponds to one standard voice model of the at least one standard voice model of the first type is less than or equal to a threshold n1, determining that the detected user action meets the preset disabling condition of the first application; or acquiring a volume value corresponding to the user's voice detected by using an audio monitoring apparatus comprised in the terminal device, matching the acquired volume value with a preset standard voice model of a first type, and if the acquired volume value is greater than, or equal to a standard volume value corresponding to the preset standard voice model of the first type, determining that the detected user action meets the preset disabling condition of the first application; or acquiring a volume value corresponding to the user's voice detected by using an audio monitoring apparatus comprised in the terminal device, matching the acquired volume value with at least one standard voice model of a second type, and if a deviation between the acquired volume value and at least one standard volume value within a standard volume value range that corresponds to one standard voice model of the at least one standard voice model of the second type is less than or equal to a threshold n2, determining that the detected user action meets the preset disabling condition of the first application; or acquiring a volume value corresponding to the user's voice detected by using an audio monitoring apparatus comprised in the terminal device, matching the acquired volume value with a preset standard voice model of a second type, and if the acquired volume value is greater than, or equal to at least one standard volume value within a standard volume value range that corresponds to the preset standard voice model of the second type, determining that the detected user action meets the preset disabling condition of the first application; or acquiring an audio value corresponding to the user's voice detected by using an audio monitoring apparatus comprised in the terminal device, matching the acquired audio value with at least one standard voice model of a third type, and if a deviation between the acquired audio value and a standard audio value that corresponds to one standard voice model of the at least one standard voice model of the third type is less than or equal to a threshold n3, determining that the detected user action meets the preset disabling condition of the first application; or acquiring an audio value corresponding to the user's voice detected by using an audio monitoring apparatus comprised in the terminal device, matching the acquired audio value with a preset standard voice model of a third type, and if the acquired audio value is greater than, or equal to a standard audio value corresponding to the preset standard voice model of the third type, determining that the detected user action meets the preset disabling condition of the first application; or acquiring an audio value corresponding to the user's voice detected by using an audio monitoring apparatus comprised in the terminal device, matching the acquired audio value with at least one standard voice model of a fourth type, and if a deviation between the acquired audio value and at least one standard audio value within a standard audio value range that corresponds to one standard voice model of the at least one standard voice model of the fourth type is less than or equal to a threshold n4, determining that the detected user action meets the preset disabling condition of the first application; or acquiring an audio value corresponding to the user's voice detected by using an audio monitoring apparatus comprised in the terminal device, matching the acquired audio value with a preset standard voice model of a fourth type, and if the acquired audio value is greater than, or equal to at least one standard audio value within a standard audio value range that corresponds to the preset standard voice model of the fourth type, determining that the detected user action meets the preset disabling condition of the first application; or acquiring an audio variation trend corresponding to the user's voice detected by using an audio monitoring apparatus comprised in the terminal device, matching the acquired audio variation trend with at least one standard voice model of a fifth type, and if the acquired audio variation trend is the same as a standard audio variation trend corresponding to one standard voice model of the at least one standard voice model of the fifth type, determining that the detected user action meets the preset disabling condition the first application; or acquiring a volume variation trend corresponding to the user's voice detected by using an audio monitoring apparatus comprised in the terminal device, matching the acquired volume variation trend with at least one standard voice model of a sixth type, and if the acquired volume variation trend is the same as a standard volume variation trend corresponding to one standard voice model of the at least one standard voice model of the sixth type, determining that the detected user action meets the preset disabling condition of the first application; or acquiring an audio variation rate corresponding to the user's voice detected by using an audio monitoring apparatus comprised in the terminal device, matching the acquired audio variation rate with at least one standard voice model of a seventh type, and if a deviation between the acquired audio variation rate and a standard audio variation rate that corresponds to one standard voice model of the at least one standard voice model of the seventh type is less than or equal to a threshold n5, determining that the detected user action meets the preset disabling condition of the first application; or acquiring an audio variation rate corresponding to the user's voice detected by using an audio monitoring apparatus comprised in the terminal device, matching the acquired audio variation rate with a preset standard voice model of a seventh type, and if the acquired audio variation rate is greater than, or equal to a standard audio variation rate corresponding to the preset standard voice model of the seventh type, determining that the detected user action meets the preset disabling condition of the first application; or acquiring an audio variation rate corresponding to the user's voice detected by using an audio monitoring apparatus comprised in the terminal device, matching the acquired audio variation rate with at least one standard voice model of an eighth type, and if a deviation between the acquired audio variation rate and at least one standard audio variation rate within a standard audio variation rate range that corresponds to one standard voice model of the at least one standard voice model of the eighth type is less than or equal to a threshold n6, determining that the detected user action meets the preset disabling condition of the first application; or acquiring an audio variation rate corresponding to the user's voice detected by using an audio monitoring apparatus comprised in the terminal device, matching the acquired audio variation rate with a preset standard voice model of an eighth type, and if the acquired audio variation rate is greater than, or equal to at least one standard audio variation rate within a standard audio variation rate range that corresponds to the preset standard voice model of the eighth type, determining that the detected user action meets the preset disabling condition of the first application; or acquiring a volume variation rate corresponding to the user's voice detected by using an audio monitoring apparatus comprised in the terminal device, matching the acquired volume variation rate with at least one standard voice model of a ninth type, and if a deviation between the acquired volume variation rate and a standard volume variation rate that corresponds to one standard voice model of the at least one standard voice model of the ninth type is less than or equal to a threshold n7, determining that the detected user action meets the preset disabling condition of the first application; or acquiring a volume variation rate corresponding to the user's voice detected by using an audio monitoring apparatus comprised in the terminal device, matching the acquired volume variation rate with a preset standard voice model of a ninth type, and if the acquired volume variation rate is greater than, or equal to a standard volume variation rate corresponding to the preset standard voice model of the ninth type, determining that the detected user action meets the preset disabling condition of the first application; or acquiring a volume variation rate corresponding to the user's voice detected by using an audio monitoring apparatus comprised in the terminal device, matching the acquired volume variation rate with at least one standard voice model of a tenth type, and if a deviation between the acquired volume variation rate and at least one standard volume variation rate within a standard volume variation rate range that corresponds to one standard voice model of the at least one standard voice model of the tenth type is less than or equal to a threshold n8, determining that the detected user action meets the preset disabling condition of the first application; or acquiring a volume variation rate corresponding to the user's voice detected by using an audio monitoring apparatus comprised in the terminal device, matching the acquired volume variation rate with a preset standard voice model of a tenth type, and if the acquired volume variation rate is greater than, or equal to at least one standard volume variation rate within a standard volume variation rate range that corresponds to the preset standard voice model of the tenth type, determining that the detected user action meets the preset disabling condition of the first application; or acquiring a duration corresponding to the user's voice detected by using an audio monitoring apparatus comprised in the terminal device, matching the acquired duration with at least one standard voice model of an eleventh type, and if a deviation between the acquired duration and a standard duration that corresponds to one standard voice model of the at least one standard voice model of the eleventh type is less than or equal to a threshold n9, determining that the detected user action meets the preset disabling condition of the first application; or acquiring a duration corresponding to the user's voice detected by using an audio monitoring apparatus comprised in the terminal device, matching the acquired duration with a preset standard voice model of an eleventh type, and if the acquired duration is greater than, or equal to a standard duration corresponding to the preset standard voice model of the eleventh type, determining that the detected user action meets the preset disabling condition of the first application; or acquiring a duration corresponding to the user's voice detected by using an audio monitoring apparatus comprised in the terminal device, matching the acquired duration with at least one standard voice model of a twelfth type, and if a deviation between the acquired duration and at least one standard duration within a standard duration range that corresponds to one standard voice model of the at least one standard voice model of the twelfth type is less than or equal to a threshold n10, determining that the detected user action meets the preset disabling condition of the first application; or acquiring a duration corresponding to the user's voice detected by using an audio monitoring apparatus comprised in the terminal device, matching the acquired duration with a preset standard voice model of a twelfth type, and if the acquired duration is greater than, or equal to at least one standard duration within a standard duration range that corresponds to the preset standard voice model of the twelfth type, determining that the detected user action meets the preset disabling condition of the first application; or converting the user's voice detected by using an audio monitoring apparatus comprised in the terminal device into a corresponding digital voice signal, matching the digital voice signal obtained after conversion with at least one standard voice model of a thirteenth type, and if a deviation between the digital voice signal and a standard digital voice signal that corresponds to one standard voice model of the at least one standard voice model of the thirteenth type is less than or equal to a threshold n11, determining that the detected user action meets the preset disabling condition of the first application.

* * * * *